(12) United States Patent
Matsugu et al.

(10) Patent No.: US 7,512,271 B2
(45) Date of Patent: Mar. 31, 2009

(54) DYNAMICALLY RECONFIGURABLE SIGNAL PROCESSING CIRCUIT, PATTERN RECOGNITION APPARATUS, AND IMAGE PROCESSING APPARATUS

(75) Inventors: Masakazu Matsugu, Kanagawa (JP); Katsuhiko Mori, Kanagawa (JP); Osamu Nomura, Hiroshima (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 11/449,780

(22) Filed: Jun. 9, 2006

(65) Prior Publication Data

US 2006/0228027 A1 Oct. 12, 2006

Related U.S. Application Data

(62) Division of application No. 10/105,309, filed on Mar. 26, 2002, now Pat. No. 7,088,860.

(30) Foreign Application Priority Data

Mar. 28, 2001 (JP) ............................. 2001-093274
May 31, 2001 (JP) ............................. 2001-164282
May 31, 2001 (JP) ............................. 2001-164510
Sep. 7, 2001 (JP) ............................. 2001-272555
Sep. 7, 2001 (JP) ............................. 2001-272557

(51) Int. Cl.
*G06K 9/00* (2006.01)

(52) U.S. Cl. ................... 382/181; 348/222.1; 348/571; 382/145; 382/247

(58) Field of Classification Search ............. 348/222.1, 348/571; 382/145, 147, 181, 190, 247
See application file for complete search history.

(56) References Cited

U.S. PATENT DOCUMENTS

| 4,786,818 | A |   | 11/1988 | Mead et al. ................... 250/578 |
| 5,101,112 | A | * | 3/1992 | Amari ..................... 250/559.32 |
| 5,200,840 | A | * | 4/1993 | Koike et al. .................. 358/451 |
| 5,220,559 | A |   | 6/1993 | Tsuzuki et al. ................. 370/60 |
| 5,386,480 | A | * | 1/1995 | Lo et al. ..................... 382/103 |

(Continued)

FOREIGN PATENT DOCUMENTS

EP 0 926 885 A2 6/1999

(Continued)

OTHER PUBLICATIONS

Daugman, "Complete Discrete 2-D Gabor Transforms by Neural Networks for Image Analysis and Compression," 36 (7) IEEE Trans. on Acoustics, Speech, and Signal Processing, 1169-1179 (1988).

(Continued)

*Primary Examiner*—Gregory M Desire
(74) *Attorney, Agent, or Firm*—Fitzpatrick, Cella, Harper & Scinto

(57) ABSTRACT

A plurality of signal processing functions are achieved with the same arithmetic processing circuit by controlling wiring arrangements or signal modulation in accordance with a predetermined arrangement control signal that is output based on circuit arrangement information read from a circuit arrangement information storage unit. Hierarchical parallel processing is realized with small-scale circuit configuration. Further, detection of a predetermined feature and integration of the detection results can be efficiently performed.

7 Claims, 62 Drawing Sheets

U.S. PATENT DOCUMENTS

| | | | | |
|---|---|---|---|---|
| 5,454,052 | A * | 9/1995 | Kojima | 382/233 |
| 5,459,424 | A | 10/1995 | Hattori | 327/278 |
| 5,519,811 | A | 5/1996 | Yoneda et al. | 395/24 |
| 5,805,605 | A | 9/1998 | Lee et al. | 714/18 |
| 5,959,871 | A | 9/1999 | Pierzchala et al. | 364/489 |
| 5,987,170 | A | 11/1999 | Yamamoto et al. | 382/170 |
| 5,999,055 | A | 12/1999 | Kimura | 330/255 |
| 6,321,174 | B1 | 11/2001 | Chen et al. | 702/122 |
| 6,407,810 | B1 * | 6/2002 | Liu et al. | 356/237.4 |
| 6,597,394 | B1 | 7/2003 | Duncan et al. | 348/222.1 |
| 6,606,119 | B1 | 8/2003 | Shibata et al. | 348/252 |
| 6,741,198 | B2 | 5/2004 | McIlrath | 341/155 |
| 6,897,983 | B1 * | 5/2005 | Kawano | 358/3.26 |
| 6,928,535 | B2 | 8/2005 | Yamashita et al. | 712/225 |
| 6,947,088 | B2 | 9/2005 | Kochi | 348/308 |
| 7,013,123 | B2 * | 3/2006 | Takikawa et al. | 455/333 |
| 7,274,819 | B2 * | 9/2007 | Matsugu | 382/181 |
| 2002/0008309 | A1 | 1/2002 | Akiyama | 257/686 |
| 2002/0038294 | A1 | 3/2002 | Matsugu | 706/20 |
| 2002/0101528 | A1 | 8/2002 | Lee et al. | 348/304 |
| 2002/0159622 | A1 * | 10/2002 | Schneider et al. | 382/128 |
| 2002/0181799 | A1 | 12/2002 | Matsuga et al. | 382/260 |
| 2003/0123750 | A1 * | 7/2003 | Yu | 382/275 |
| 2003/0154357 | A1 | 8/2003 | Master et al. | 712/15 |
| 2004/0135798 | A1 * | 7/2004 | Someya et al. | 345/690 |
| 2004/0218235 | A1 * | 11/2004 | Kawano | 358/505 |
| 2005/0021578 | A1 | 1/2005 | Chen et al. | 708/230 |

FOREIGN PATENT DOCUMENTS

| | | |
|---|---|---|
| EP | 1 164 537 A2 | 12/2001 |
| JP | 05-037317 | 2/1993 |
| JP | 06-061808 | 3/1994 |
| JP | 06-176158 | 6/1994 |
| JP | 07-235839 | 9/1995 |
| JP | 09-153021 | 6/1997 |
| JP | 2679730 | 8/1997 |
| JP | 2741793 | 1/1998 |
| JP | 10-327054 | 12/1998 |
| JP | 11-015945 | 1/1999 |
| JP | 11-068477 | 3/1999 |
| JP | 11-168185 | 6/1999 |
| JP | 11-196332 | 7/1999 |
| JP | 11-266002 | 9/1999 |
| JP | 2000-013694 | 1/2000 |
| JP | 2000-181487 | 6/2000 |
| JP | 2000-331113 | 11/2000 |

OTHER PUBLICATIONS

Daugman, "Uncertainty Relation for Resolution in Space, Spatial Frequency, and Orientation Optimized by Two-Dimensional Visual Cortical Filters," 2 (7) Journal of Optical Society of America A, 1160-1169 (1985).

Funatsu et al., "Artificial Retina LSI and Its Application Systems," 53 (2) Journal of Institute of Image Information and Television Engineers, 178-183 (1999).

Kung, "Digital Neural Networks," PTR Prentice Hall, 340-361 (1993).

Lazzaro et al., "Silicon Auditory Processors as Computer Peripherals,", Advances in Neural Information Processing Systems 5, San Mateo, CA, Morgan Kaufmann Publishers, 820-827 (1993).

LeCun et al., "Convolutional Networks for Images, Speech, and Time Series," The Handbook of Brain Theory and Neural Networks (M. Arbib, Ed.), MIT Press, 255-258 (1995).

Shi, "Gabor-Type Filtering in Space and Time with Cellular Neural Networks," 45 (2) IEEE Transactions on Circuits and Systems-1: Fundamental Theory and Applications, 121-132 (1998).

Shi, "2D Focal Plane Steerable and Scalable Cortical Filters," IEEE Proc. of Seventh International Conference on Microelectronics for Neural, Fuzzy, and Bio-Inspired Systems, 232-239 (1999).

Shi, "Subthreshold Current Mode Design of Gabor-type CNN Image Filters", Proc. European Conference on Circuit Theory and Design, 1163-1169 (1999).

IEE Transactions on Neural Networks, vol. 10, No. 3, May 1999, p. 540.

Shinji Tomita, "Parallel Computer Configuration Theory", Shokodo, 1986, pp. 190-192.

C. Mead et al., "Analog VLSI and Neural Systems", Addison Wesley Pub., 1989, pp. 257-278 (Chapter 15—Silicon Retina).

B. Shi: "Focal plane implementation of 2D steerable and scalable Gabor-type filters" Journal of VLSI Signal Processing, vol. 23, 1999, pp. 319-334, (Section 4. 2D circuit architecture—Section 6. Transistor level circuit implementation).

C. Mead and T. Delbruck: "Scanners for visualizing activity of analog VLSI circuitry" Analog Integrated Circuits and Signal Processing, vol. 1, 1991, pp. 93-106.

Beerhold et al: "Pulse-processing neural net hardware with selectable topology and adaptive weights and delays" Proc. Int. Joint Conf. on Neural Networks, Jun. 17, 1990, pp. 569-574.

* cited by examiner

FIG. 15A
| CATEGORY | RELATIVE POSITION | |
|---|---|---|
| EYE | re—e1,k | re—e2,k |
| NOSE | re—n,k | |
| MOUTH | re—m,k | |
FIG. 15B
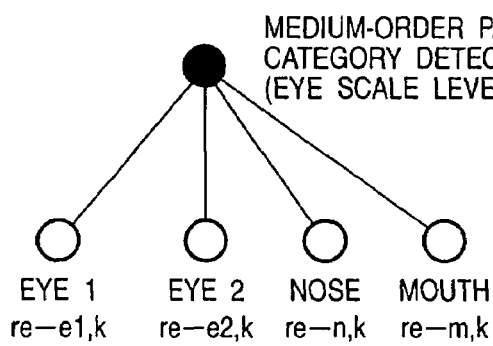
MEDIUM-ORDER PATTERN CATEGORY DETECTED FIRST (EYE SCALE LEVEL k)
EYE 1   EYE 2   NOSE   MOUTH
re—e1,k   re—e2,k   re—n,k   re—m,k
FIG. 15C
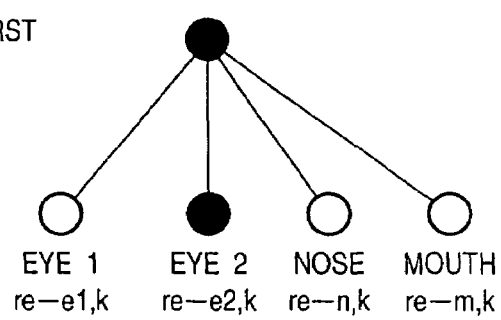
EYE 1   EYE 2   NOSE   MOUTH
re—e1,k   re—e2,k   re—n,k   re—m,k
FIG. 15D
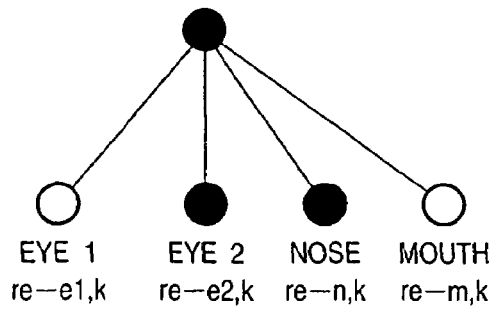
EYE 1   EYE 2   NOSE   MOUTH
re—e1,k   re—e2,k   re—n,k   re—m,k
FIG. 15E
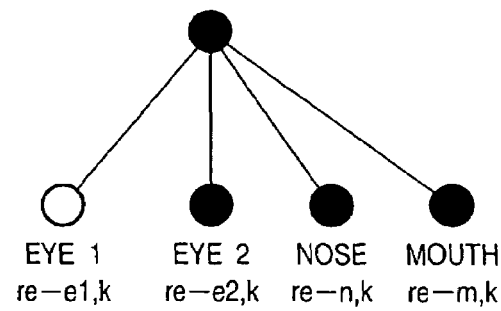
EYE 1   EYE 2   NOSE   MOUTH
re—e1,k   re—e2,k   re—n,k   re—m,k F I G. 38
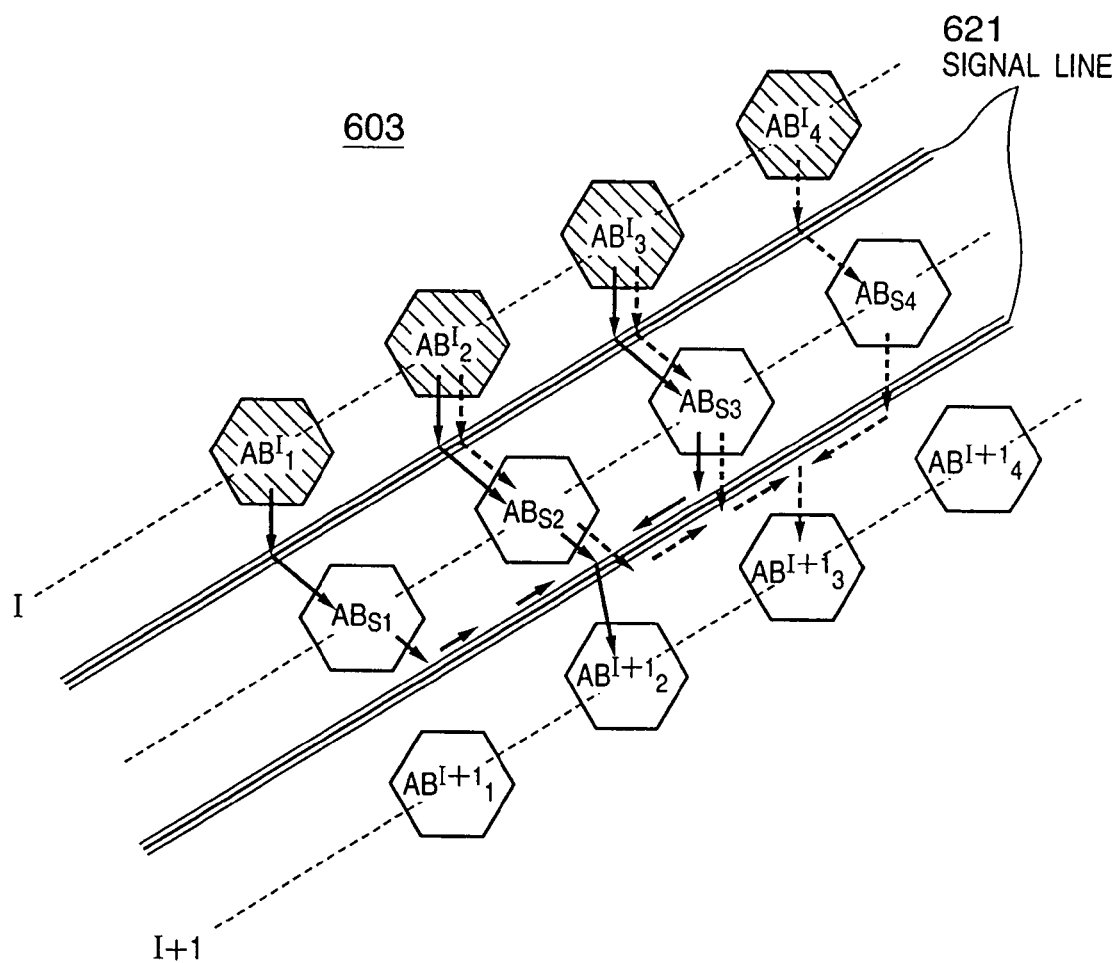

F I G. 45
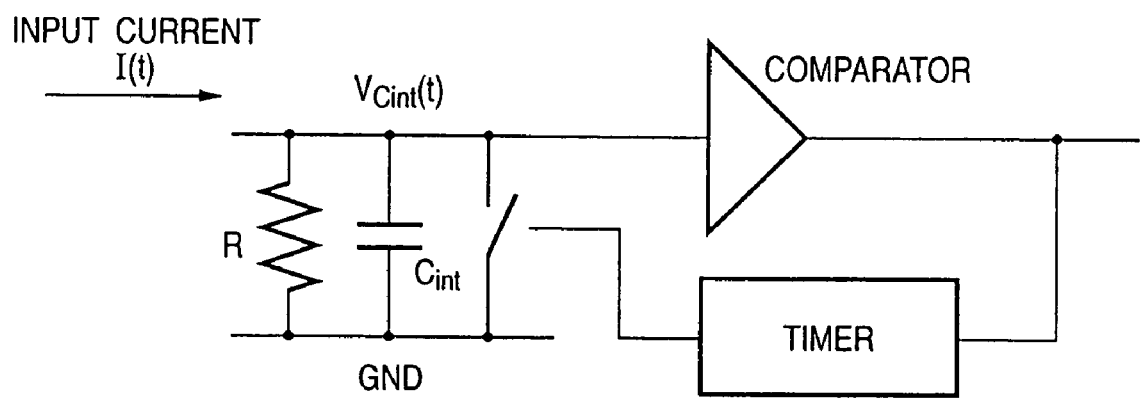

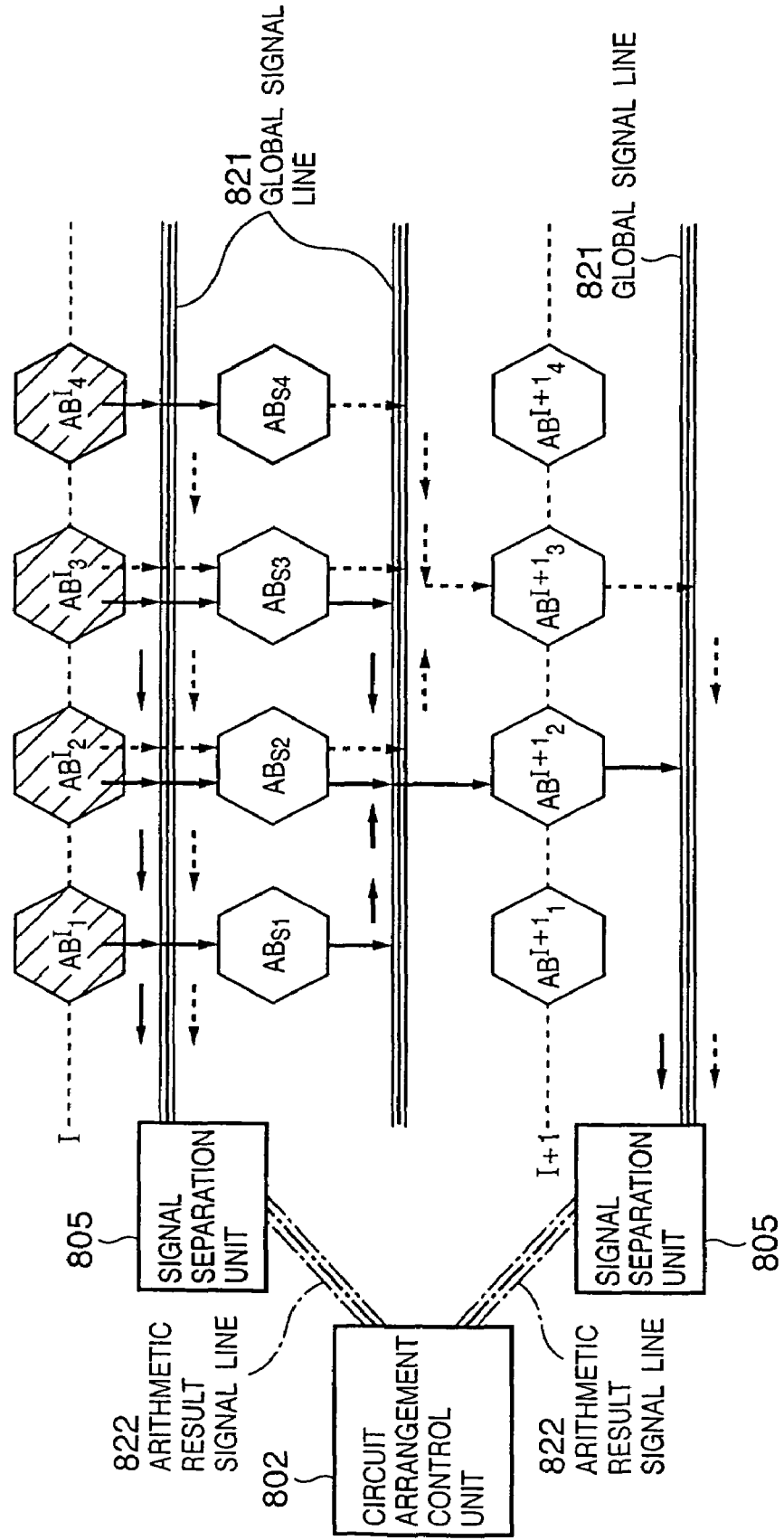

US 7,512,271 B2

DYNAMICALLY RECONFIGURABLE SIGNAL PROCESSING CIRCUIT, PATTERN RECOGNITION APPARATUS, AND IMAGE PROCESSING APPARATUS

This application is a division of patent application Ser. No. 10/105,309 filed Mar. 26, 2002.

FIELD OF THE INVENTION

The present invention relates to an image processing apparatus and, more particularly, to a circuit preferable for sensor signal processing of processing an image sensing signal from an image sensor such as a CMOS sensor and executing image processing such as recognition, detection, extraction, and the like of an object.

The present invention also relates to a pattern recognition processing apparatus using parallel calculations.

The present invention also relates to an analog-digital mixed type signal processing circuit capable of changing a circuit arrangement in accordance with processing contents.

The present invention also relates to an analog-digital mixed or merged type signal processing circuit capable of changing the circuit arrangement in accordance with processing contents and a pattern recognition apparatus using the signal processing circuit.

BACKGROUND OF THE INVENTION

Conventionally, as image sensors having an image processing function by integrating an analog processing circuit with an image sensor serving as a solid-state image sensing element, for example, semiconductor chip structures (Japanese Patent Laid-Open Nos. 2000-13694 and 11-266002) and the like are known, in which a solid-state image sensing element and a spatial filter processing function and the like are integrated.

Examples of attempts to add the early visual function of a living body to an image sensor are a study of silicon retina by Mead et al. (C. Mead, "Analog VLSI and Neural Systems", Addison Wesley Pub., 1989, U.S. Pat. No. 4,786,81) and an artificial retina LSI which integrates a pixel array, pixel access control circuit, multiplexer, and weight control circuit on one chip to realize a predetermined filtering function (Journal of the Institute of Image Information and Television Engineers Vol. 53, No. 2, pp. 178-183, 1999).

The operation of a CMOS sensor circuit will be described below as a prior art. FIG. 8 is a schematic circuit diagram of a sensor circuit (a drive circuit diagram of a CMOS sensor) disclosed in Japanese Patent Laid-Open No. 11-196332. This sensor circuit outputs a video signal to, e.g., the spatial filter circuit of the above-described image sensing signal processing circuit.

Referring to FIG. 8, photoelectric conversion elements are formed by photodiodes PD11 to PD22 ... with p-n junctions and transfer MOS transistors ST11 to ST22 ... connected to the cathodes of the photodiodes. A vertical selection circuit VSR sequentially sets outputs V1 to V8 to "H" to sequentially activate vertical selection lines HL1, HL2, .... In addition, outputs H1 to H8 from a horizontal selection circuit HSR are sequentially set to "H" to turn on horizontal transfer switch MOS transistors HT1 to HT8. Image charges accumulated in the respective pixels are time-serially read out from vertical output lines HV1 to HV8 to an output line HOL and output through an amplifier AMP.

A reset MOS transistor RES is turned on every time pixel charges are output, thereby resetting the output line HOL every time pixel charges are output. Of the photodiodes PD11 to PD22 ..., the photodiodes PD11, PD12, PD21, PD22, PD31, ... which are connected to the vertical output lines HV1 and HV2 are shielded from light on their cathode sides to extract dark charges.

FIG. 9 is a timing chart of the interlaced read of the solid-state image sensing apparatus. The pixels are read out every other pixel in the horizontal and vertical directions of photoelectric conversion elements in the effective signal range.

First, the vertical selection circuit VSR sets the output V1 to "H" to set the vertical selection line HL1 to "H". Subsequently, the outputs H1, H2, H3, H5, H7, ... from the horizontal selection circuit HSR are sequentially set to "H". With this operation, the horizontal transfer switch MOS transistors HT1, HT2, HT3, HT5, HT7, ... are sequentially turned on. Image charges accumulated in the respective pixels are time-serially read out from vertical output lines HV1, HV2, HV3, HV5, HV7, ... to the output line HOL and output through the amplifier AMP.

After the outputs H1, H2, H3, H5, H7, ... from the horizontal selection circuit HSR are sequentially set to "H", the reset MOS transistor RES is turned on to reset the output line HOL every time the pixel charges are read out, thereby eliminating the influence of adjacent pixels.

Referring to FIG. 9, an output OUT from the amplifier AMP changes to "H" first because the reference signal output photoelectric conversion elements of the photodiodes PD11 and PD12 of the pixels are shielded from light. After that, a low-potential-side level is output in accordance with the charges of the first effective signal output photoelectric conversion elements of the photodiodes PD13, PD15, and PD17. In addition to such an interlaced read, a block read for reading an arbitrary range from an entire image is also done.

The interval of the interfaced read can be arbitrarily changed. A prior art which applies a spatial filter after the above-described read is disclosed in Japanese Patent Laid-Open No. 2000-13694.

However, in the above prior art, a plurality of predetermined different geometrical features cannot be efficiently sequentially extracted from time-serially input image data by the single circuit.

In addition, to extract a plurality of predetermined different geometrical features using an array circuit in which feature extraction circuits are spatially parallelly arrayed, time-serial image signals from a sensor must be spatially separated and individually input to corresponding feature extraction circuits. Furthermore, a sensor output must have one-to-one correspondence with the address of a feature extraction circuit on the array circuit.

Image recognition or voice recognition schemes are roughly classified into a type for sequentially calculating and executing a recognition processing algorithm as computer software that is specialized to a specific recognition object and a type for executing recognition processing by a dedicated parallel image processor (e.g., an SIMD or MIMD machine).

Typical examples of image recognition algorithms for calculating a feature vector associated with the similarity to a model to be recognized are a method using similarity calculation or higher-order correlation coefficient calculation, which is done by representing the model data of an object to be recognized as a template model and executing template matching with an input image (or its feature vector), and a method using hierarchical parallel processing (Japanese Patent No. 2741793).

Especially, to fully detect even a partially occluded object to be detected, a scheme of determining the similarity to a local portion of a model to be detected is proposed in Japanese Patent Laid-Open No. 11-15945. In this proposal, matching processing between a local model and a local portion of an object is executed, and the degree of support for supporting the presence of the object at each local portion is obtained by integration processing based on the Dempster-Shafer theory or Fuzzy theory, thereby doing highly accurate detection.

In Japanese Patent Laid-Open No. 6-176158, a plurality of types of feature vectors for an input pattern are individually recognized by obtaining a single category similarity. Then, the results are normalized by the maximum similarity value to obtain the integrated similarity, thereby executing final recognition.

In Japanese Patent Laid-Open No. 9-153021, in a parallel processing apparatus which sequentially receives digital signals and integrates one or more processing results obtained by divisionally processing the digital signals by one or more processors, the digital signals are divided using a means for converting an input signal into unit signals, thereby obtaining an optimum arrangement in terms of capability or economics in accordance with the input signal.

However, of the above prior arts, the arrangement disclosed in Japanese Patent Laid-Open No. 11-15945 does not explain how to integrate matching results when object models have a plurality of categories, and which local model yields matching results to be integrated. In this prior art, confidence degrees for the presence of features by a non-additive measure are integrated on the basis of, e.g., the Dempster-Shafer theory, though it does not guarantee optimum estimation.

In addition, if the size of an object in an image is different from that of an object model, or if a plurality of objects with different sizes simultaneously exist, the method is hard to apply. Even if object models corresponding to a plurality of sizes are prepared in advance, and similarity to each model is determined sequentially for the difference sizes, it is not preferable from the viewpoint of processing efficiency or circuit scale (memory size)

In the parallel processing apparatus disclosed in Japanese Patent Laid-Open No. 9-153021, appropriate data division processing can hardly be executed when a plurality of objects having different sizes are present in image data or the like. Hence, when the type or size of object is unknown, appropriate pattern recognition can hardly be executed by parallel processing only by simply uniquely dividing data in synchronism with an input signal.

The arrangement of the pattern recognition apparatus disclosed in Japanese Patent Laid-Open No. 6-176158 cannot improve the memory efficiency or reduce the circuit scale. Generally, in an arrangement for executing pattern recognition processing using hierarchical parallel processing circuits (e.g., the arrangement disclosed in Japanese Patent No. 2741793), a plurality of features are simultaneously parallelly detected at sampling points on input data. In any of the above prior arts, hence, the number of elements in the lower layer increases depending on the size of an input image, resulting in an increase in circuit scale.

Conventionally, as a logic IC that allows a user to construct an arbitrary logic, an FPGA (Field Programmable Gate Array) is provided.

An FPGA is formed by periodically arraying a plurality of relatively large circuit blocks and interconnection blocks on a chip. A number of "devices capable of programming" electrical connection or disconnection of the circuits are arranged in the circuit blocks and interconnection blocks. A user can design connections in and between the blocks in a field (site of use) by programming (defining) these devices. Cell library blocks having various kinds of logic circuits are arrayed in a matrix in a chip. Signal interconnections are formed horizontally and vertically between the cell library blocks. Switch elements are arranged at the interunits of the interconnections and between the interconnections.

Three schemes below are employed as switch elements.

(1) Amorphous Si is inserted between metal interconnections to insulate them in the initial state. A current is supplied between desired metal interconnections to break the insulating film, thereby short-circuiting the interconnections (antifuse scheme). Conversely, metal interconnections are short-circuited in advance using polysilicon or the like and then disconnected by a laser or the like (fuse scheme).

(2) A normal MOS transistor is used as a switching element, and the potential state of its gate is stored in a memory. As the memory, a volatile DRAM or SRAM, or a nonvolatile EEPROM is used. Use of a ferroelectric memory (FRAM) is also proposed. A volatile memory must receive the information of logic connection and wiring connection into the FPGA every time it is used. However, this memory can be a Reconfigurable Logic capable of changing information a number of times. To the contrary, a nonvolatile memory can maintain the information of logic connection and wiring connection even when the power supply is turned on/off.

(3) A switching element itself is formed from an EEPROM or the like to store the ON/OFF information of a transistor.

In designing a logic system using an FPGA, a desired logic function is described by an HDL (Hardware Description Language) using a support tool provided by an EDA vendor, and logic circuit data (the type of logic gate to be used and inter-terminal connection information) is obtained using a logic synthesizing tool. To implement the resultant logic circuit, the logic operation data of a basic logic cell CLB and connection data between the basic logic cells CLB are obtained. In addition, interconnections to be used and the ON/OFF control data of a cross-point switch CSW are determined from the connection data, thereby building a whole logic circuit system. Such logic design can easily be done by the user, and its convenience is widely recognized.

Arrangements disclosed in Japanese Patent Laid-Open Nos. 11-168185 and 2000-331113 are known as methods of reconfigurably connecting an analog processing element using an FPGA. In the former arrangement, an FPGA is formed on one surface of a stacked substrate, an analog processing circuit is formed on the other surface, and input and output terminals and an interface circuit, which connect the FPGA and analog processing circuit, are prepared. In the latter arrangement, first and second analog signals are converted into PWM (Pulse Width Modulation) signals and input to an FPGA circuit, and logical operation of the two PWM signals is executed by the FPGA circuit, thereby allowing reconfiguration.

A hierarchical neural network disclosed in Japanese Patent No. 2679730 is related to the architecture of a hierarchical neural network that allows time-divisionally multiplexed use of single-layered hardware, and has as its object to allow equivalently making a multi-layered structure by time-divisionally using single-layered hardware. This prior art discloses a hierarchical neural network formed by connecting a plurality of neuron models to each other, comprising a single-layered unit assembling means for forming a single-layered unit assembly by installing a plurality of units of neuron models which allow to time-divisionally output a voltage through a nonlinear output function by generating a product of a time-divisionally multiplexed analog signal and external digital weight data and by time-divisionally adding the product through a capacitor to integrate the product, a feedback means for feeding back the output from the single-layered unit assembling means to the input unit of the same single-unit assembly, and a control means for executing control to time-divisionally multiplex analog signals from units, which are output from the single-layered unit assembling means, and to time-divisionally use the single-layered unit assembling means through the feedback means, wherein the single-layered unit assembling means is time-divisionally used to equivalently form a neural network having a hierarchical structure.

In an FPAA (Field Programmable Analog Array) circuit according to U.S. Pat. No. 5,959,871, programmable analog processing cells including a multiplexer, demultiplexer, control circuit, and analog processing element are parallelly arrayed through signal lines, thereby executing programmable analog processing.

In all the above prior arts, a so-called FPGA is based on a logic circuit. That is, only the connection state between logic blocks can be changed. Hence, only with the FPGA, analog parallel arithmetic processing of a neural circuit network or like cannot be implemented.

In applying the arrangement of Japanese Patent Laid-Open. No. 11-168185 to a neural circuit network, when the number of neural elements increases, the number of input/output terminals exponentially increases, resulting in difficulty in handling. For this reason, in principle, it is difficult to set an arbitrary interconnection structure, and a special process for mounting the elements on a stacked substrate is required. In the arrangement disclosed in Japanese Patent Laid-Open No. 2000-331113, it is basically possible to form a pseudo addition circuit or pseudo integration circuit for two analog signals. However, it is difficult to implement a large-scale parallel hierarchical processing circuit.

In the hierarchical neural network disclosed in Japanese Patent No. 2679730, since no means for variably arbitrarily controlling the inter-layer connection is prepared, the number of types of processing that can be substantially realized is considerably limited.

In the arrangement according to U.S. Pat. No. 5,959,871, each of the analog processing units (cells) has a control circuit, analog processing circuit element, signal branch circuit, and the like. For this reason, the scale of the circuit component (analog processing cell) becomes very large, and therefore, the total circuit area inevitably increases. Additionally, in a structure in which analog processing units each incorporating a multiplexer and demultiplexer are arrayed on a two-dimensional plane, it is difficult to realize an arbitrary connection structure and, more particularly, hierarchical connection.

SUMMARY OF THE INVENTION

The present invention has been made in consideration of the above-described problems, and has as its object to make it possible to efficiently sequentially extract a plurality of predetermined different geometrical features from time-serially input image data.

It is another object of the present invention to efficiently and stably execute different spatial filter processing operations for a sensed image by making a temporally modulated spatial filter output synchronous with the sensor output timing.

It is still another object of the present invention to make it possible to control the interconnection structure between arithmetic processing blocks and a signal processing function including modulation by the arithmetic processing blocks and to construct various circuits by a small number of basic circuit arrangements.

It is still another object of the present invention to make it possible to switch the circuit arrangement and circuit characteristic of an arithmetic processing block and commonly use it for a plurality of signal processing operations, thereby reducing the circuit scale.

It is still another object of the present invention to make it possible to omit unnecessary switching of the circuit arrangement and circuit characteristic in switching the function of an arithmetic processing block, thereby reducing power consumption.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 15A to 15E are views showing list structure data representing the layout relationship between medium-order features and a feature detection process related to the medium-order features;

FIG. 38 is a view showing the arrangement of main part of a reconfigurable arithmetic processing circuit 603 according to the 12th embodiment;

FIG. 45 is a circuit diagram showing the basic arrangement of a pulse generation circuit serving as a neuron element;

FIG. 59 is a view showing another arrangement of a neural circuit network implemented as a reconfigurable analog-digital mixed (merged) circuit according to the 21st embodiment.

DETAILED DESCRIPTION OF THE PREFERRED EMBODIMENTS

Preferred embodiments of the present invention will now be described in detail in accordance with the accompanying drawings.

First Embodiment

Figure 1:
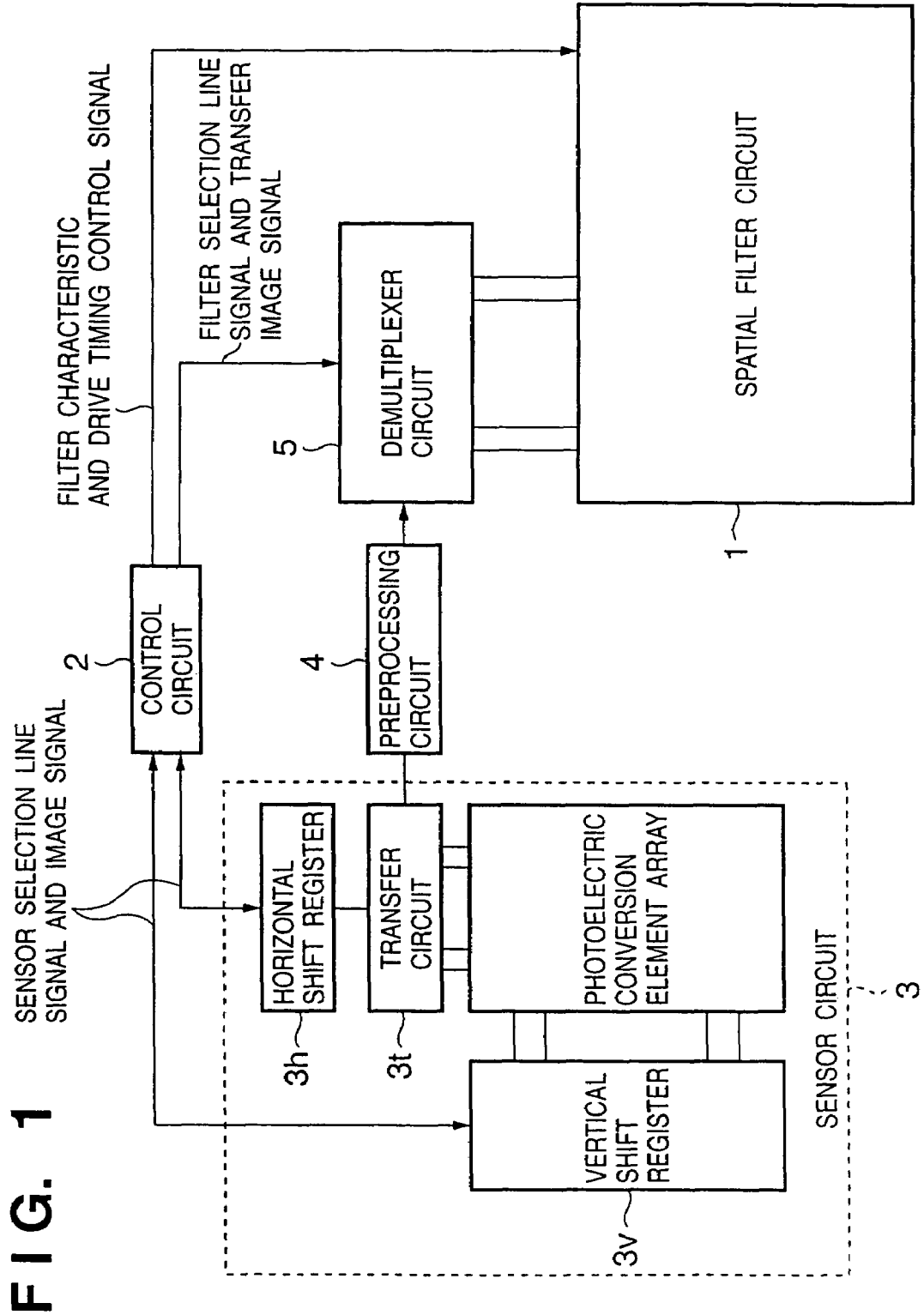
FIG. 1 is a block diagram showing the arrangement of main part of an image sensing signal processing circuit according to the first embodiment.

FIG. 1 is a block diagram showing the overall arrangement of an image sensing signal processing circuit according to the first embodiment.

Referring to FIG. 1, a spatial filter circuit 1 time-serially executes predetermined spatial filter operations having different characteristics at points corresponding to the respective pixel positions, on the sensor, of a video signal input from a sensor circuit 3. The spatial filter circuit 1 has a function of time-serially extracting different geometrical image features for regions with a predetermined size around the respective points of a video signal.

A control circuit 2 outputs a predetermined read control pulse signal to the sensor circuit 3 in accordance with a predetermined timing and also outputs a timing pulse signal synchronous with the read control pulse signal to the spatial filter circuit 1, thereby synchronously processing the output from the sensor circuit 3 and the spatial filter circuit 1, as will be described later. Detailed control of the spatial filter circuit 1 will be described later.

Figure 2:
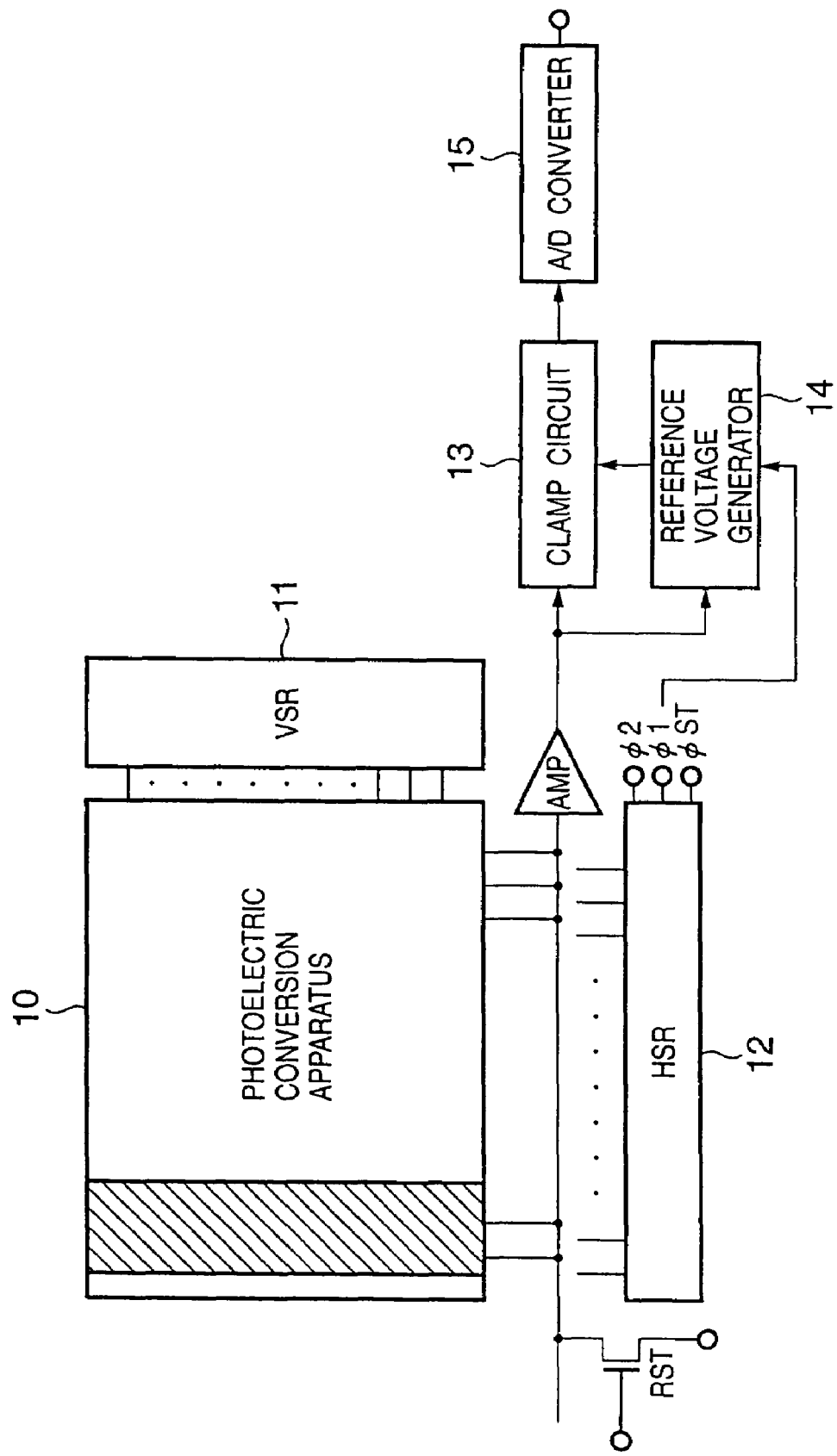
FIG. 2 is a block diagram showing the arrangements of a sensor circuit and preprocessing circuit.

An example of image signal read and its preprocessing will be described next in detail with reference to FIG. 2.

In a photoelectric conversion apparatus 10 in which photoelectric conversion elements are arrayed in a matrix, horizontal lines are sequentially activated by a vertical selection circuit VSR 11, and image signals from reference signal output photoelectric conversion elements and effective signal output photoelectric conversion elements are sequentially output through an amplifier AMP by a horizontal selection circuit HSR 12. Note that the photoelectric conversion apparatus 10, vertical selection circuit VSR 11, and horizontal selection circuit HSR 12 correspond to a photoelectric conversion element array, vertical shift register 3v, and horizontal shift register 3h in FIG. 1, respectively.

The output from the solid-state image sensing apparatus having the above arrangement is input to a reference voltage generator 14 during the output period of the reference signal output photoelectric conversion elements to generate a reference voltage. When the number of reference signal output photoelectric conversion elements is 2, the average value of the outputs is defined as, e.g., a reference voltage.

During the output period of the effective signal output photoelectric conversion elements, the output is input to a clamp circuit 13 and clamped to the reference voltage of the reference voltage generator 14. The reference voltage corresponding to dark charges in the same horizontal line of the photoelectric conversion apparatus is subtracted from the photocharge voltage of the effective signal output photoelectric conversion elements, thereby obtaining an image signal corresponding to the photocharges.

In this case, the reference voltage of the reference voltage generator 14 is reset after one horizontal line is read, and newly generated by the reference signal output photoelectric conversion elements in reading another horizontal line. The difference between the reference voltage and the photocharge voltage of the effective signal output photoelectric conversion elements is calculated to output a substantial image signal. The output from the clamp circuit 13 is converted into a digital signal by an A/D converter 15 and subjected to spatial filter processing to be described below.

<Arrangement and Operation of Spatial Filter Circuit>

Figure 3:
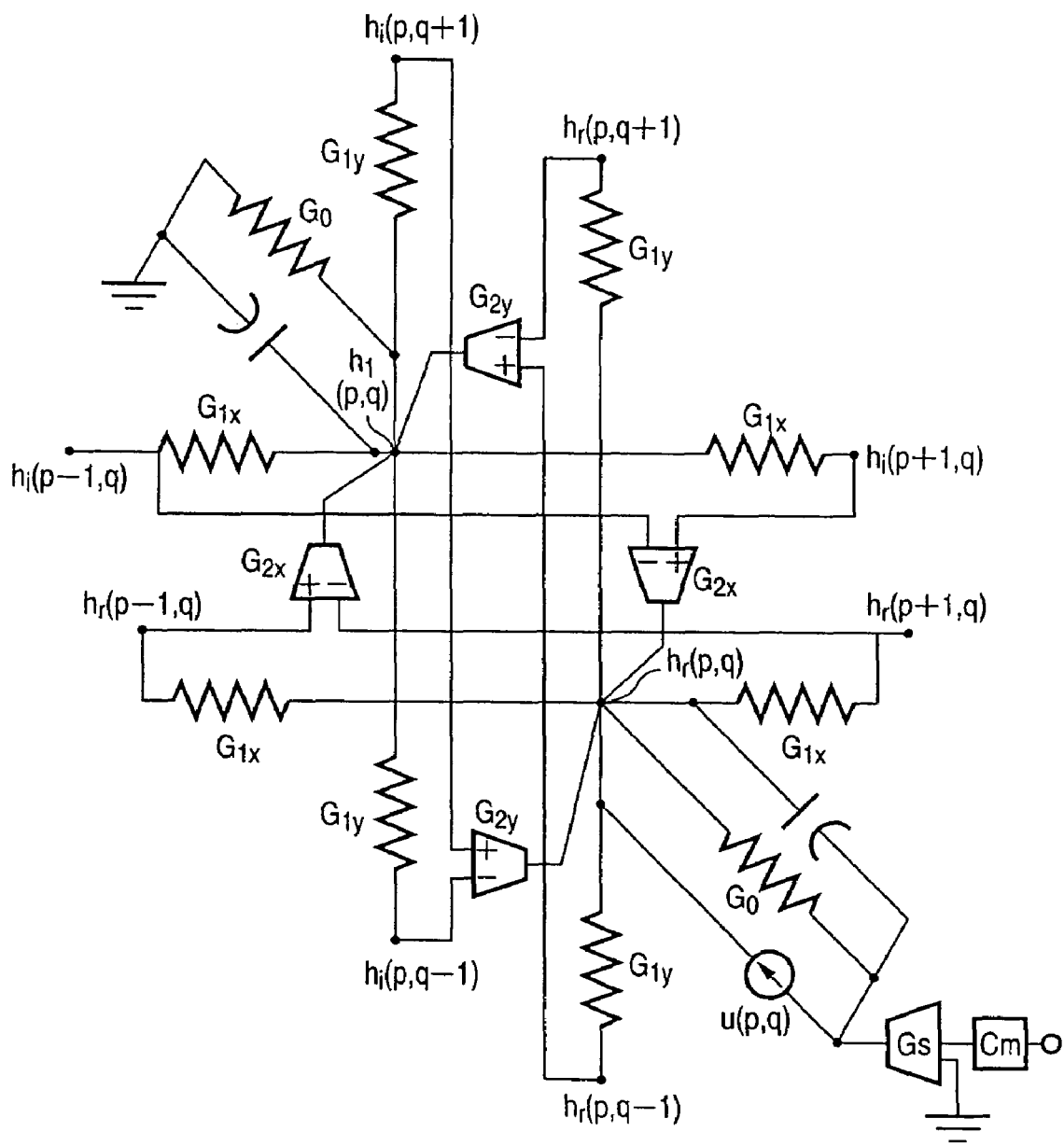
FIG. 3 is a view showing the arrangement of a spatial filter circuit element.

FIG. 3 is a view showing a simplified arrangement of a spatial filter circuit element used in this embodiment. FIG. 3 illustrates outputs ($h_r(p\pm1,q\pm1)$, $h_i(p\pm1,q\pm1)$) at adjacent pixel positions ($p\pm1,q\pm1$) closest to a pixel position (p,q). In the spatial filter circuit 1, these circuit elements are two-dimensionally arrayed.

Referring to FIG. 3, $h_r(p,q)$ and $h_i(p,q)$ represent the real and imaginary parts of a filter output (to be described below) in correspondence with the pixel position (p,q) on the sensor, respectively. Input/output control of the spatial filter element circuit will be described later.

The spatial filter used here is a Gabor filter or a so-called Gabor-type filter which outputs a signal approximate to a Gabor filter output. This filter has a spatial frequency selectivity in a predetermined direction, i.e., a direction selectivity (to have a sensitivity for edge components having a predetermined range of orientations in image) and a scale selectivity (to have a sensitivity for the size of a predetermined range in an image or the geometrical feature of a spatial frequency).

In this embodiment, Gabor wavelet transform is performed for an input image by multiple scale processing using a Gabor-type filter. For a method and circuit for Gabor wavelet transform, see, e.g., IEEE Trans. on Acoustics, Speech, and Signal Processing, vol. 36, pp. 1169-1179 (1988) and IEEE Trans. on Circuits and Systems-I: Fundamental Theory and Applications, vol. 45, pp. 121-132 (1998).

The spatial filter used in this embodiment can control these selectivities by the characteristic of a circuit element (the conductance or the gain of an amplifier). FIG. 3 shows the arrangement of a circuit element which performs Gabor-type filtering operation for a local region around the given point (p,q) in an input image, which is based on reference 1 (B. E. Shi, "2D Focal Plane Steerable and Scalable Cortical Filters", Proc. of Seventh International Conference on Microelectronics for Neural, Fuzzy, and Bio-Inspired Systems, pp. 232-239, 1999).

Referring to FIG. 3, each trapezoidal element is typically a transconductance amplifier using five MOS transistors (an arrangement for changing a gain is disclosed in, e.g., Japanese Patent Laid-Open Nos. 7-235839 and 11-68477).

Each resistive element is formed from a CMOS transmission gate (formed from, e.g., two CMOS transistors; reference 2: B. E. Shi, "Subthreshold Current Mode Design of Gabor-type CNN Image Filters", Proc. European Conference on Circuit Theory and Design, pp. 1163-1169, 1999). The label G of each resistive element indicates a conductance, and the label G of each transconductance amplifier indicates a gain. The filter circuit can operate each transistor either above or below a threshold value.

Image data input to the filter circuit will be described next. A pixel signal is sent from the sensor circuit 3 driven by the read control pulse signal output from the control circuit 2 to a memory element $C_m$ in FIG. 3 at a predetermined timing.

The memory element and a transconductance amplifier $G_s$ form the input unit of the spatial filter element circuit whose address (pixel position) is (p,q). A memory element and transconductance amplifier are present for each address (each filter element circuit). The filter output is read after image signal transfer to the input units (memory elements $C_m$) of the filter element circuits is complete.

The pixel signal is temporarily held as a voltage signal by the memory element $C_m$ connected to the transconductance amplifier $G_s$ of the input unit. When the output from the spatial filter circuit is read by a predetermined filter output read signal from the control circuit, the contents of the memory elements are rewritten. The data held by the memory element is converted from the voltage to a current by the transconductance amplifier $G_s$ and input as u(p,q).

With the above-described spatial filter circuit element, the direction selectivity and scale selectivity with a predetermined width centered on a spatial frequency ($w_{x0},w_{y0}$) are obtained. Note that $w_{x0}=\text{atan}(G_{2x}/G_{1x})$ and $w_{y0}=\text{atan}(G_{2y}/G_{1y})$. A central direction θ of direction selectivity is given by $\theta=\text{atan}(W_{y0}/w_{x0})$.

<Outline of Control of Spatial Filter Circuit>

Processing of extracting a geometrical feature in a local region around a predetermined sampling point of an input image by a filter array circuit in which the above-described spatial filter elements are two-dimensionally arrayed will be described next. A filter characteristic & drive timing control signal for the spatial filter array circuit is output from the control circuit shown in FIG. 2 to the respective filter element circuits (FIG. 3) at once.

That is, the filter characteristic & drive timing control signal controls (updates) the respective filter characteristics of the filter element circuits at once. The above-described sensor circuit 3 executes interlaced read scanning for input image data at a predetermined interval and outputs image signal data.

As a drive timing control signal that updates the characteristic of the spatial filter circuit 1, a control signal synchronized with the output timing of one frame from the spatial filter circuit array is output from the control circuit 2.

In addition, image signal data at a corresponding address is read out from the sensor (photoelectric conversion element array) to the vertical and horizontal selection circuits in the sensor circuit 3 in accordance with a read control signal (sensor selection line signal in FIG. 1) synchronized with the control signal.

A timing control signal (filter selection line signal in FIG. 1) is output, through a demultiplexer, to a predetermined spatial filter element circuit in the filter array circuit, which is specified by the sensor selection line signal (address in the input image). With this operation, image signal data at an address designated by a sensor selection line signal is transferred to a corresponding spatial filter element circuit.

Every time a filter selection line signal is received, each spatial filter element circuit receives image data from the sensor after setting $G_0$, $G_{1x}$, $G_{1y}$, $G_{2x}$, and $G_{2y}$ in FIG. 3 (by the filter characteristic control signal from the control circuit 2) such that the spatial filter characteristic is represented by a set of parameter values to which the preset direction selectivity and scale selectivity belong.

Detailed examples of parameter values are as follows. When a scale parameter $\Omega^{-1}=[w_{x0}^2+w_{y0}^2]^{-0.5}$ is set using the spatial frequency selectivity parameter, and selectivity parameters $\Omega$ and $\theta$ are given, characteristic values to be set for the resistors and amplifiers are given by $$G_{1x}=\alpha^2 \cos(\Omega \cos \theta),$$

$$G_{2x}=\alpha^2 \sin(\Omega \cos \theta),$$

$$G_{1y}=\alpha^2 \cos(\Omega \sin \theta),$$

$$G_{2y}=\alpha^2 \sin(\Omega \sin \theta),$$

$$G_0=\alpha^2[(\Delta\Omega)^2+4-2\cos(\Omega \cos \theta)-2\cos(\Omega \sin \theta)]$$

for $$\alpha^2 G_{2(max)}[1+\cot^2\Omega]^{0.5} \text{ and } \Delta=\lambda/(\alpha\Omega) \qquad \text{(reference 1)}.$$

After image data transfer to all the spatial filter circuit elements for a predetermined filter characteristic is complete, a spatial filtering result with the set filtering characteristic is read out.

<About Gabor Filter and Gabor Wavelet Transform>

Gabor (type) filtering executed by each spatial filter will be described next. A Gabor function is obtained by modulating a sine wave having a predetermined direction component and spatial frequency by a Gaussian function (a non-Gaussian function for a Gabor-type filter). Its characteristic is set by an index m of scaling level and an index n of direction component (to be described below).

A set of filter functions as a wavelet have a similar function shape and different main directions and magnitudes. As is known, in this wavelet, the functional shape localizes both in the spatial frequency domain and in the real space domain, the conjoint uncertainty for the position and spatial frequency is minimum, and the function is localized most both in the real space and in the frequency space (J. G. Daugman, Uncertainty relation for resolution in space, spatial frequency, and orientation optimized by two-dimensional visual cortical filters, Journal of Optical Society of America A, vol. 2, pp. 1160-1169 (1985)).

$$g_{(mn)}(x, y) = \frac{a^{-m}}{2\pi\sigma_x\sigma_y} \exp[h_{mn}(x, y)] \qquad (1)$$

$$h_{mn}(x, y) = -\frac{1}{2}\left\{ \frac{(x\cos\theta_n + y\sin\theta_n)^2}{a^{2m}\sigma_x^2} + \frac{(-x\sin\theta_n + y\cos\theta_n)^2}{a^{2m}\sigma_y^2} \right\} - \frac{i2\pi W(x\cos\theta_n + y\sin\theta_n)}{a^m}$$

where (x,y) is the position in the image, a is the scaling factor, $\theta_m$ is the direction component of the filter, W is the fundamental spatial frequency, $\sigma_x, \sigma_y$ are the parameters that give the magnitudes of spread in the x- and y-directions of the filter function. In the circuit arrangement shown in FIG. 3, the Gaussian function in (1) is approximated by the Laplacian.

In this embodiment, the direction selectivity parameter $\theta_n$ takes values of 0°, 30°, 60°, 90°, 120°, and 150° in six directions, a is 2, and the scale selectivity parameter m is given by an integer that takes values 1 to 3. In the actual circuit arrangement, these selectivities are realized by appropriately controlling the characteristic values (the conductance values and the gains of the conductance amplifiers) of the circuit element shown in FIG. 3.

Since the size (spread) of the Gabor filter kernel ($g_{mn}$ of equations (1)) changes depending on the scale index m, Gabor filters having different scale indices have different size selectivities. In this example, the fact that when it is assumed that the circuit array shown in FIG. 3 is infinite, its transfer function has a spatial frequency selectivity (scale selectivity) (reference 1) is used.

At input time t of the above-described drive timing control signal, the characteristic parameters of a selected filter are given by m(t) about the scale selectivity and n(t) about the direction selectivity. For each filter having the selected spatial filter characteristics, two-dimensional convolution of $g_{m(t)n(t)}$(x,y) and an input grayscale image is executed (actually, for the circuit element shown in FIG. 3, a transform output equivalent to convolution with $g_{m(t)n(t)}$(x,y) with a Laplacian function shape is obtained), thereby executing Gabor wavelet transform. That is, $$W_{m(t)n(t)}(x, y) = \int I(x_1, y_1)g^*_{m(t)n(t)}(x - x_1, y - y_1)dx_1 dy_1 \qquad (2)$$

$$= A_{m(t)n(t)}(x, y)\exp\{iP_{m(t)n(t)}(x, y)\}$$

where I is the input image, $W_{m(t)n(t)}$ is the Gabor wavelet transform coefficient. A set of $W_{m(t)n(t)}$ (m(t)=1, 2, 3; n(t)= 1, . . . , 6) is obtained at each point as a feature vector. "*" indicates a complex conjugate.

The outputs of the spatial filter array of the circuit element shown in FIG. 3, i.e., $h_r$(p,q) and $h_i$(p,q) have a relationship given by $W_{m(t)n(t)} \approx h_r(p,q)+jh_i(p,q)$.

Each spatial filter element circuit outputs a wavelet transform coefficient value obtained by product-sum input of distributed weight coefficients and image data. That is, for data of all frames from the sensor output, the outputs from the spatial filter circuit elements to which a predetermined filter characteristic is given are time-serially read out. In a similar way, filter outputs when a series of different filter characteristics are given are read out. Consequently, as the time-serial output of the entire spatial filter array (a set of values corresponding to $W_{mn}$ across the range of values that the indices m and n of equation (2) can take), the Gabor wavelet transform represented by equation (2) is executed.

The time-serial output results for the respective filter characteristics updated in the following way are temporarily and individually stored in a plurality of temporary storage units (or in a single temporary storage means at once) as two-dimensional array data, and subsequent processing (e.g., image recognition processing) is executed. For example, if the subsequent processing module that receives the spatial filter output is a neural network circuit formed by parallelly and hierarchically connecting a plurality of arithmetic elements, the above-described two-dimensional array data is (e.g., converted into a voltage signal) normally simultaneously output to the neural elements of the input layer at once.

<Transfer Control of Image Data from Sensor Circuit>

Referring back to FIG. 1, every time the characteristic parameters (m,n) of the Gabor-type spatial filter array circuit 1 are updated, the control circuit 2 outputs control signals for corresponding resistance values and amplifier gains in the spatial filter circuit element.

More specifically, the control circuit 2 outputs gate voltage control signals ($V_{G1x}$, $V_{G1y}$, $V_{G0}$) for the transistors that form CMOS transmission gate circuits of the resistors and gain control signals ($V_{G2x}$, $V_{G2y}$) for the transistors that form transconductance amplifiers as filter characteristic control signals such that the characteristics of the respective spatial filter circuit elements are updated at once.

Figure 4:
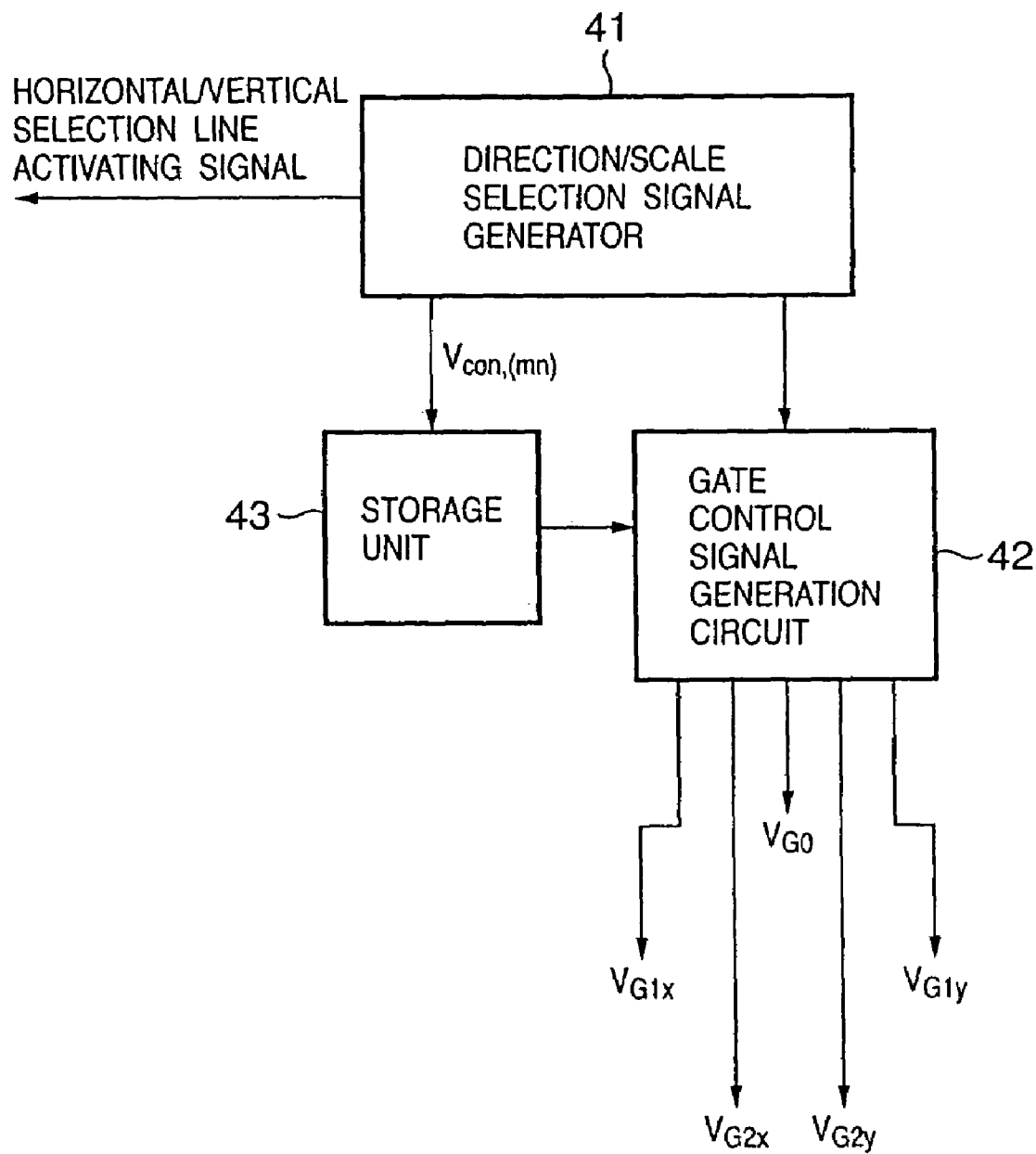
FIG. 4 is a block diagram showing the block arrangement of a control circuit used in the first embodiment.

The arrangement and the like of the control circuit 2 will be described below with reference to FIG. 4. The control circuit 2 stores, in an internal storage unit 43, a table of data of sets of control signal values that give a set of conductance values and amplifier gain values ($G_0$, $G_{1x}$, $G_{1y}$, $G_{2x}$, $G_{2y}$) unique to the set (m,n) of the indices of the scale and direction selectivities of the Gabor-type filter. When $V_{con,(D3)}$ is input from a direction/scale selection signal generator 41 as a control signal corresponding to each set of index, a gate control signal generator 42 outputs control signals $V_{G1x}$, $V_{G1y}$, $V_{G2x}$, $V_{G2y}$, and $V_{G0}$ that give the following conductance values and amplifier gain values to the transistors of the resistors and amplifiers of the spatial filter circuit element shown in FIG. 3.

That is, when $G_{1x(mn)}$, $G_{2x(mn)}$, $G_{1y(mn)}$, $G_{2y(mn)}$, and $G_{0(mn)}$ are given in correspondence with $V_{con,(mn)}$, the control signal levels $V_{G1x}$, $V_{G1y}$, $V_{G2x}$, $V_{G2y}$, and $V_{G0}$ corresponding to them are stored in the memory in correspondence with the index set (m,n). Using the central direction $\theta_n$ and center spatial frequency $\Omega_m$, the values $G_{1x(mn)}$, $G_{2x(mn)}$, $G_{1y(mn)}$, $G_{2y(mn)}$, and $G_{0(mn)}$ are given by $$G_{1x,(mn)} = \alpha_m^2 \cos(\Omega_m \cos\theta_n),$$

$$G_{2x,(mn)} = \alpha_m^2 \sin(\Omega_m \cos\theta_n),$$

$$G_{1y,(mn)} = \alpha_m^2 \cos(\Omega_m \sin\theta_n),$$

$$G_{2y,(mn)} = \alpha_m^2 \sin(\Omega_m \sin\theta_n),$$

$$G_{0,(mn)} = \alpha_m^2 [(\Delta_m \Omega_m)^2 + 4 - 2\cos(\Omega_m \cos\theta_n) - 2\cos(\Omega_m \sin\theta_n)]$$

for $$\alpha_m^2 = G_{2(max)}[1+\cot^2\Omega_m]^{0.5} \text{ and } \Delta_m = \lambda/(\alpha_m \Omega_m)$$

Control signal lines to the resistors and amplifiers are wired to predetermined transistors of the circuit element shown in FIG. 3, though they are not illustrated for the illustrative convenience.

The control circuit 2 outputs, to the horizontal selection circuit 3h and vertical selection circuit 3v in the sensor circuit 3, selection line signals for lines that should be sequentially set to "H" in the horizontal and vertical selection lines in synchronism with the output timing of the control signal from the above-described direction/scale selection signal generator 41.

More specifically, when the updated selection signal $V_{con,(mn)}$ is output, activating signals of the horizontal and vertical selection line signals are output to the sensor in synchronism with the output timing of the control signal. In the sensor circuit 3, upon receiving the activating signals, selection line signals for lines that should be sequentially set to "H" are output, and the pixel signal of a pixel for which both the horizontal selection line and vertical selection line are activated is output from the sensor to the above-described spatial filter circuit 1.

The pixel signal read out as a time-series signal is transferred to the input unit of the spatial filter circuit element (FIG. 3) selected by a demultiplexer circuit 5. The demultiplexer circuit 5 can have a normally used circuit arrangement (e.g., comprises a switch array and its activating circuit). The demultiplexer circuit 5 receives the preprocessed pixel signal and selection line signal and outputs a corresponding pixel signal to a Gabor-type spatial filter circuit element with corresponding address to the read pixel position in the input image, which is determined by the selection line signal.

The read of the output from the Gabor-type spatial filter array circuit 1 will be described next. The read is done after the scale parameter m and direction component parameter n to be set by the direction/scale selection signal generator 41 in the control circuit 2 are updated, and all pixel signals to be input to the filter circuit elements are transferred.

The transfer end timing of image data read out in correspondence with the parameters (m,n) of the Gabor-type filter to the filter circuit element is detected by inputting the last selection line signal. After the elapse of a predetermined delay time determined by the device characteristics, the spatial filter output is read out and stored in a temporary storage means as a plurality of two-dimensional array data (spatial filter array outputs for the same characteristic). Alternatively, these two-dimensional array data may be directly output to the subsequent processing module as time-serial data.

The read of the spatial filter output is done after a predetermined delay time from the filter selection line signal output synchronized with the sensor selection line signal from the control circuit 2. For this reason, the spatial filter output can always be extracted while holding a predetermined time correspondence with the image signal output from the sensor.

In addition, when the timings of the data read from the sensor and control of the spatial filter characteristic are appropriately controlled, the above-described correspondence between the spatial filter output and the sensor output can be obtained while reducing the circuit scale.

When the subsequent processing module is a parallel arithmetic apparatus such as a neural network circuit, the readout time-serial filter outputs are branched and output by a demultiplexer circuit to the elements of the input stage of the apparatus. The input unit of each element has a sample-and-hold circuit or temporary storage memory element for holding the value of the input data. Alternatively, the time-serial filter outputs may be written in a predetermined block memory element as two-dimensional array data and then output to the input element array of the parallel arithmetic apparatus at once.

In the first embodiment, address control or transfer control of the sensor circuit 3 is executed on the basis of the timing control of the spatial filter circuit 1. The same control as described above may be executed on the basis of the output timing of an intermediate processing circuit other than the above-described spatial filter, e.g., the pattern recognition circuit.

The arrangement of an image sensing apparatus (image input apparatus) having the above-described image sensing signal processing circuit which performs spatial filtering will be described next.

A case wherein focusing to a specific object or color correction or exposure control of a specific object is executed by mounting in an image sensing apparatus a pattern recognition (detection) apparatus using the image sensing signal processing circuit according to this embodiment will be described with reference to FIG. 5.

Figure 5:
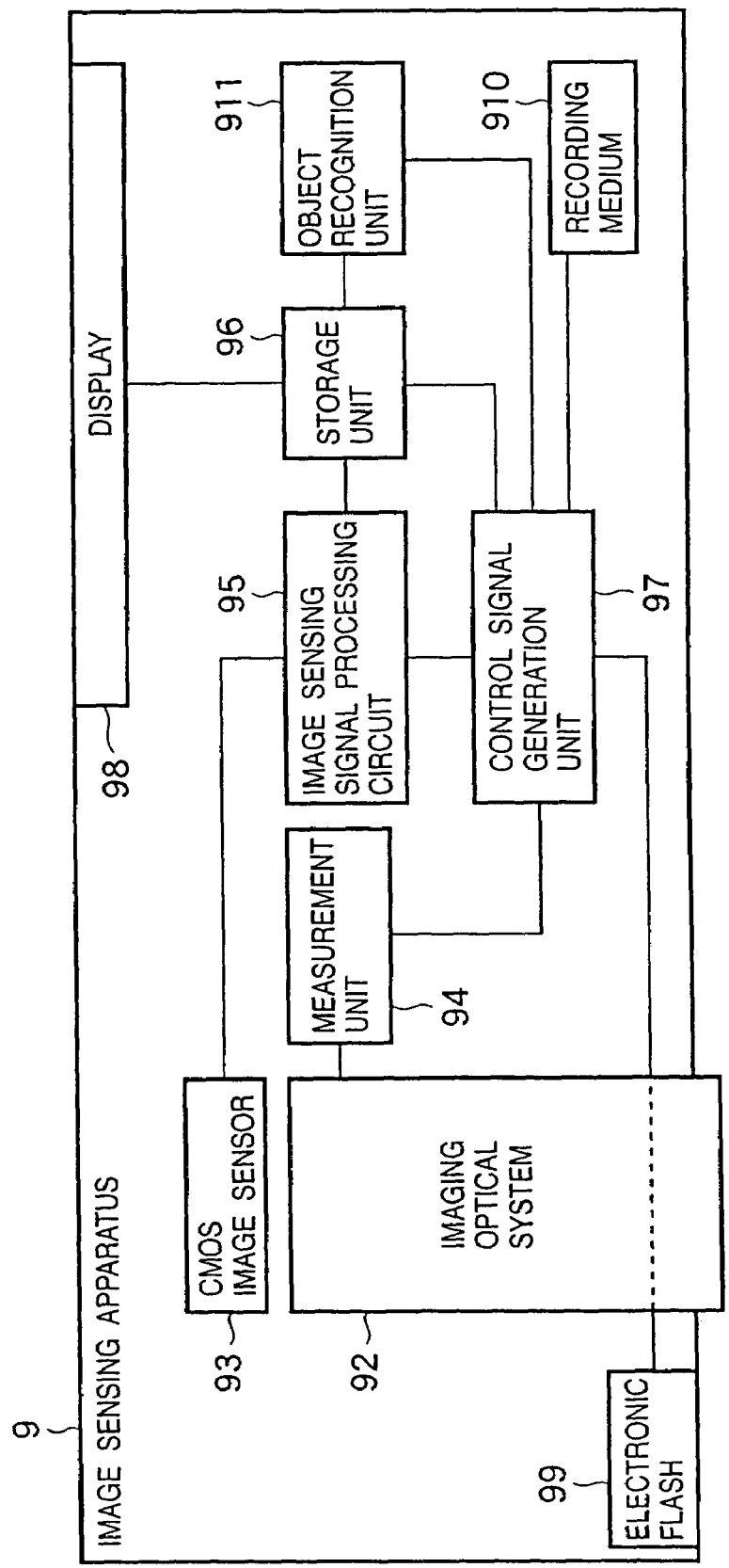
FIG. 5 is a block diagram showing the arrangement of an image sensing apparatus for recognizing an object, which has the image sensing signal processing circuit of the first embodiment.

An image sensing apparatus shown in FIG. 5 has an imaging optical system 92 including a photographing lens and zoom photographing drive control mechanism, a CMOS image sensor 93, an image sensing parameter measurement unit 94, an image sensing signal processing circuit 95 which performs spatial filter operation of this embodiment, a storage unit 96, a control signal generation unit 97 for generating a control signal to control the image sensing conditions, a display 98 that also serves as a viewfinder such as an EVF, an electronic flash 99, a recording medium 910, and an object recognition unit 911. The object recognition unit 911 has a function of detecting a pattern of a specific category from an image using a Gabor-type wavelet transform output from the image sensing signal processing circuit 95.

This image sensing apparatus 9 detects the facial image (detects the position and size) of a person, which is registered in advance, from, e.g., a photographed video image using the object recognition unit 911. The position and size information of the person are input to the control signal generation unit 97. The control signal generation unit 97 generates a control signal for optimizing focus control, exposure condition control, and white balance control for that person on the basis of the output from the image sensing parameter measurement unit 94.

When the pattern detection (recognition) apparatus using the image sensing signal processing circuit according to this embodiment is used in the image sensing apparatus, as described above, the object detection (recognition) function can be realized with a small circuit scale at low power consumption and high speed (in real time). On the basis of the result, detection of a person and optimum control (AF, AE, and the like) of photography based on it can be executed.

This embodiment is applied when the sensor circuit 3, control circuit 2, preprocessing circuit 4, and spatial filter circuit 1 shown in FIG. 1 are formed on separate semiconductor chips or on a single semiconductor chip.

However, when the circuits shown in FIG. 1 are formed on a single semiconductor chip by a CMOS process or the like, this embodiment exhibits a better effect.

Second Embodiment

Figure 6:
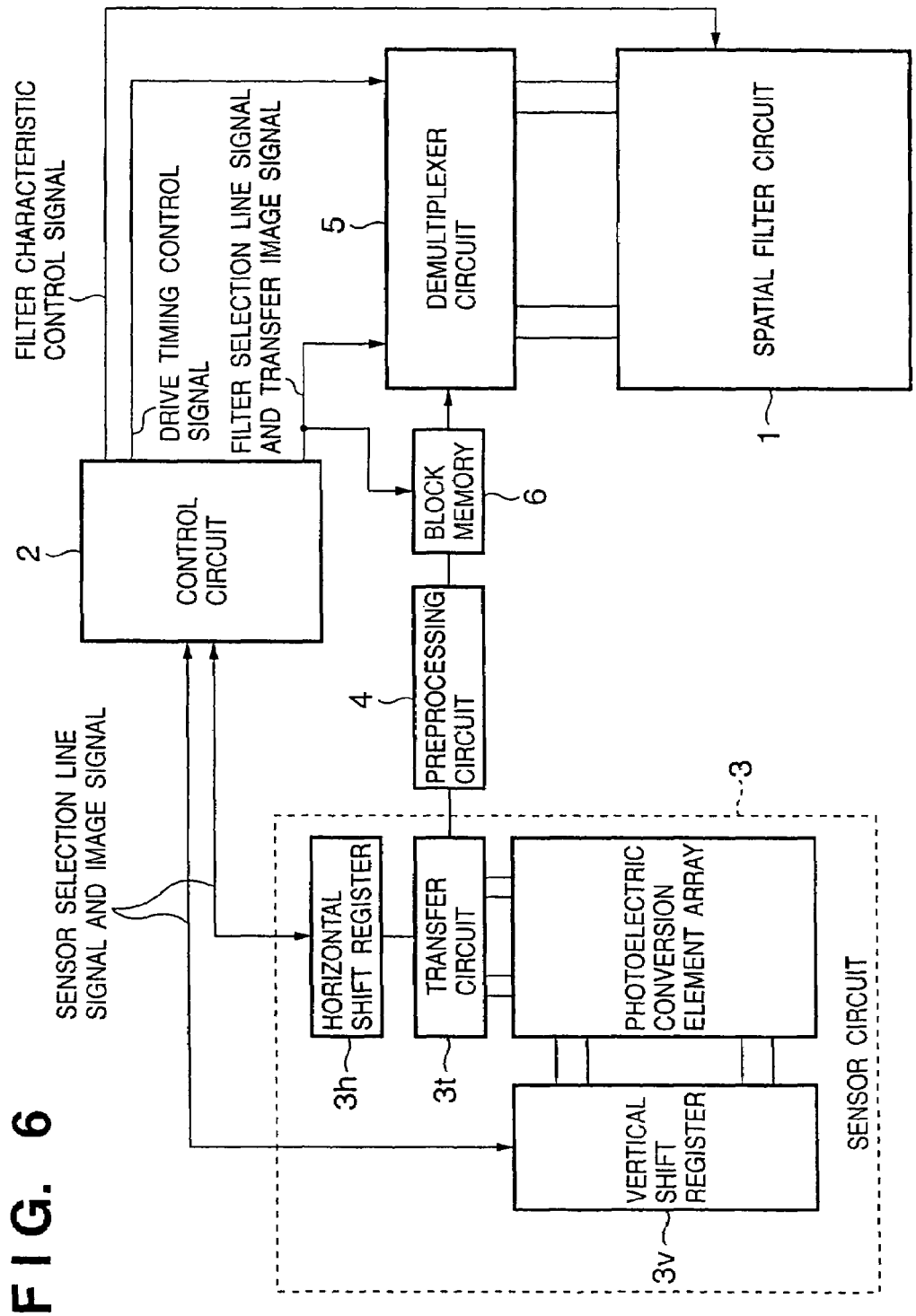
FIG. 6 is a block diagram showing the arrangement of main part of an image sensing signal processing circuit according to the second embodiment.

FIG. 6 is a block diagram showing the arrangement of main part of the second embodiment. According to this arrangement, the memory element $C_m$ at the input unit of the spatial filter circuit element shown in FIG. 3 is unnecessary. Of a sensor circuit output, a necessary portion corresponding to a predetermined spatial filter circuit element to be time-serially accessed is temporarily recorded in a block memory 6. Then, pixel data in the block memory 6 are read out at once (time-serially in the case of the first embodiment where the memory element $C_m$ is used in the circuit shown in FIG. 3) as voltage signals, and the above-descried spatial filter processing is performed.

In this embodiment, a control circuit 2 sends, of spatial filter characteristic parameters (m,n), a scale control signal corresponding to the scale parameter m to a sensor circuit 3 side together with an address selection signal. The horizontal and vertical selection circuits (3h and 3v) in the sensor circuit 3 make the block memory 6 store image data of a local region (local region sampled by an interlace read) about each sampling pixel for a predetermined region size corresponding to the scale control signal. With this operation, the load on the control circuit 2 which outputs the read timing control signal to the sensor circuit 3 can be reduced.

The block memory 6 functions as a temporary storage element. In accordance with the timing signal from the control circuit 2, image data in the local region (its size depends on the scale parameter) around each sampling position is sent to each spatial filter circuit element corresponding to the position of the sampling point.

At this time, the image data stored in the block memory 6 is output in the following manner. Every time the sampling position of the interlaced read is updated by the control signal from the control circuit 2, image signal data (that has undergone preprocessing) in the block memory 6, which corresponds to the sampling position, is transferred to the spatial filter array circuit. After that the image signal from the sensor at that position (address) is input and that the image data at a corresponding address on the block memory 6 is rewritten, the image data in the block memory is updated as image data overlapped in a predetermined range.

After that, by the control circuit 2, the image data are time-serially output as image signals from the block memory 6 to the spatial filter circuit elements. The output read from the spatial filter circuit 1 and the like are the same as in the first embodiment.

In this case as well, the sensor circuit 3, control circuit 2, preprocessing circuit 4, and spatial filter circuit 1 shown in FIG. 6 may be formed on separate semiconductor chips or on a single semiconductor chip. However, when the circuits are formed on a single semiconductor chip, this embodiment exhibits a better effect.

Third Embodiment

Figure 7:
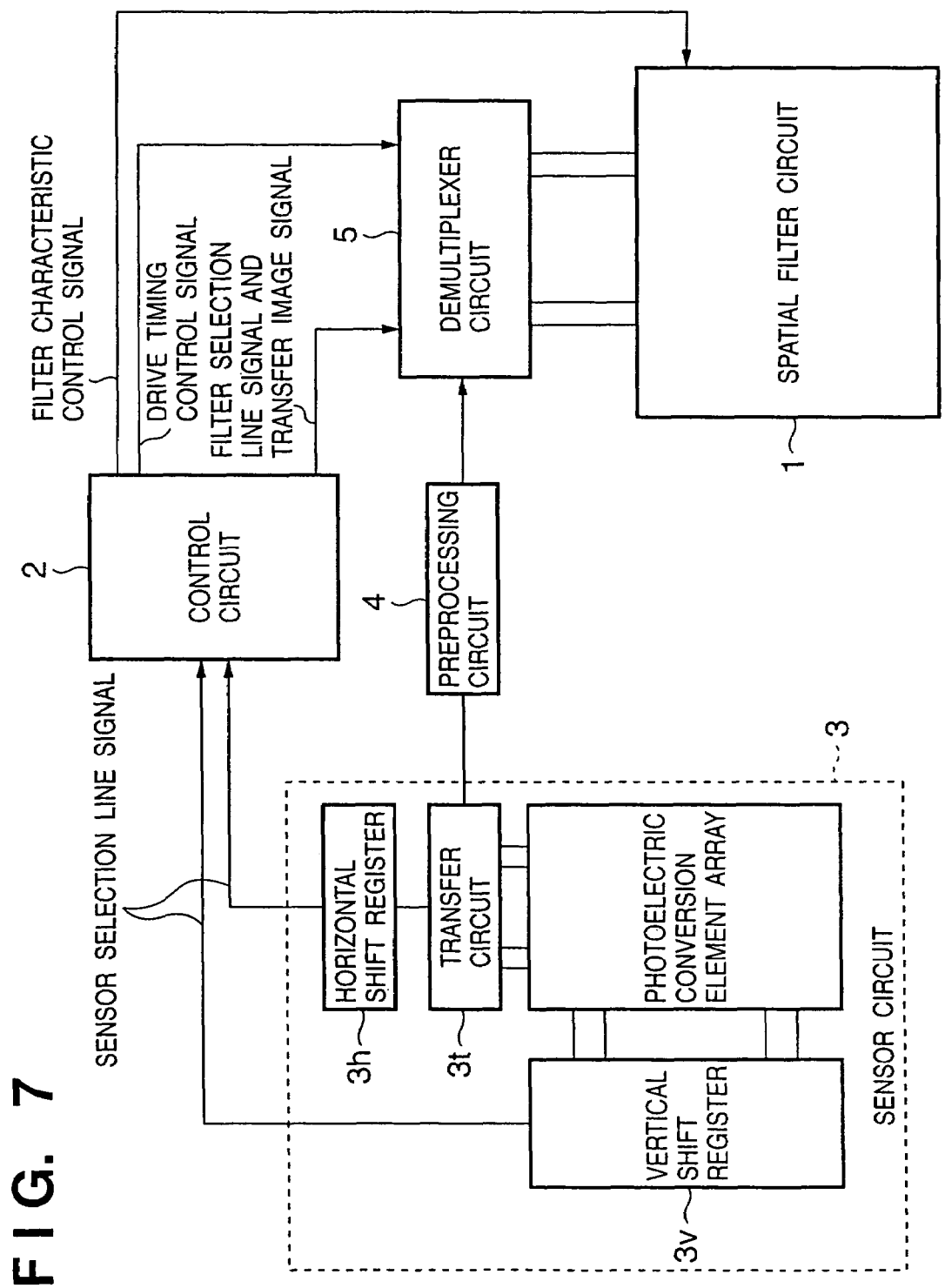
FIG. 7 is a block diagram showing the arrangement of main part of an image sensing signal processing circuit according to the third embodiment.

FIG. 7 shows the arrangement of main part of the third embodiment. Timing control characteristic of a sensor circuit 3, i.e., the modulation timing control on a spatial filter circuit 1 side is done using a read control signal used in a normal CMOS sensor. In this case, interlaced read control as in the first embodiment is done.

With this arrangement, the read timing control about the CMOS sensor circuit 3 or the internal interconnection of a transfer circuit 3t or the like need not be changed. Hence, stable spatial filtering operation can be executed using an existing CMOS sensor chip or the like.

A control circuit 2 receives selection line signals in the sensor read mode to obtain the address information of an image signal and executes transfer control of the image signal to a spatial filter circuit element at a corresponding position.

At this time, characteristic control signals for circuit elements (resistors and transconductance amplifiers) shown in FIG. 3 are sent in correspondence with the characteristic parameters (m,n) of Gabor-type wavelet transform shown in the first embodiment. The signals are updated after a series of readout operations from the sensor are ended. For example, the signals are updated every time the interlaced readout to be executed for the input image is ended. After the updating, the (interlaced) readout scanning is performed by the sensor circuit 3.

A pixel signal is temporarily held by a memory element $C_m$ connected to a transconductance amplifier $G_s$ at the input unit as a voltage signal, as in the first embodiment. When the output from the spatial filter circuit 1 is read out, the contents of the memory element are rewritten. The remaining operations and arrangements are the same as in the first embodiment.

Even in this third embodiment, the sensor circuit 3, control circuit 2, preprocessing circuit 4, and spatial filter circuit 1 shown in FIG. 7 are formed on separate semiconductor chips or on a single semiconductor chip. However, when the circuits are formed on a single semiconductor chip, this embodiment exhibits a better effect.

In the first to third embodiments, for image data of one frame of the photoelectric conversion element array, a plurality of spatial filter arithmetic operations for a plurality of different spatial filter characteristics are executed not parallelly by a plurality of spatial filter circuits but time-serially by a single spatial filter.

In a structure in which the sensor circuit 3 and spatial filter circuit 1 are formed on a single semiconductor chip, if any one of the sensor circuit 3 and spatial filter circuit 1 has a defect, the chip cannot be used. Hence, the yield decreases. If a plurality of spatial filter circuits are formed, the chip area becomes large, and the yield becomes very low. However, as in the above-described first to third embodiments, when processing operations are executed time-serially by one spatial filter circuit 1, the chip area decreases, and the yield improves.

When one spatial filter circuit 1 for time-serially executing a plurality of different processing operations is formed on a single semiconductor chip together with the sensor circuit 3 and the like, any decrease in yield due to formation of a plurality of spatial filter circuits on a single semiconductor chip can be prevented. In addition, advantages of reduction of the area, power consumption, and cost can be obtained by forming the circuits on a single semiconductor chip.

According to the above-described first to third embodiments, for single image data that is input, a plurality of spatial filter arithmetic operations are time-serially executed in correspondence with a plurality of different spatial filter characteristics. Hence, a plurality of predetermined different geometrical features can be efficiently and sequentially extracted from time-serially input image data using a single circuit. In addition, since the temporally modulated spatial filter output can be synchronized with the sensor output timing, different spatial filter processing operations can be efficiently and stably executed for a sensed image.

Furthermore, according to the characteristic features of the above embodiments, a sensor region including a pixel array having a photoelectric conversion characteristic and a circuit for reading image data from the pixel array, and a single spatial filter circuit for time-serially executing a plurality of spatial filter arithmetic operations for single image data read out from the sensor region in correspondence with a plurality of different spatial filter characteristics are formed on a single semiconductor chip. Hence, any decrease in yield due to formation of a plurality of spatial filter circuits on a single semiconductor chip can be prevented. In addition, advantages of reduction of the area, power consumption, and cost can be obtained by forming the circuits on a single semiconductor chip.

Fourth Embodiment

Overall Arrangement and Outline of Each Unit

Figure 10:
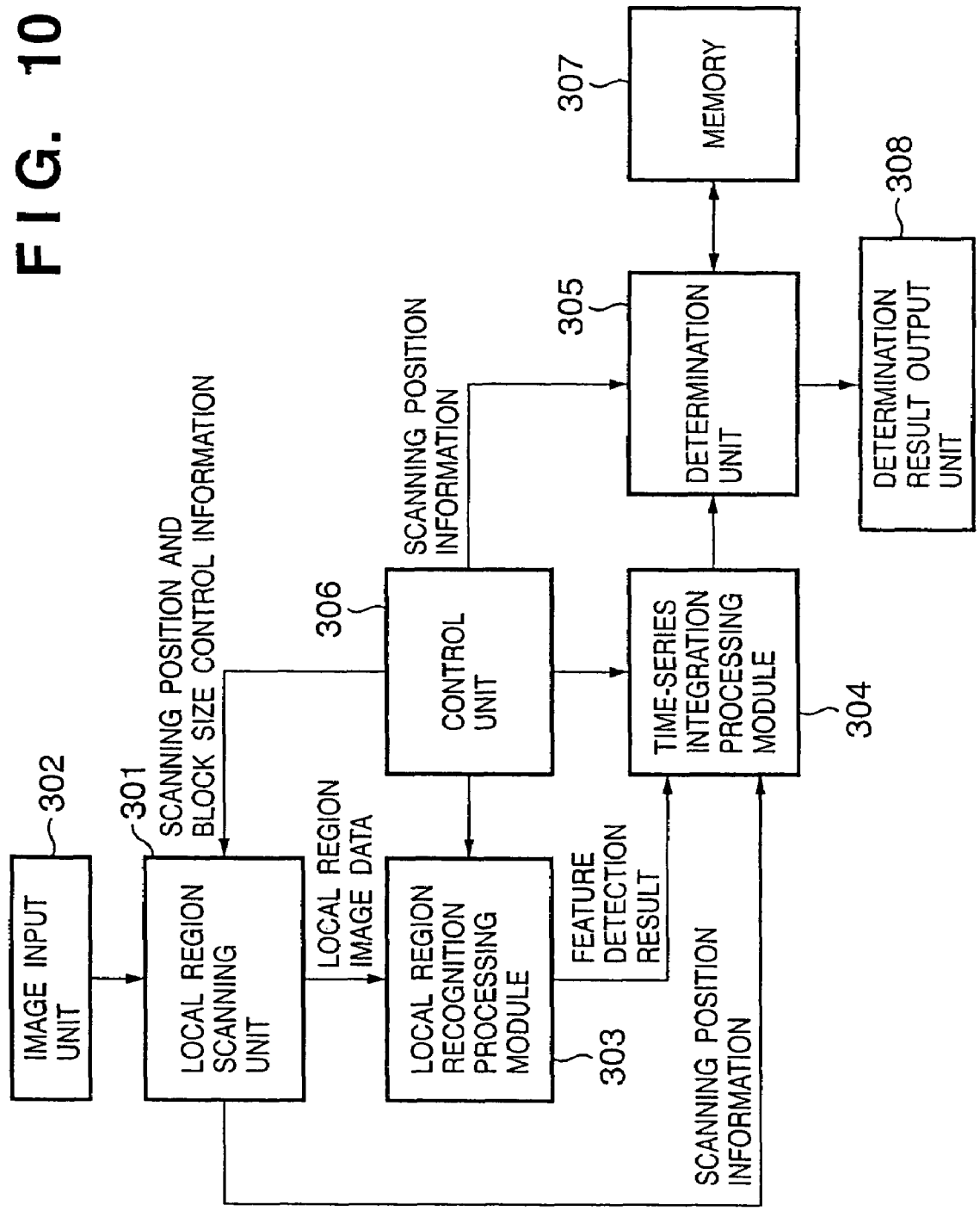
FIG. 10 is a block diagram showing the arrangement of main part according to the fourth embodiment.

The fourth embodiment of the present invention will be described below in detail with reference to the accompanying drawings. FIG. 10 is a block diagram showing the overall arrangement of a pattern recognition apparatus according to this embodiment, which is constituted by a block-shaped local region scanning unit 301 in input data, an image input unit 302, a local region recognition processing module 303, a time-serial integration processing module 304, a determination unit 305, and a control unit 306 for controlling their operations. The outline of the function of each component will be described next.

The scanning unit 301 sets a local region (block-shaped region) having a predetermined size and rectangular shape (or any other shape) set by the control unit 306 at each sampling position in input data from the image input unit 302 while updating the sampling position on the basis of a control signal from the control unit 306. In this block scanning process, a local region after being updated by scanning preferably overlaps that before the updating in a predetermined range such that the detection accuracy is prevented from degrading when a feature is present near the boundary.

The scanning unit 301 outputs a read control signal to the image input unit 302 (a sensor such as a CMOS sensor) to receive the signal of a block-shaped local region from the sensor. For such readout control, a known method (e.g., a method disclosed in Japanese Patent Laid-Open Nos. 11-196332 by the present applicant) can be used. When a CCD is used as a sensor, an image is temporarily stored in a frame memory or the like and scanned while extracting a block-shaped region.

The local region recognition processing module 303 is formed from hierarchical neural network circuits for detecting lower- to higher-order geometrical features. The local region recognition processing module 303 receives the data of the set block-shaped region and outputs to the serial integration processing module 304 a signal representing whether a medium- or higher-order pattern of a predetermined category is present in the local region.

The time-serial integration processing module 304 receives position information from the scanning unit 301, integrates, on the basis of that information, the outputs from the local region recognition processing module 303 for the respective block-shaped regions set at a plurality of positions by a method to be described later, and outputs information about the presence/absence of a predetermined pattern. Upon receiving a detection signal (position and category information) of a higher-order pattern (recognition object) from the local region recognition processing module 303, the time-serial integration processing module 304 directly outputs the detected information to the determination unit 305.

When a predetermined pattern is detected for the output from the time-serial integration processing module 304 using determination parameters supplied from the control unit 306, the determination unit 305 outputs information representing a specific category whose pattern is present in the input data, and a specific position of the pattern.

The local region recognition processing module 303 will be described next in detail with reference to FIG. 11. The processing module 303 mainly concerns recognition (detection) of objects or geometrical features in local regions in input data. Its basic structure is a so-called convolutional network structure (Y. Le Cun and Y. Bengio, "Convolutional Networks for Images Speech, and Time Series" in Handbook of Brain Theory and Neural Networks (M. Arbib, Ed.), MIT Press, pp. 255-258, 1995). This structure is different from the prior art in that inter-layer connection may locally form mutual connection (to be described later). The final output corresponds to a recognition result, i.e., the category of a recognized object and its position on the input data.

Figure 11:
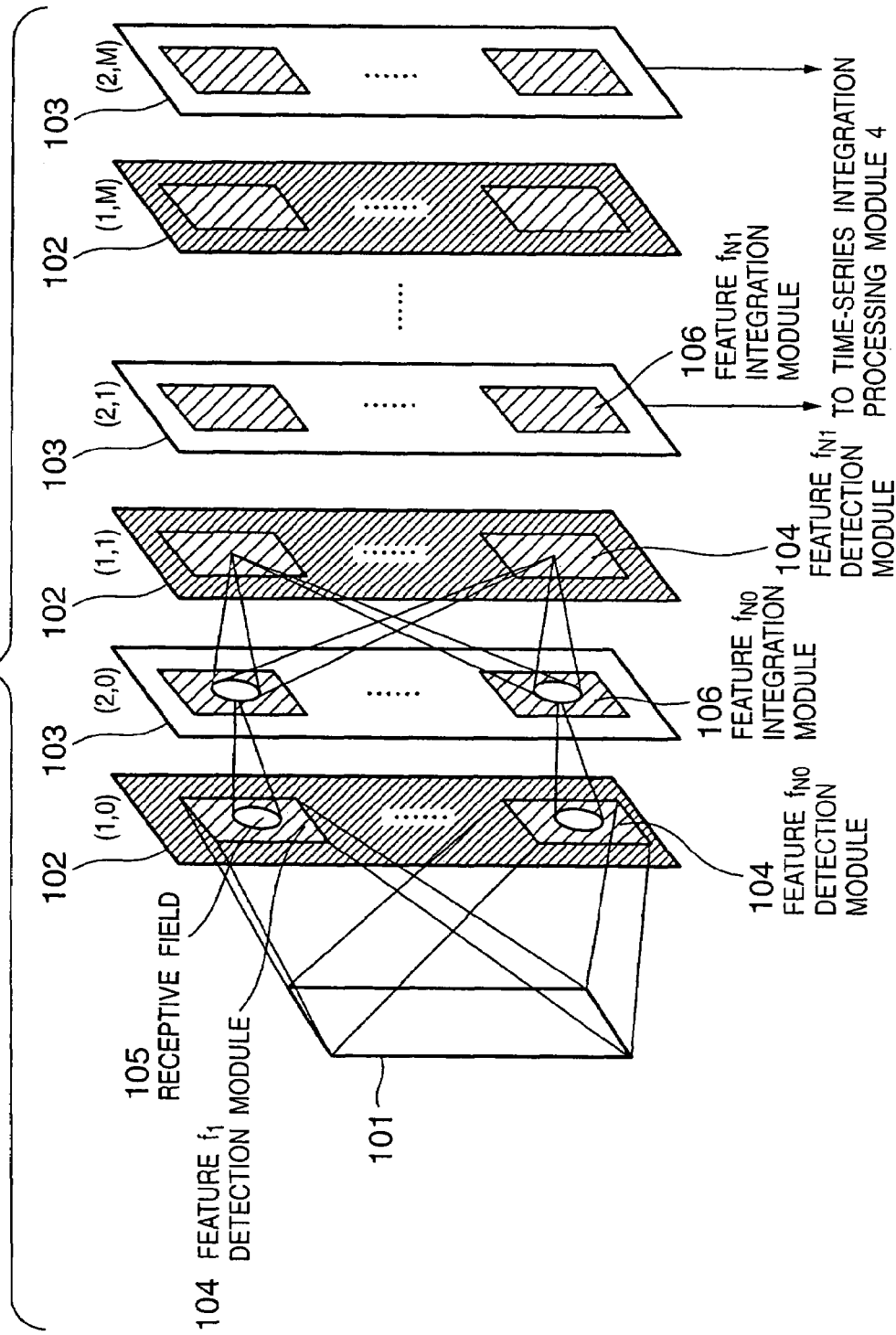
FIG. 11 is a view showing the arrangement of main part of a local region recognition processing module.

Referring to FIG. 11, a data input layer 101 inputs local region data from a CMOS sensor or a photoelectric conversion element such as a CCD element under the instruction of the scanning unit 301. Alternatively, the data input layer 101 may input higher-order data obtained from the result of an analysis (e.g., principal component analysis, vector quantization, or the like) of a predetermined data analysis unit.

A case wherein an image is input will be described below. The first feature detection layer (1,0) detects a local lower-order feature (it may include not only a geometrical feature but also a color component feature) from an image pattern input from the data input layer 101 for each local region around each position in the entire frame (or for each local region around each predetermined sampling point in the entire frame) by multiple resolution processing using Gabor wavelet transform and the like by a plurality of feature categories at a portion at a plurality of scale levels or resolutions. Hence, the feature detection layer (1,0) is formed from neuron elements, each of which has a receptive field structure corresponding to the type of feature. (e.g., the gradient of line segment as a geometrical structure in the case of extracting a line segment in a predetermined direction) and generates a pulse sequence corresponding to the degree.

A feature detection layer 102 (l,k) forms a process channel at a plurality of resolutions (scale levels) as a whole, as described in detail in U.S. Ser. No. 09/878,269 and European Patent Application No. 01305231 by the present applicant (k≧0). A case wherein Gabor wavelet transform is executed by the feature detection layer 102 (1,0) will be exemplified. A set of feature detection cells having Gabor filter kernels with the same scale level and different direction selectivities as receptive field structure form a process channel in the feature detection layer 102 (1,0). In the subsequent layer 102 (1,0) as well, feature detection cells (the feature detection cells detect higher-order features) for receiving the outputs for the feature detection cells belong to the same channels as those process channels. In the further subsequent layer 102 (l,k) (k>1) as well, feature detection cells for receiving the outputs for a plurality of feature integration cells forming identical channels in a layer 103 (2,k−1) are designed to belong to the channels.

Gabor wavelet has a shape obtained by modulating a sine wave having a predetermined direction component and spatial frequency by a Gaussian function. A set of 25 filters as a wavelet have a similar function shape and different main directions and sizes. As is known, in this wavelet, the functional shape is localized in the spatial frequency domain and in the real space domain, the conjoint uncertainty for the position and spatial frequency is minimum, and the function is the most localized both in the real space and in the frequency space (J. G. Daugman, Uncertainty relation for resolution in space, spatial frequency, and orientation optimized by two-dimensional visual cortical filters, Journal of Optical Society of America A, vol. 2, pp. 1160-1169 (1985)).

To know details of a method of executing Gabor wavelet transform by a neural circuit network, see Daugman, IEEE Trans. on Acoustics, Speech, and Signal Processing, vol. 36, pp. 1169-1179 (1988). How to handle a boundary portion in a local region (how to hold a Gabor wavelet transform coefficient value) is not disclosed in this reference. For example, a Gabor wavelet transform coefficient value is multiplied by a predetermined weight coefficient in accordance with the distance from the center of a local region, thereby reducing the influence of a shift from an ideal Gabor wavelet transform coefficient value near the boundary. In addition, the integration processing is executed while holding an intermediate result in the scanning process in a predetermined storage unit.

The respective process channels progress processing holding the respective scale level (or resolution) assigned to them and detect and recognize lower- to higher-order features by hierarchical parallel processing.

A feature integration layer 103 (2,0) is formed from a neuron element which has a predetermined receptive field structure (a receptive field means the connection range with the output element of the immediately preceding layer, and a receptive field structure means the distribution of connection weight values) and generates a pulse sequence. The feature integration layer 103 (2,0) integrates (by means of arithmetic processing such as local averaging or sub-sampling by maximum output detection) a plurality of neuron element outputs in the same receptive field from the feature detection layer 102 (1,0). The receptive fields of neurons in a single feature detection layer have a common structure.

Each of the subsequent feature detection layers 102 (1,1), (1,2), . . . , (1,M) and feature integration layers 103 (2,1), (2,2), . . . , (2,M) has a predetermined receptive field structure. The former ((1,1), . . . ) detects a plurality of different features in each feature detection module. Each of the latter ((2, 1), . . . ) integrates detection results about some feature from the preceding feature detection layer. The former feature detection layer is connected (wired) to receive the outputs from neuron elements in the preceding feature integration layer belonging to the same channel. In sub-sampling, i.e., processing executed in the feature integration layer, outputs from a local region (local receptive field of the feature integration layer neuron) from feature detection cells of the same feature category are undergoes averaging or else.

Figure 12A:
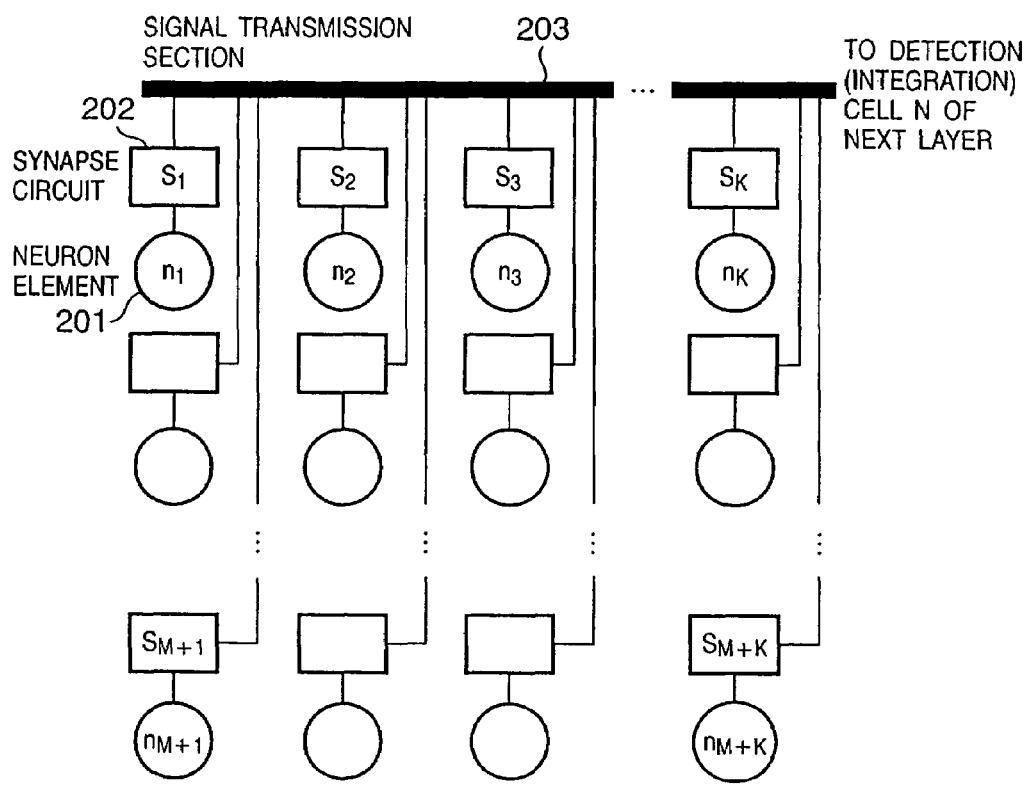
FIGS. 12A to 12C are views showing the arrangements of a synapse section and neuron element.
Figure 12B:
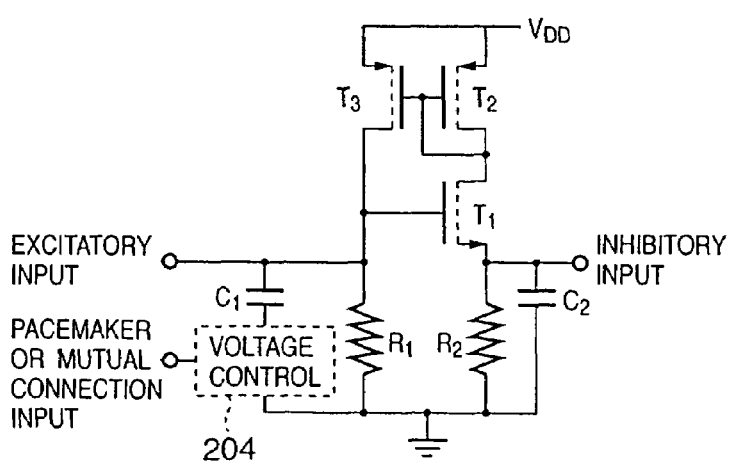
Figure 12C:
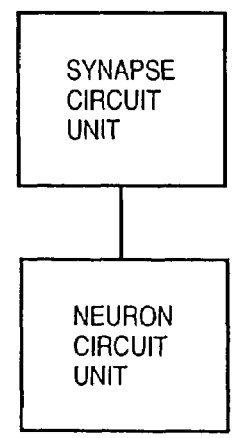

FIGS. 12A to 12C are views showing the arrangements of a synapse circuit and neuron element. The structure for connecting elements 201 in-between neurons in the respective layers includes a signal transmission unit 203 (interconnection or delay line), corresponding to the axon or dendrite of a neuron, and synapse circuits 202, as shown in FIG. 12A. FIG. 12A shows the arrangement of a connection section related to the outputs (inputs when viewed from the cell) of neurons ($n_i$) of a feature integration (detection) cell that forms a receptive field with respect to a given feature detection (integration) cell. A portion serving as a signal transmission unit indicated by a bold line forms a common bus line. Pulse signals from a plurality of neurons are time-serially arranged and transmitted on the signal transmission line. The same arrangement is employed to receive an input from a cell at an output designation. In this case, input and output signals may be time-divisionally processed in the same arrangement. Alternatively, the same arrangement as in FIG. 3 may be prepared for each of the input side (dendrite side) and output side (axon side) to process the signals.

So-called excitatory connection amplifies a pulse signal in the synapse circuit 202. Conversely, inhibitory connection attenuates the signal. In transmitting information by pulse signals, amplification and attenuation can be realized by any one of amplitude modulation, pulse width modulation, phase modulation, and frequency modulation of the pulse signal. In this embodiment, each of the synapse circuit 202 is mainly used as a pulse phase modulation element. Amplification of a signal is converted into a substantial advance of the pulse arrival time as an amount unique to a feature. Attenuation is converted into a substantial delay. That is, synapse connection gives an arrival position (phase) on a time axis unique to each feature at a neuron as an output destination (as will be described later). Excitatory connection qualitatively gives an advance in phase of an arrival pulse with respect to a reference phase, and inhibitory connection gives a delay.

Referring to FIG. 12A, each neuron element $n_j$ outputs a pulse signal (spike train) and uses a so-called integrate-and-fire type neuron element (as will be described later). As shown in FIG. 12C, a synapse circuit and neuron element may be put into a circuit block.

A neuron of each layer will be described next. Each neuron element is an extention of a so-called integrate-and-fire neuron model. Each neuron element is the same as a so-called integrate-and-fire neuron in that the element fires and outputs a pulse signal when a result obtained linearly and time-spatially adding input signals (pulse sequence corresponding to an action potential) exceeds a threshold value.

FIG. 12B shows the basic arrangement representing the operation principle of a pulse generation circuit (CMOS circuit) serving as a neuron element. It is an extended version of a known circuit (IEEE Trans. on Neural Networks Vol. 10, p. 540). As inputs, excitatory and inhibitory inputs are received.

The operational control mechanism of the pulse firing timing of each neuron element is irrelevant to the present invention, and a description thereof will be omitted.

Time-Serial Integration Processing

Processing from the local region recognition processing module 303 to the time-serial integration processing module 304 will be described next in detail.

In this embodiment, in the scanning process of a local region, justification, related to the proper configuration of as well as proper types of medium-order patterns detected halfway that constitute a higher-order pattern to be detected, is performed, as will be described below. At this time, based on the prediction of the type of the medium-order pattern detected first, the type and position of a medium-order pattern to be detected next, the scanning position is jumped to the next. With this arrangement, a pattern can be efficiently detected as compared to a case wherein scanning is executed uniformly such as raster scan.

Figure 13:
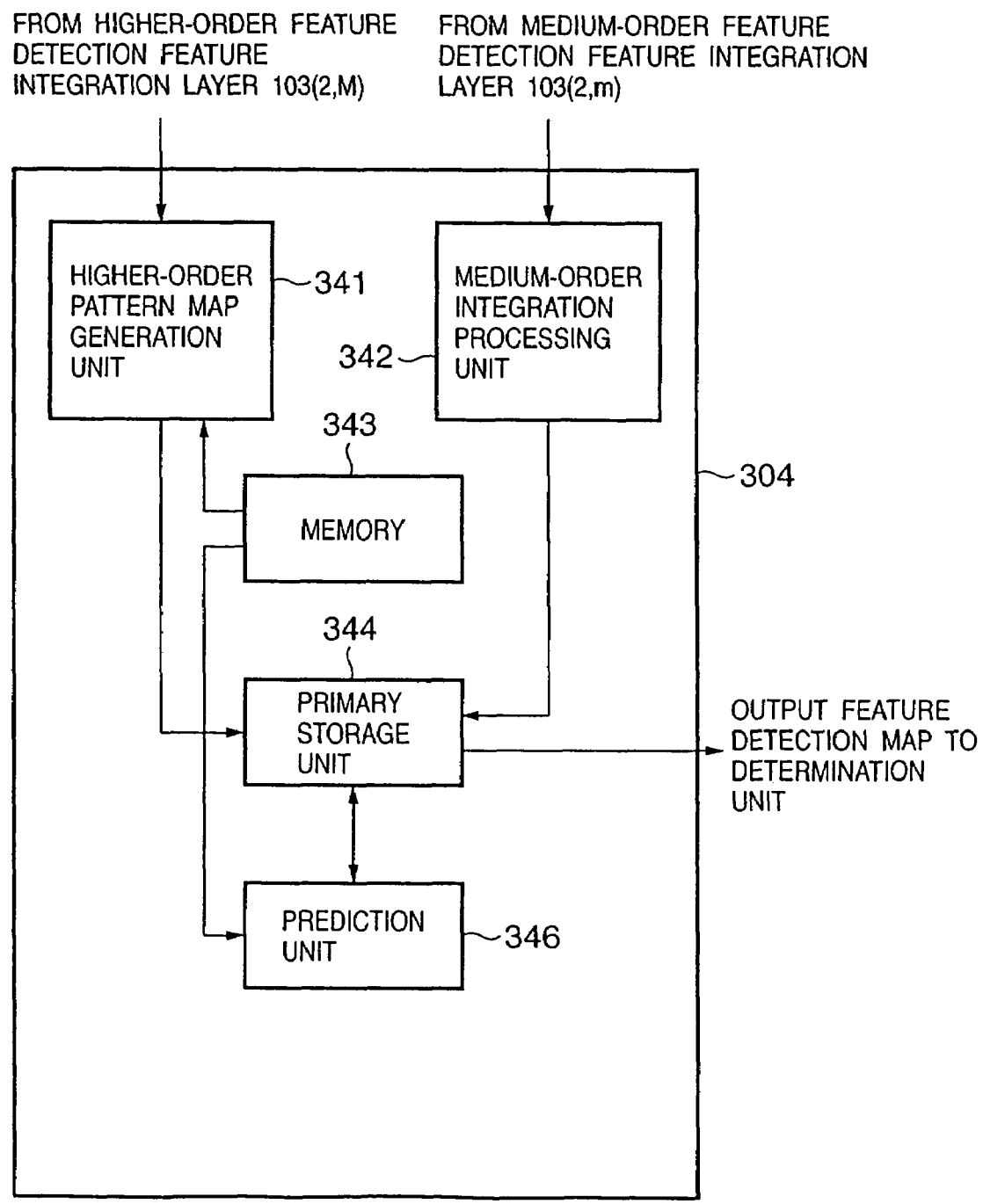
FIG. 13 is a block diagram showing the arrangement of a time-serial integration processing module used in the fourth embodiment.

As shown in FIG. 13, the time-serial integration processing module 304 comprises a higher-order pattern map generation unit 341 for generating a map of the detection level (the type of a feature as needed) and position of higher-order patterns, a medium-order integration processing unit 342 for outputting the predicted position of the medium-order pattern to be detected, and outputting a higher-order pattern category that matches best, a memory 343 for storing the higher-order pattern category (e.g., the data of template data) and a temporal storage unit 344 for storing the predicted position (to be described later).

Pieces of information related to the presence/absence and presence positions of a higher-order pattern (e.g., a facial pattern to be finally recognized) in a local region and medium-order patterns (e.g., patterns corresponding to the eye, nose, or mouth in a face) having intermediate complexity as a component of the higher-order pattern are output from the local region recognition processing module 303 to the time-serial integration processing module 304.

When a pattern of medium-order level is detected in a local region at a scanning position, and a higher-order pattern comprised of that pattern is not detected from the input data in the local region (i.e., when the size of the higher-order pattern is larger than the local region), medium-order pattern detection information may be integrated by time-serial processing (to be described later) in the medium-order integration processing unit 342 and used for the detection of a higher-order pattern having a larger size.

To make it possible to detect both medium-order patterns and higher-order patterns, neuron outputs from the feature integration layer 103 (2,m) related to medium-order feature detection and the final layer 103 (2,M) that gives higher-order feature (object) detection information in the local region recognition processing module 303 are supplied to the time-serial integration processing module 304 through a predetermined bus line. Especially, the neuron output from the feature integration layer 103 (2,m) is supplied to both of the next feature detection layer 102 (1,m+1) and a bus line serving as an output to the time-serial integration processing module 304. Note that signal transmission between neurons by pulse signals can be executed by so-called AER (Address Event Representation) (Lazzaro et al. Silicon Auditory Processors as Computer Peripherals, in Tourestzky, D. (ed), Advances in Neural Information Processing Systems 5. San Mateo, Calif.: Morgan Kaufmann Publishers, 1993) or the like.

Assume that no higher-order pattern is detected (a detection output level related to a higher-order pattern is less than a predetermined threshold value), and only some medium-order pattern elements are detected. In this case, a prediction unit 346 in the time-serial integration processing module 304 selects one of higher-order pattern candidates that can be constructed by the medium-order pattern. The category and position (configuration) information of another medium-order pattern to be detected, which constructs the candidate pattern, are predicted by the method to be described later.

After that, the medium-order integration processing unit 342 outputs to the determination unit 305 information corresponding to the detection probability (or the confidence coefficient of detection) of the pattern of the category to be detected at an output level depending on whether the pattern of the predicted category is detected at a corresponding position (when the predicted pattern is detected at the predicted position, the output level becomes high). At this time, the control unit 306 receives the position information of the predicted medium-order pattern from the time-serial integration processing module 304 and outputs sampling position update control information for the scanning unit 301 such that data in a local region around that position of that feature is provided next. Details of this process will be described later with reference to FIG. 14.

On the other hand, when the local region recognition processing module 303 detects a higher-order pattern with an output level equal to or more than a predetermined threshold value in the local region, information (corresponding to the detection probability or the confidence coefficient of detection) related to the category and the position information of the detected object in the local region are output to the time-serial integration processing module 304. In addition, the control unit 306 obtains the position information of the detected pattern from the scanning unit 301 and outputs the position information to the determination unit 305.

More specifically, when the maximum value of neuron outputs of a feature integration module belonging to a predetermined category fNM in the outputs from the feature integration layer 103 (2,M) as the uppermost layer of the local region recognition processing module 303 is equal to or larger than a predetermined threshold value, the output from the neuron that gives the maximum value is supplied to the time-serial integration processing module 304, giving the category and position information of the detected object.

Assume that both the higher-order pattern and medium-order pattern are detected in the same local region by the local region recognition processing module 303 (the detection levels of both patterns are equal to or more than a predetermined threshold value). For the higher-order pattern, a neuron output that gives the above-described maximum value output is supplied to the higher-order pattern map generation unit 341 of the time-serial integration processing module 304. For the medium-order pattern, the neuron output of the above-described feature integration layer 103 (2,m) is supplied to the medium-order integration processing unit 342 through the bus line. In the time-serial integration processing module 304, the above-described processing is executed for each of the higher-order pattern and medium-order pattern.

The medium-order integration processing unit 342 in the time-serial integration processing module 304 will be described next. The medium-order integration processing unit 342 is a signal processing circuit (or so-called middleware) for outputting the predicted category of some undetected medium-order patterns about a higher-order pattern that can be comprised of detected medium-order patterns, and the predicted position near the position of the detected medium-order pattern.

On the basis of the type (e.g., a front face pattern) of class of a predetermined object (higher-order pattern) to be detected and the class (e.g., the pattern of an eye of the front face) of a detected medium-order pattern, the medium-order integration processing unit 342 obtains the class (the pattern of the other eye, nose, or mouth), i.e., the predicted category of another undetected medium-order pattern, and its predicted position.

In this embodiment, to simplify the circuit arrangement, the circuit (prediction unit 346) for executing the above-described prediction processing is formed as a kind of logic circuit that outputs a result by looking up combinational, list structured data described in advance in a list or dictionary format and supplementary data (relative position vectors of medium-order patterns as candidates) without executing any probability processing and other complex processes with large computational load.

As shown in FIGS. 15A to 15E, the list structure data is given by a list structure in which medium-order patterns of a higher-order pattern are linked with each other. Supplementary data is represented using relative position vectors for the distance and directions between medium-order patterns.

The predicted position can be dependent on the class of the detected medium-order pattern and the type of the above-described process channel to which the maximum value output neuron of the feature integration layer 103 (2,m) in the local region recognition processing module 303 belongs. That is, in this embodiment, the type of process channel reflects the difference in size of an object to be detected or a feature. The position (predicted position) of some undetected medium-order pattern also changes depending on the size.

Figure 14:
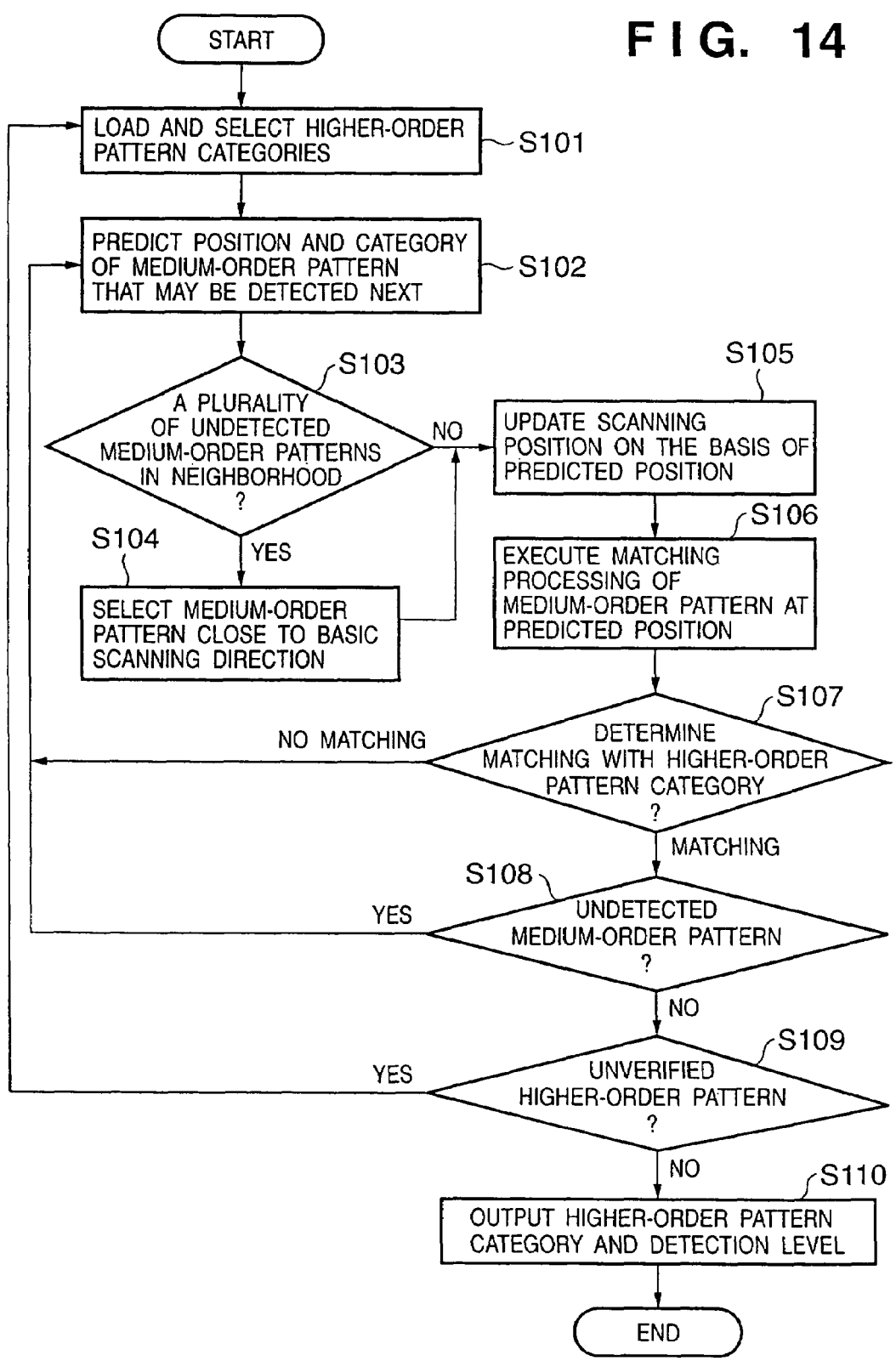
FIG. 14 is a flow chart showing processing by the time-serial integration processing module according to the fourth embodiment.

The flow of processing when a plurality of categories of higher-order patterns to be detected are prepared in advance, and a common medium-order pattern category is present therebetween will be described next with reference to FIG. 14 mainly focused on processing in the time-serial integration processing module 304.

In step S101, the category information of a higher-order pattern that has a medium-order pattern category detected by the local region recognition processing module 303 as a component is read out from the memory 343 in the time-serial integration processing module 304.

In step S102, the category and predicted position of a medium-order pattern that will be detected near the detected medium-order pattern with a high likelihood are obtained for each higher-order pattern and stored in the temporal storage unit 344.

In step S103, it is determined whether a plurality of undetected medium-order patterns may exist near the predicted positions. If YES in step S103, a medium-order pattern close to the default scanning direction (e.g., rightward from the upper left corner to the lower right corner) is selected (S104).

In step S105, the predicted position output selected by the medium-order integration processing unit 342 is input to the control unit 306 and used for updating the control of the scanning position. At this time, in the control unit 306, the predicted position information is converted into updated position data of a local region to be set by the scanning unit 301 and supplied to the scanning unit 301.

In step S106, the local region recognition processing module 303 supplies, to the medium-order integration processing unit 342, the output from the feature integration layer 103 (2,m) related to the medium-order pattern as a processing result about the predicted category (medium-order pattern level) at the predicted position for a higher-order pattern candidate that is compatible with the detected medium-order pattern (in a predetermined order).

When the scanning position is updated, the medium-order integration processing unit 342 in the time-serial integration processing module 304 receives a recognition processing result for the local region data from the local region recognition processing module 303 in accordance with an instruction from the scanning unit 301 (as in S104) and determines the degree of compatibility with the category of the already detected medium-order pattern in the following way (S107). If it is determined that the pattern is compatible with, the category information of a corresponding higher-order pattern and its detection level (corresponding to the presence probability or the confidence coefficient of detection) are output to the determination unit 305 (S110). The above-described prediction and verification at the medium-order pattern level are repeated as long as an undetected medium-order pattern is present and as long as undetected higher-order pattern is present (S108 and S109).

Compatibility determination between medium-order patterns based on the category of a higher-order pattern (processing in S107) will be described next. For the category of a higher-order pattern and the category of an already detected medium-order pattern, the correspondence between category and spatial arrangement information in the remaining medium-order patterns that goes with these categories is stored in a memory in advance as a table, thereby realizing so-called true-false determination processing by a simple logic circuit.

FIG. 15A shows data representing the correspondence. The correspondence data is given in a table format. Assume that the category of the higher-order pattern is "face", the category of a medium-order pattern that is detected first is "eye", and its size is given by a process channel number k (scale level k) of the feature integration layer 103 (2,m) related to the medium-order pattern. The categories and position information of remaining medium-order patterns that goes with the above patterns are given by "nose" and $r_{c-n,k}$, "mouth" and $r_{c-m,k}$, "eye" and $r_{e-c1,lk}$ and $r_{e-c2,k}$. In this case, r is the relative position vector with respect to the already detected medium-order pattern.

There are two position vectors corresponding to the remaining "eye" because it is unknown which eye corresponds to the already detected medium-order pattern. The "eye" that corresponds to the medium-order pattern to be detected is determined by judging whether a pattern corresponding to an "eye" that should exist in the direction of the predicted position is present (whether a right or left eye is estimated at this time). As is apparent, when a plurality of medium-order patterns such as "eye" and "nose" are already detected, the relative position vector of the remaining medium-order pattern "mouth" is uniquely determined.

FIG. 15B shows medium-order patterns (eye, nose, and mouth) represented by a tree structure when a medium-order pattern (eye) is detected first for a given higher-order pattern category (face), and the detection process. Each node is either in an undetected state (○) or detected state (●). Eye 1 and eye 2 represent left and right eyes, respectively. As the basic scanning procedure, for example, scanning is performed sequentially from the left to right through the undetected medium-order patterns in FIG. 15B. The detection state transits from FIG. 15B to FIG. 15E. In this case, eye 2 is detected at the predicted position as one of the eyes.

Determination Processing

Figure 16:
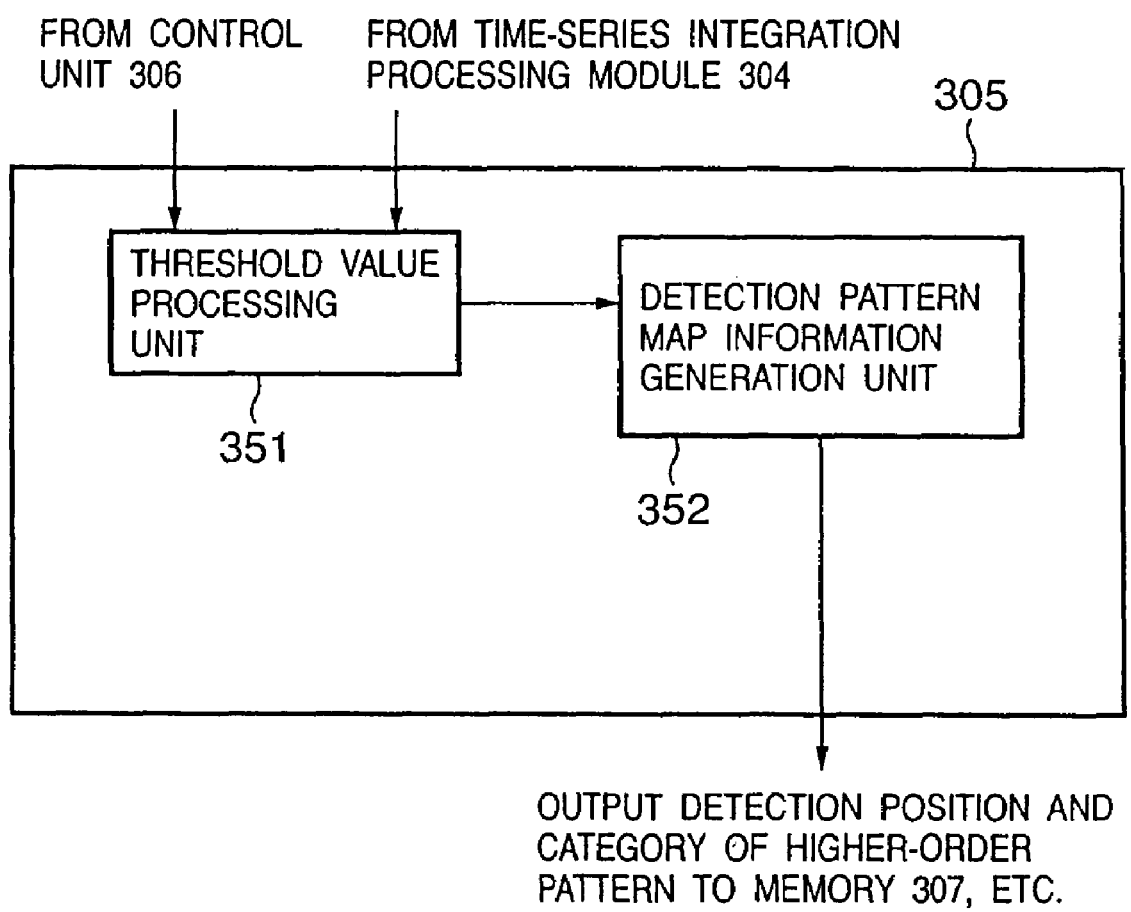
FIG. 16 is a block diagram showing the arrangement of a determination unit according to the fourth embodiment.

The arrangement of the determination unit 305 will be described next with reference to FIG. 16. The determination unit 305 comprises a threshold value processing unit 351 and detected pattern map information generation unit 352. The threshold value processing unit 351 executes threshold value processing of a higher-order pattern detection level signal from the time-serial integration processing module 304. To control the threshold value depending on input data (object to be detected), the threshold value information is input from the control unit 306. When a detection level signal is input from the time-serial integration processing module 304, and its value is larger than the threshold value, the detected pattern map information generation unit 352 stores the category and position information of the higher-order pattern in a memory 307 for holding pattern map information detected for the entire input data. Alternatively, the detected pattern map information generation unit 352 outputs the information to a predetermined display unit.

With the above arrangement, the position of a pattern of a predetermined category can be efficiently detected from input data (image) with a compact arrangement. Especially, the recognition processing circuit can execute processing for only a partial region in input data and detection based on both medium-order and higher-order patterns. For this reason, the circuit scale can be largely reduced, and the efficiency of recognition processing can be made high as compared to an arrangement for simultaneously and parallelly detecting a plurality of features individually at given sampling positions on input data.

The above-described pattern recognition apparatus can be mounted in an image input apparatus such as a camera or an image output apparatus such as a printer or display. As a result, a specific object can be recognized or detected using the compact circuit arrangement with low power consumption, and predetermined operations, e.g., for the image input apparatus, processes such as focusing, exposure correction, zooming, and color correction for a specific object can be executed. Even for the image output apparatus, processes such as optimum color correction for a specific object can be automatically executed.

A case wherein focusing to a specific object, or color correction and exposure control for a specific object are executed by installing the pattern detection (recognition) apparatus having the arrangement of this embodiment in an image sensing apparatus will be described with reference to FIG. 5 of the first embodiment.

An image sensing apparatus shown in FIG. 5 has an imaging optical system 92 including a photographing lens and zoom photographing drive control mechanism, a CCD or CMOS image sensor 93, an image sensing parameter measurement unit 94, an image sensing signal processing circuit 95, a storage unit 96, a control signal generation unit 97 for generating a control signal to control the image sensing operations or image sensing conditions, a display 98 that also serves as a viewfinder such as an EVF, an electronic flash 99, and a recording medium 910. This apparatus also has an object detection (recognition) apparatus 911 as the above-described pattern recognition apparatus for executing time-divisional multiplexed processing.

In the image sensing apparatus 9, the object detection (recognition) unit 911 detects the facial image (detects the position and size) of a person, which is registered in advance, from, e.g., a photographed video image. The position and size information of the person are input from the object detection (recognition) apparatus 911 to the control signal generation unit 97. The control signal generation unit 97 generates a control signal for optimizing focus control, exposure condition control, and white balance control for that person on the basis of the output from the image sensing parameter measurement unit 94.

When the above-described pattern detection (recognition) apparatus is used in the image sensing apparatus, people detection and optimum photographing control based on the people detection can be performed at a high speed (in real time).

Fifth Embodiment

A sampling point position set by a scanning unit 301 is updated in accordance with a preset procedure (e.g., raster scan), and the block size is fixed (maximum size of a predetermined object to the detected). Hence, sampling point position control does not depend on the intermediate output result of a local region recognition processing module 303. The local region recognition processing module 303 detects a medium-order or higher-order pattern, as in the above embodiment. The arrangement as a pattern recognition apparatus is the same as in the fourth embodiment.

A pattern detected as a higher-order pattern has a size equal to or smaller than the block size. To make it possible to scan single input data without changing the block size and to detect an object having a different size, the local region recognition processing module 303 has process channels unique to a plurality of sizes to be detected, as in the fourth embodiment.

Figure 17:
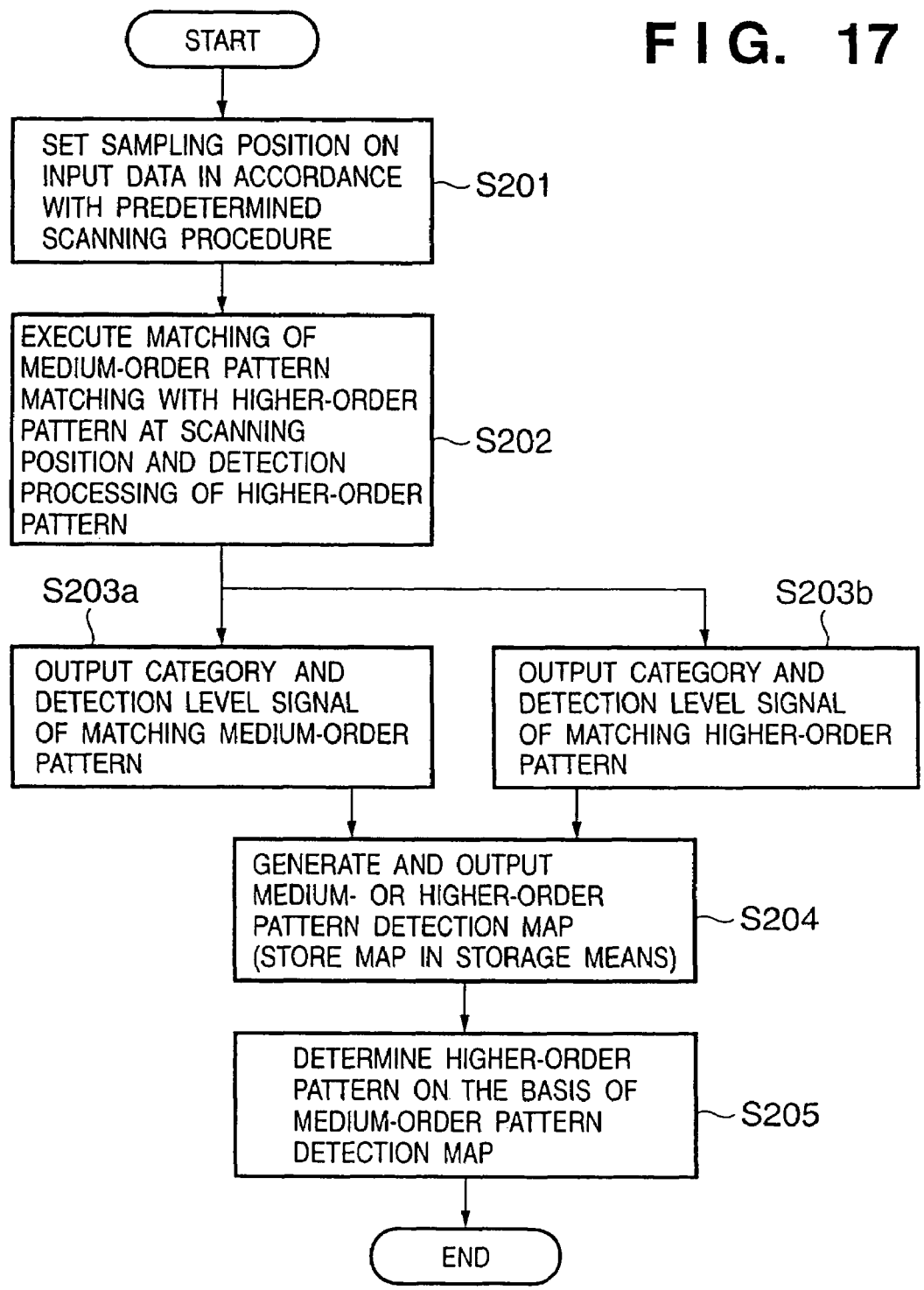
FIG. 17 is a flow chart showing processing according to the fifth embodiment.

FIG. 17 shows the processing chart of this embodiment. In step S201, a sampling point position is set on input data in accordance with a predetermined scanning procedure. In step S202, medium-order patterns compatible with a higher-order pattern at the sampling point position is detected, and then the higher-order pattern is detected.

In the above-described scanning process, if the detection level of the medium- or higher-order pattern is equal to or more than a predetermined threshold value, in step S203a or S203b, the local region recognition processing module 303 outputs the detection level of the medium- or higher-order pattern detected halfway in the scanning (the maximum value of neuron output of the feature integration layer). In step S204, a time-serial integration processing module 304 stores, in a temporal storage unit 344, the category, detection level, and position information of the pattern as detected pattern distribution (map) information.

The stored medium-order pattern data forms a higher-order pattern having a size (larger than the block size) that is not detected in the local region with the given size.

After the scanning position is updated, the determination unit 305 determines the presence/absence of an object to be recognized (higher-order pattern), i.e., the presence/absence of a higher-order pattern (object to be detected) (when the higher-order pattern is present, its position and category information) around the position at which the medium-order pattern is detected (since the block size is limited at that position, no higher-order pattern comprised of the medium-order pattern is detected) by looking up the temporal storage unit 344 in the time-serial integration processing module 304 (S205).

Figure 18:
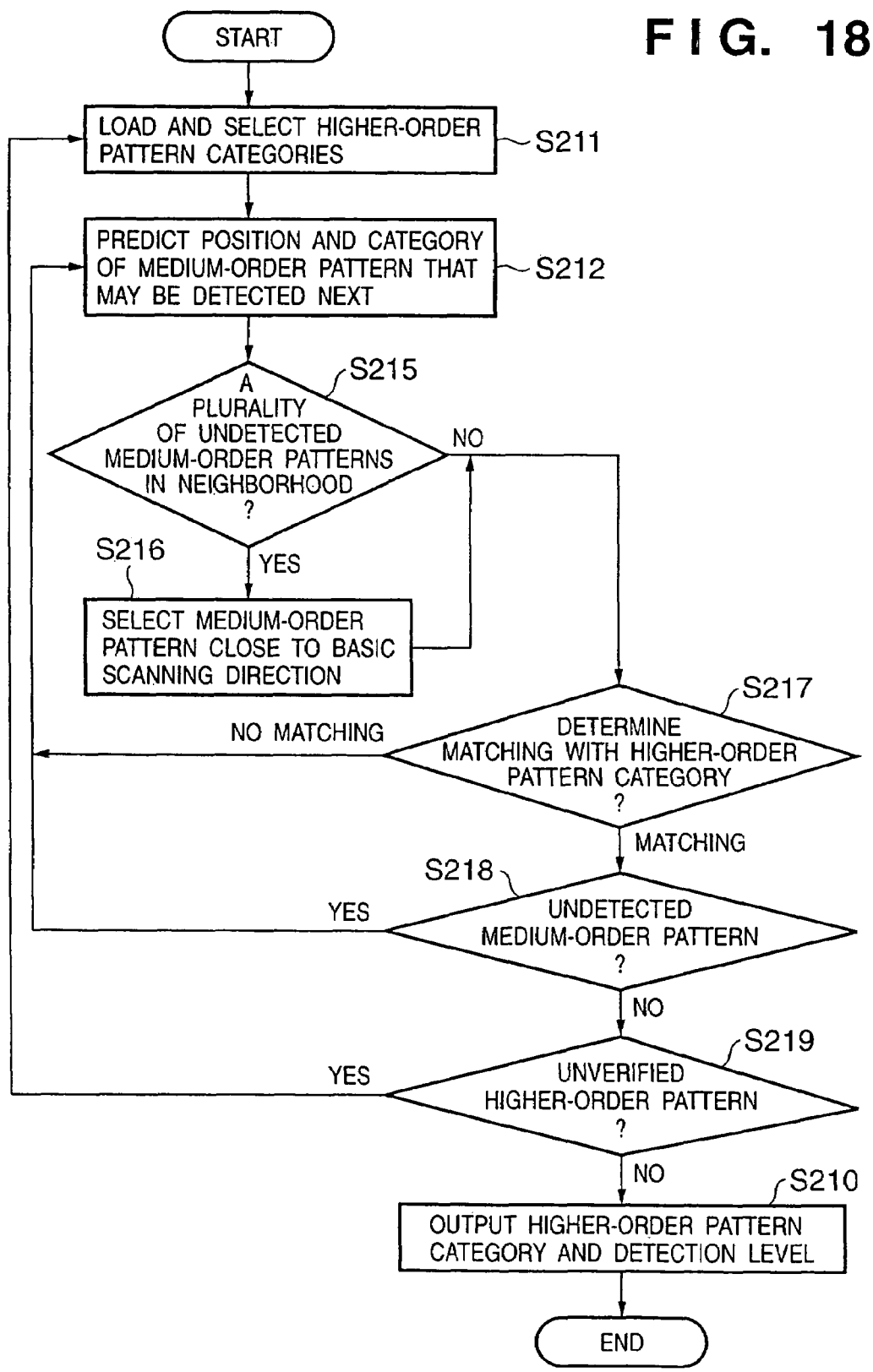
FIG. 18 is a flow chart showing a higher-order pattern determination procedure in the fifth embodiment.

Processing executed in step S205 is no simple threshold value processing, unlike the fourth embodiment. As shown in FIG. 18, processing executed in step S205 is almost the same as the flow chart in the time-serial integration processing module 304 in the fourth embodiment. This processing is performed in the following way while scanning on the medium-order pattern detection map information that is temporarily stored in the temproal storage unit 344.

In step S211, the category of a higher-order pattern is input and selected. In step S212, in scanning on the detection map, the predicted position to which scanning should jump next and feature category are obtained. Processing that is executed when a plurality of medium-order patterns that may go with the higher-order pattern exist in the neighborhood (steps S215 and S216) is the same as in the processing by the time-serial integration processing module 304 in steps S105 and S106 of FIG. 14 in the fourth embodiment.

In addition, compatibility with the higher-order pattern at the predicted position is determined by simple logic determination processing (step S217). Processing in steps S211 to S217 is repeated until the numbers of undetected medium- and higher-order patterns become zero (steps S218 and S219). The map information of the detected higher-order pattern is finally output (S210).

In this case, a combination of patterns (compatible with the configuration of medium-order patterns) compatible with the type of a higher-order pattern prepared in advance is extracted, and the type and position information of a corresponding higher-order pattern are output.

At the position where a higher-order pattern is detected, determination is not executed because it is unnecessary.

Sixth Embodiment

In this embodiment, recognition and integration processes are executed by a local region recognition processing module 303, time-serial integration processing module 304, and determination unit 305 while the size of a block-shaped region set by a scanning unit 301 is controlled by a block setting unit 302. The local region recognition processing module 303 parallelly forms a plurality of process channels corresponding to the difference in scale level, as in the fourth embodiment. For update control of the block size, the following two methods can be used. As the first method, the block size is updated by a control unit 306 at each scanning position, and an output from the local region recognition processing module 303 is obtained every time. As the second method, a series of recognition and integration processes are executed for input data in accordance with a predetermined size and predetermined scanning procedure, and then, the block size is changed, and the same recognition and integration processes are repeated.

In the latter method, a desired pattern can often be efficiently detected by controlling the block size from large to small. In either case, the local region recognition processing module 303 only detects a higher-order pattern. Hence, the output to the time-serial integration processing module 304 is output from only the uppermost feature integration (or detection)layer. The processing contents in the local region recognition processing module 303 are the same as in the above-described embodiment.

Figure 19:
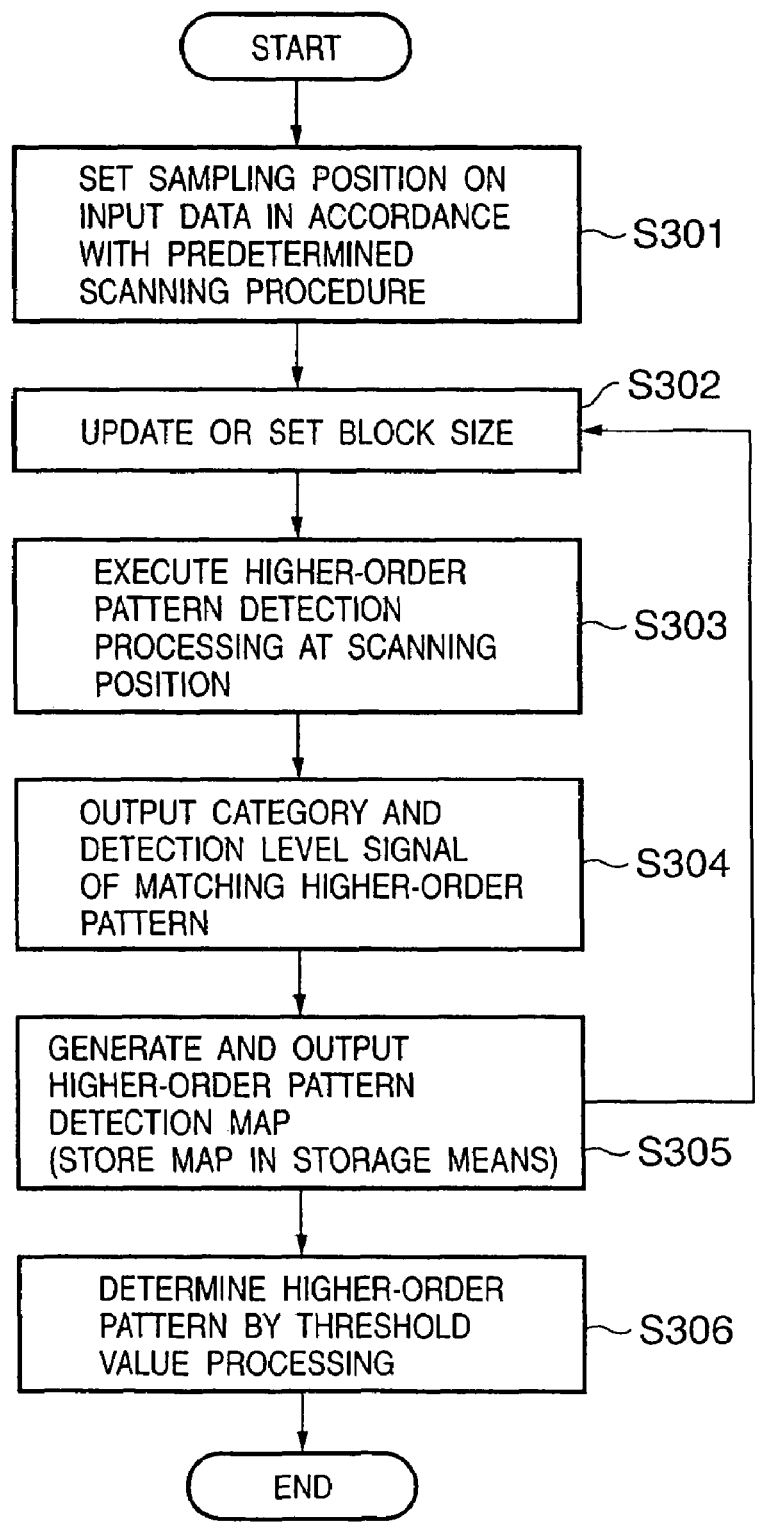
FIG. 19 is a flow chart showing main processing of the sixth embodiment.

FIG. 19 shows the main processing chart of this embodiment. In step S301, the sampling point position on input data is set in accordance with a predetermined scanning procedure. In step S302, the block size is set or updated in accordance with the predetermined procedure (as described above). In step S303, higher-order pattern detection processing in the local region is executed by the local region recognition processing module 303. After that, in step S304, the detection level of a pattern that goes with a higher-order pattern category prepared in advance is output. In step S305, the time-serial integration processing module 304 receives the detection level and category of the higher-order pattern from the local region recognition processing module 303, receives corresponding scanning position information from the control unit, and outputs a higher-order pattern detection map (stores the map in the storage unit). Finally, the control unit 306 executes threshold value processing (S306) and outputs information representing the position of the higher-order pattern (object to be detected) in the input data.

The difference in block-shaped local region size in the scanning process corresponds to the difference in process channel of the local region recognition processing module 303 described in the fourth embodiment. A higher-order pattern having a different size is detected at each scanning position.

As in this embodiment, when input data is scanned while controlling the block size in accordance with a predetermined procedure, and only detection of a higher-order pattern in the local region is executed, the circuit scale and power consumption of the respective processing modules (local region recognition processing module 303, time-serial integration processing module 304, and determination unit 305) can be minimized.

Seventh Embodiment

Figure 20:
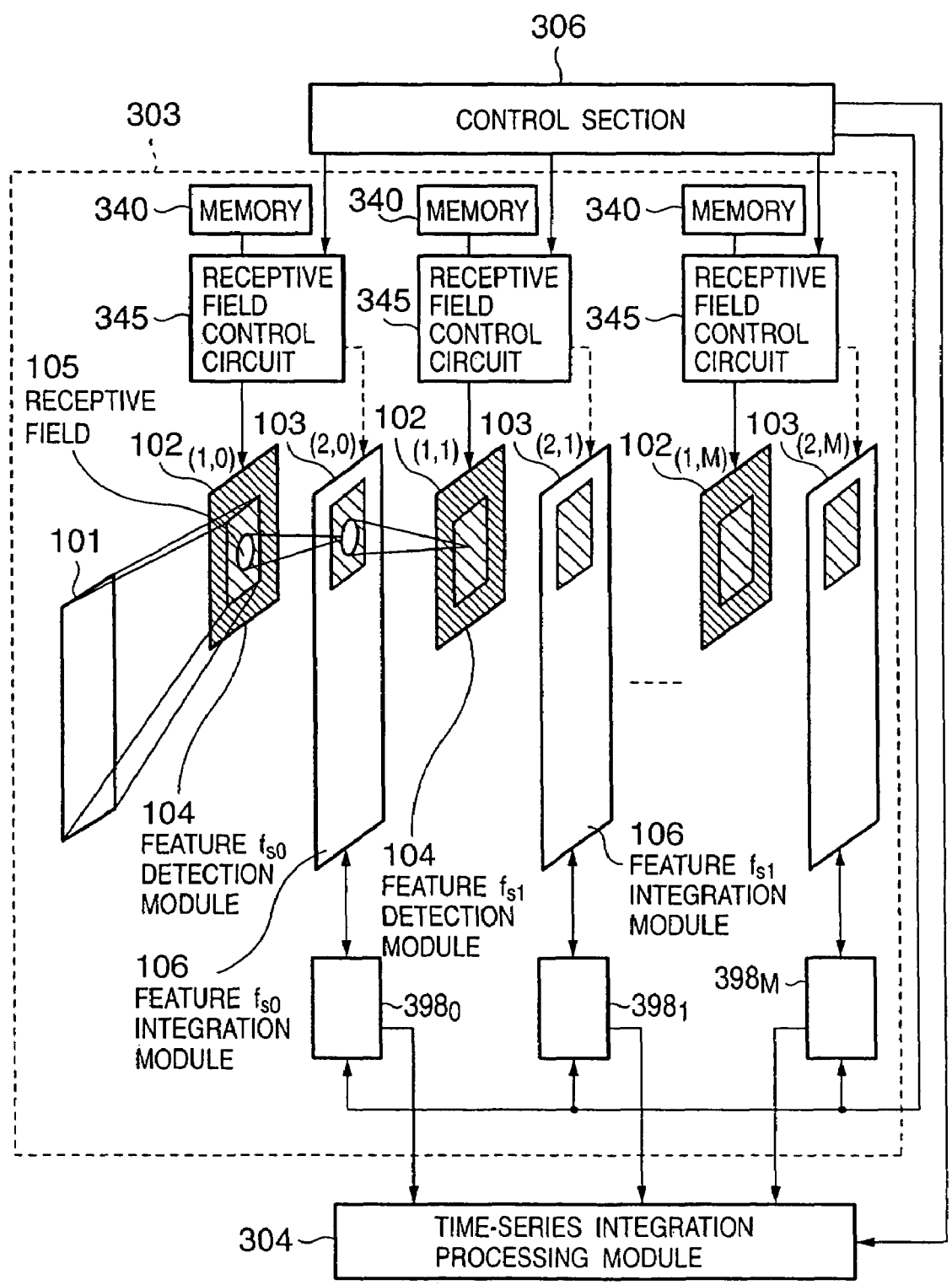
FIG. 20 is a view showing the arrangement of main part of the seventh embodiment.

FIG. 20 is a view showing the arrangement of main part of the seventh embodiment. In this embodiment, the number of types (categories or sizes) of features to be detected in each feature detection layer at given time is one. The type is time-serially updated by a control unit 306. For this reason, the number s of feature types parallelly arranged in each layer in a local region recognition processing module 303 can be greatly decreased as compared to the number N of feature types in the fourth embodiment (s=1 is also possible).

In this case, for single local region input data obtained from a scanning unit 301, the local region recognition processing module 303 hierarchically holds intermediate processing results about pattern detection of a category which is time-serially changed in memories $398_0$, $398_1$, ..., $398_M$. The detection results in feature integration layers are read out from the memories $398_0$, $398_1$, ..., $398_M$ and integrated by a time-serial integration processing module 304.

In the local region recognition processing module 303, feature detection layers 102 and feature integration layers 103 which are alternately cascaded hierarchically detects lower- to higher-order patterns, as in the above embodiment.

The outputs from the respective feature detection layers 102 undergo the same sub-sampling processing as in the above embodiment in the subsequent feature integration layers 103 and are temporarily stored in the memories $398_0$, $398_1, \ldots 398_M$ accompanying the feature integration layers (103) at an address that changes depending on the feature type. The feature detection layer 102 updates the synaptic weight distribution (local receptive field structure), as will be described below, and also receives the detection result for each feature type from the memory 398. For example, the local receptive field structure of the feature detection layer 102 for detecting a pattern (medium-order pattern) corresponding to an eye is given as a local receptive field structure unique to each of lower-order patterns $P_1, P_2, \ldots P_n$ necessary for detecting the medium-order pattern every time a feature integration layer output for each pattern $P_k$ (k=1, ..., n) is received from the memory 398.

The local receptive field structure of the feature detection layer 102 is held as digital data in a memory 340 such as an SRAM for each feature type to be input, read out from the memory, and updated. The local receptive field structure is given by a dynamically reconfigurable FPGA or FPAA (Field Programmable Analog Array) and a receptive field control circuit 345 of an accompanying synapse element circuit.

For example, the receptive field structure of the neuron of the feature detection layer 102 (layer for detecting a medium-order feature) that was detecting a pattern corresponding to an eye at certain time is updated in a predetermined order in accordance with signals from the control unit 306 and receptive field control circuit 345 such that a pattern corresponding to the nose or mouth is detected at another time.

For input data related to a local region, multiplex processing is executed such that different feature detection (recognition) processes are time-serially executed by the circuit of one local region recognition processing module 303. With this processing, the circuit scale can be largely reduced, as compared to a circuit arrangement for simultaneously detecting a plurality of features in parallel individually at sampling positions on input data.

The structure of the receptive field temporally controlled is given by a dynamically reconfigurable FPGA (FPAA), an SRAM (not shown) for storing a configuration bit (to be referred to as a CB hereinafter) as the configuration data of the FPGA (FPAA), the memory 340 for providing the CB to the SRAM, and the receptive field control circuit 345. The CB is data that reflects the receptive field of each neuron.

To realize a neural network circuit formed from neurons with local receptive field structures, a memory and control circuit for updating the CB for each neuron are generally necessary. In the arrangement of the local region recognition processing module 303 shown in the fourth embodiment, one set of a CB, memory 340, and receptive field control circuit 345 suffices for one feature category to be detected.

That is, when the number of feature type (e.g., the feature category or size) to be detected by the feature detection layer 102 at each sampling point at certain time is one, the local receptive fields of the feature detection layer neurons have an identical structure. As a result, the memory 340 and receptive field control circuit 345, which give the receptive field structure, can be shared to time-serially supply a CB to each feature detection layer neuron.

Generally, in an FPGA, CB gives only a logical connection (wiring) structure. That is, whether connection is present between a given neuron element and a predetermined neuron of the preceding layer is designated by a CB. The weight coefficient for each connection that reflects the receptive field structure is updated and set by updating weight data of synapse circuits in accordance with weight coefficient data supplied from the memory 340.

For example, assume that a synaptic weight is given by the amount of injected charges accumulated in a floating gate element. In this case, the synaptic weight is set by injecting charges corresponding to the weight value of each synapse, which corresponds to the weight coefficient data stored in the memory 340. When synaptic weight value data (e.g., an applied voltage that gives a predetermined accumulated charge amount) at a predetermined address, which is stored in the memory 340, is read out, the receptive field control circuit 345 injects charges until charges corresponding to the synaptic weight are accumulated (a voltage is generated).

After that, synapse circuit element $S_k$ (k=1, 2, ...) as components of the receptive field structure are time-serially accessed to apply a voltage and inject charges (hot electrons), thereby setting the synaptic weight distribution structure (receptive field structure). Note that a short-term memory element capable of quickly rewriting data corresponding to a weight value and holding the data for a predetermined time may be used.

The receptive field structure of each neuron of the feature detection layer is updated in accordance with the feature type. However, the receptive field structure of each neuron of the feature integration layer is not updated if the scale level in the feature types is the same. In addition, the contents of the CB may change among neurons by some predetermined amount because the CB reflects the difference in actual wiring destination (address) corresponding to the position of the neuron of the feature detection layer.

Eighth Embodiment

In this embodiment, a synapse circuit that gives a receptive field structure is formed from a two-dimensional systolic array processor (for a systolic array, see Tomita, "Parallel Computer Configuration Theory", pp. 190-192, Shokodo, 1986, S. Y. Kung, "Digital Neural Networks", PTR Prentice Hall, Englewood Cliffs, pp. 340-361, 1993, and Japanese Patent No. 2741793). The receptive field structure is updated by changing time-serial data for pipeline processing supplied to the systolic array element.

Figure 21:
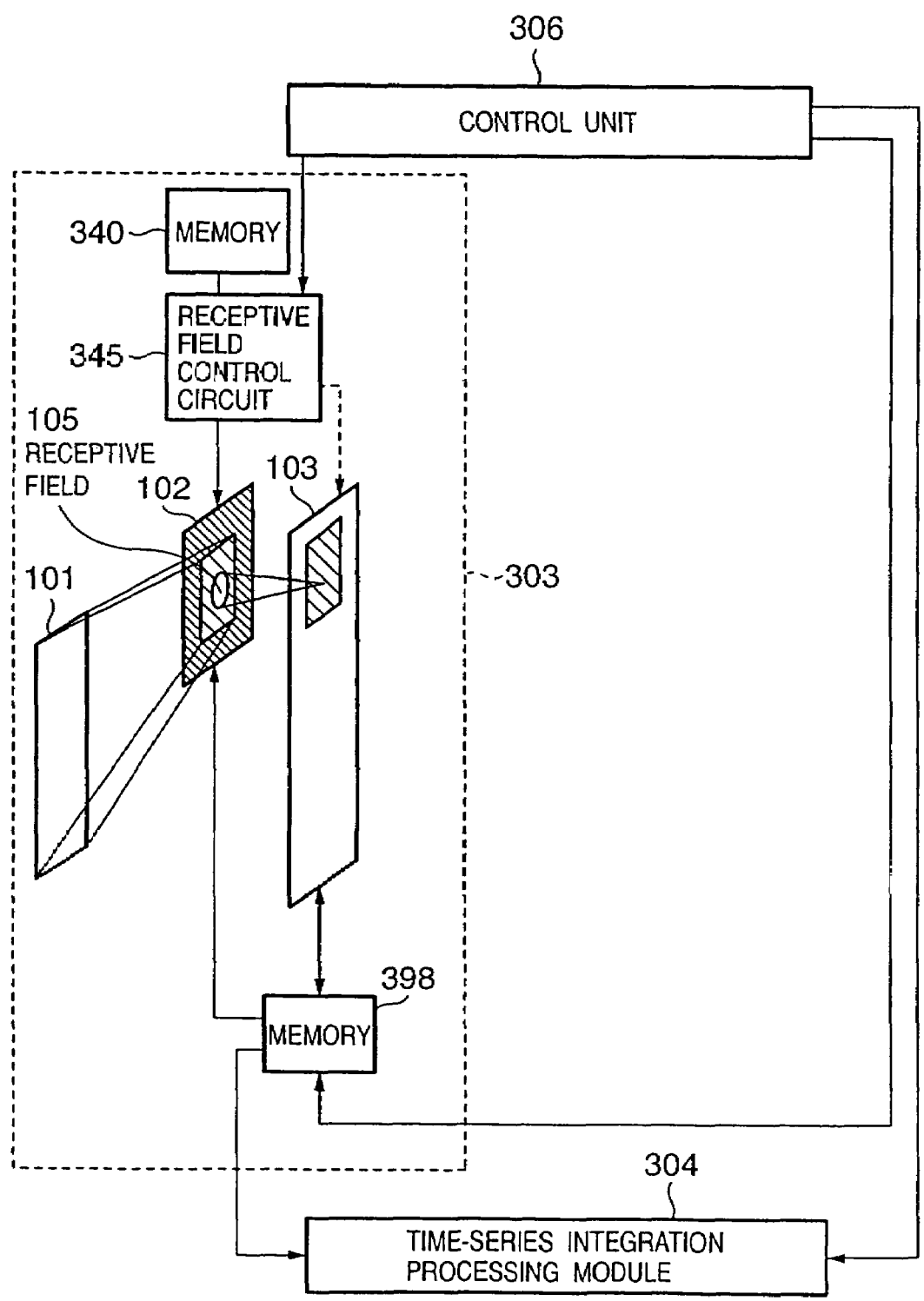
FIG. 21 is a view showing the arrangement of main part of the eighth embodiment.

FIG. 21 is a view showing the arrangement of main part of this embodiment. In this embodiment, synaptic weight data stored in a memory 340 is time-serially supplied to each synapse circuit element of the systolic array structure of a feature detection layer 102 and feature integration layer 103, thereby dynamically and time-serially controlling the local receptive field structure. Assume that the synaptic weight is given by the injected (accumulated) charge amount of a floating gate element or capacitor. As described in the seventh embodiment, a voltage signal corresponding to the weight data read out from the memory 340 is supplied while accessing each synapse circuit element $S_k$. As is apparent from comparison with FIG. 20, the circuit arrangement is largely simplified.

The output (output from the feature integration layer) from a local region recognition processing module 303 is integrated by a time-serial integration processing module 304 in synchronism with a timing control signal of the systolic array processor, which is supplied from a control unit 306, and the presence/absence of an object category is determined by a determination unit 305. Main processing in the time-serial integration processing module 304 and determination unit 305 has already been described in the fourth embodiment, and a description thereof will be omitted.

Figure 22:
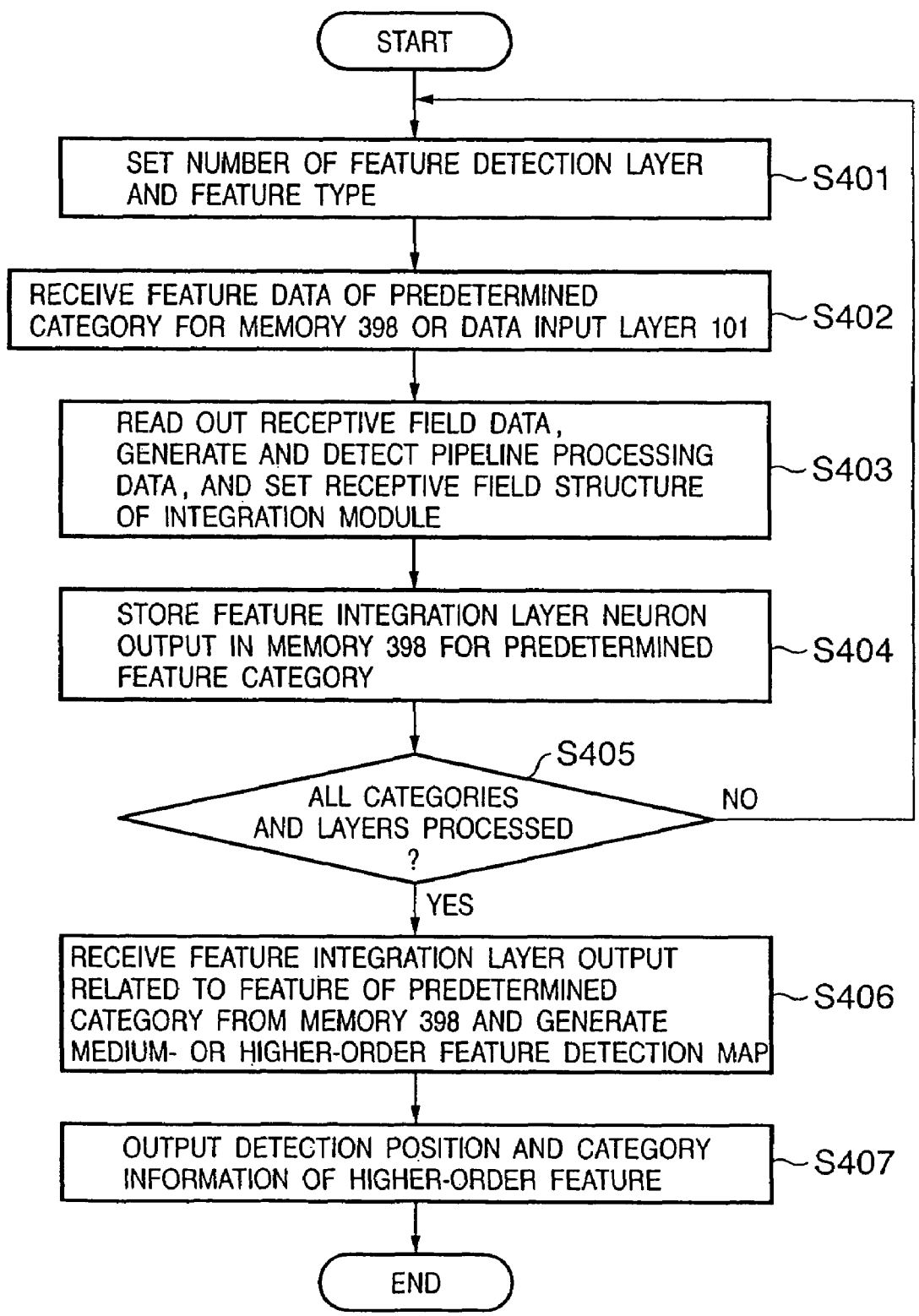
FIG. 22 is a flow chart showing main processing of the eighth embodiment.

FIG. 22 is the main processing flow chart of this embodiment. In step S401, the control unit 306 sets the number of a feature detection layer (from lower- to higher-order) and a feature type (category or size) in the layer. This settling is done in accordance with a predetermined procedure.

In steps S402 and S403, the detection module of the feature detection layer executes predetermined weighting for feature data or image data of a predetermined category for a memory 398 or data input layer 101 in accordance with the receptive field structure and inputs them. In step S403, a receptive field control circuit 345 time-serially sets the receptive field structure as pipelined data of synaptic weight. As in the above embodiment, the receptive field structure of each neuron of the feature detection layer is updated in accordance with the feature type. However, the receptive field structure of each neuron of the feature integration layer need not always be updated if the scale level in the feature types is the same.

In step S404, the output for each feature type from the feature detection layer is subjected to sub-sampling (feature integration layer), and the result (position information and detection level) is stored in the memory 398 at an address that changes depending on the feature type. Processing in steps S401 to S404 is time-serially repeated for all feature categories and layer numbers (S405). After that, in step S406, the time-serial integration processing module 304 reads out the detection result about each feature type from the memory 398 and generates a detection map of medium- or higher-order features. The control unit 306 executes threshold value processing in step S407 to finally determine whether an object of a predetermined category exists. If it exists, the information of a specific position is output.

As described above, according to the fourth to eighth embodiments, input data is scanned, and a plurality of feature detection results obtained in a local region are integrated. With this arrangement, the scale of a circuit for detecting (recognizing) a pattern of a predetermined category or size can be largely reduced, and efficient processing can be executed.

Especially, according to the above-described arrangements, local features (patterns) having different sizes and the same category are efficiently extracted with a small circuit scale.

In integrating local patterns extracted (detected) at different positions, the configuration information between medium-order patterns can be searched from data described by a dictionary format generated in a list structure with supplementary data, and then processed by a simple logic circuit. Hence, a higher-order pattern can be detected at a high speed.

Even when an object is partially occluded by another object, the object can be stably detected by detecting and integrating lower- or medium-order patterns obtained by processing sensor output values.

In addition, when the receptive field structure is controlled in accordance with the feature type to be detected, the circuit scale can be greatly reduced.

Ninth Embodiment

Overall Arrangement and Outline of Each Unit

Figure 23:
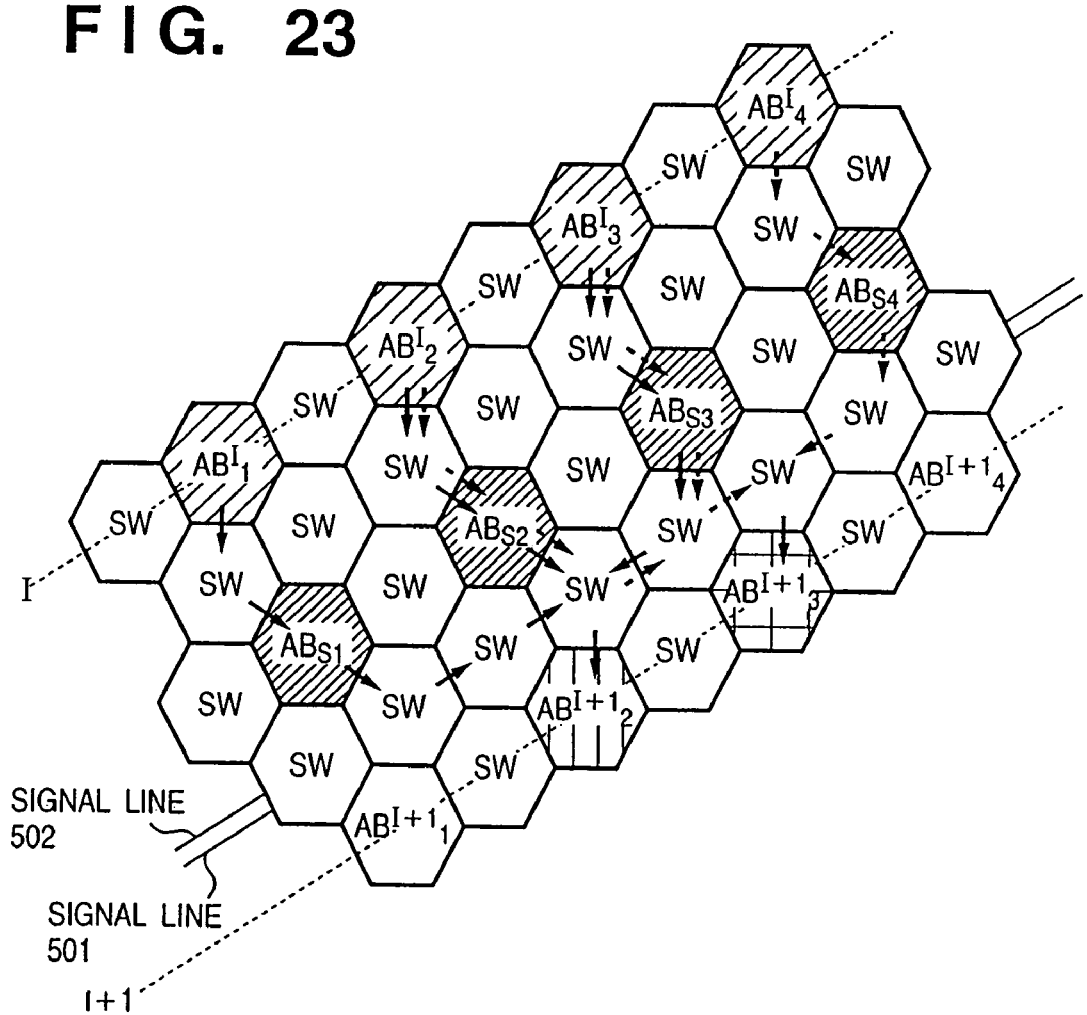
FIG. 23 is a view showing the arrangement of main part of an arithmetic processing circuit according to the ninth embodiment.

The ninth embodiment of the present invention will be described below in detail with reference to the accompanying drawings. FIG. 23 is a view showing the arrangement of main part of a reconfigurable processing circuit of this embodiment. This circuit forms a signal processing circuit as a reconfiguration processing circuit 513 together with a circuit arrangement information storage unit 511 and circuit arrangement control unit 512, as shown in FIGS. 26 to 29.

The reconfiguration processing circuit 513 comprises three types of processing element blocks, i.e., switch blocks SW capable of multiple-input and multiple-output and two types of analog processing blocks ($AB^I$ and $AB_S$), switch block control lines (see FIG. 24; not illustrated in FIG. 23) for transmitting signals between the block and ON/OFF-pattern-controlling the switch blocks SW, and analog processing block control lines (see FIG. 24; not illustrated in FIG. 23) for controlling modulation parameters of signals in the analog processing blocks.

Each control line includes a clock signal line (not shown) and digitally transmits a control signal to a predetermined block at a predetermined clock timing. The analog processing block $AB^S$ represents a neuron element of layer level I, and the analog processing block $AB^S$ represents a synapse element (to be described below). The switch block is a circuit block that receives a predetermined clock signal and is digitally controlled. The analog processing blocks ($AB^I$ and $AB_S$) are used to execute analog processing and are not always composed of only analog circuit elements such as a capacitor or resistor. They may incorporate a digital circuit element.

Referring to FIG. 23, the transmission paths of signals to be received by a neuron element $AB^{I+1}_3$ of the I+1 layer are
$AB^I_4 \rightarrow SW \rightarrow AB_{S4} \rightarrow SW \rightarrow AB^{I+1}_3$,
$AB^I_3 \rightarrow SW \rightarrow AB_{S3} \rightarrow SW \rightarrow AB^{I+1}_3$, and
$AB^I_2 \rightarrow SW \rightarrow AB_{S2} \rightarrow SW \rightarrow AB^{I+1}_3$. The transmission paths of signals to be received by a neuron element $AB^{I+1}_2$ of the I+1 layer are $AB^I_3 \rightarrow SW \rightarrow AB_{S3} \rightarrow SW \rightarrow AB^{I+1}_2$,
$AB^I_2 \rightarrow SW \rightarrow AB_{S2} \rightarrow SW \rightarrow AB^{I+1}_2$, and
$AB^I_1 \rightarrow SW \rightarrow AB_{S1} \rightarrow SW \rightarrow AB^{I+1}_2$. These paths partially overlap. The amount of analog modulation executed by the synapse element at the overlapping portion generally changes depending on the signal path. The synapse element employs the arrangement shown in FIGS. 25A and 25B such that a different modulation amount can be applied for each path (input signal) (details will be described later).

Figure 24:
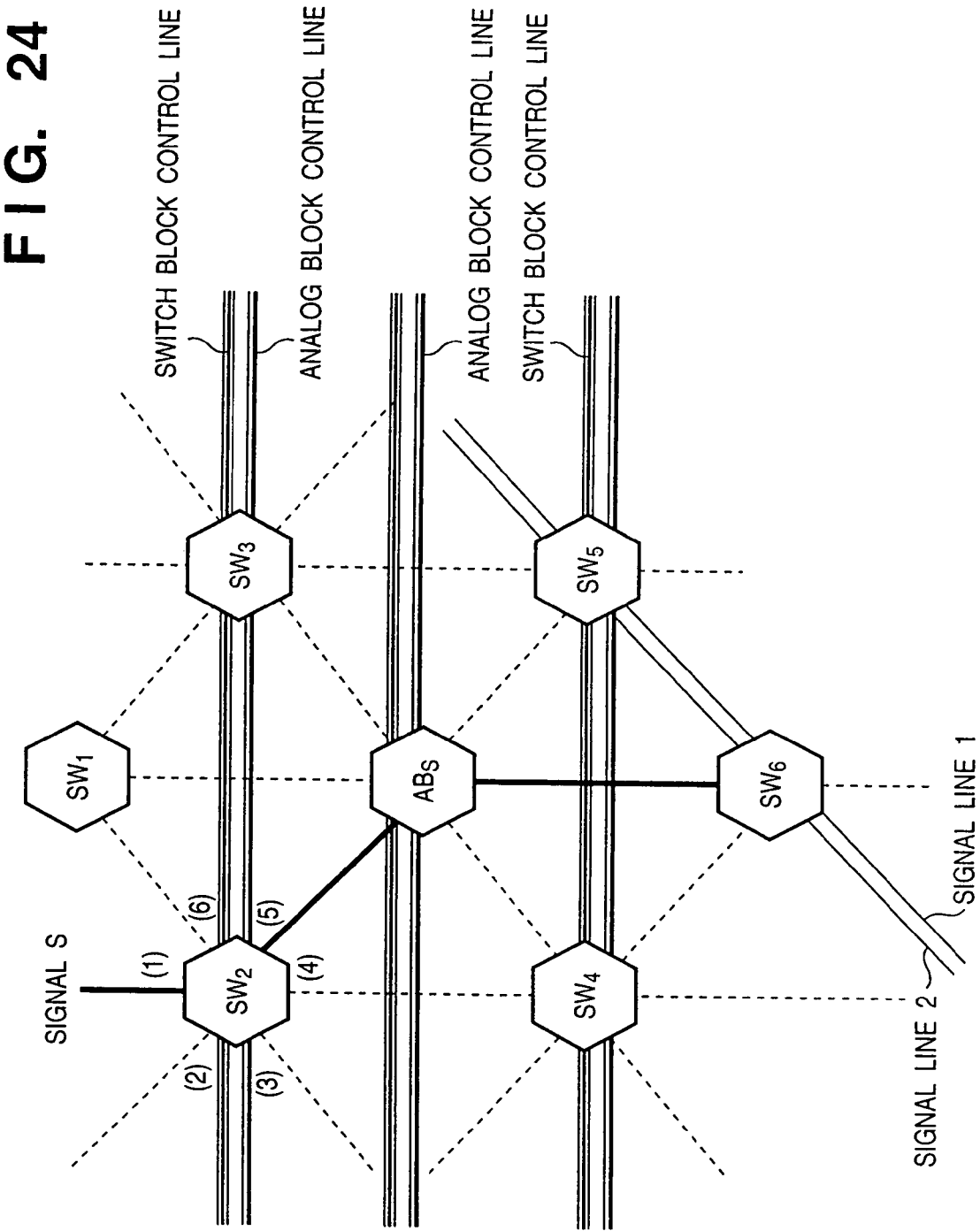
FIG. 24 is a view showing connection between basic component blocks of a reconstructable signal processing circuit.
Figure 26:
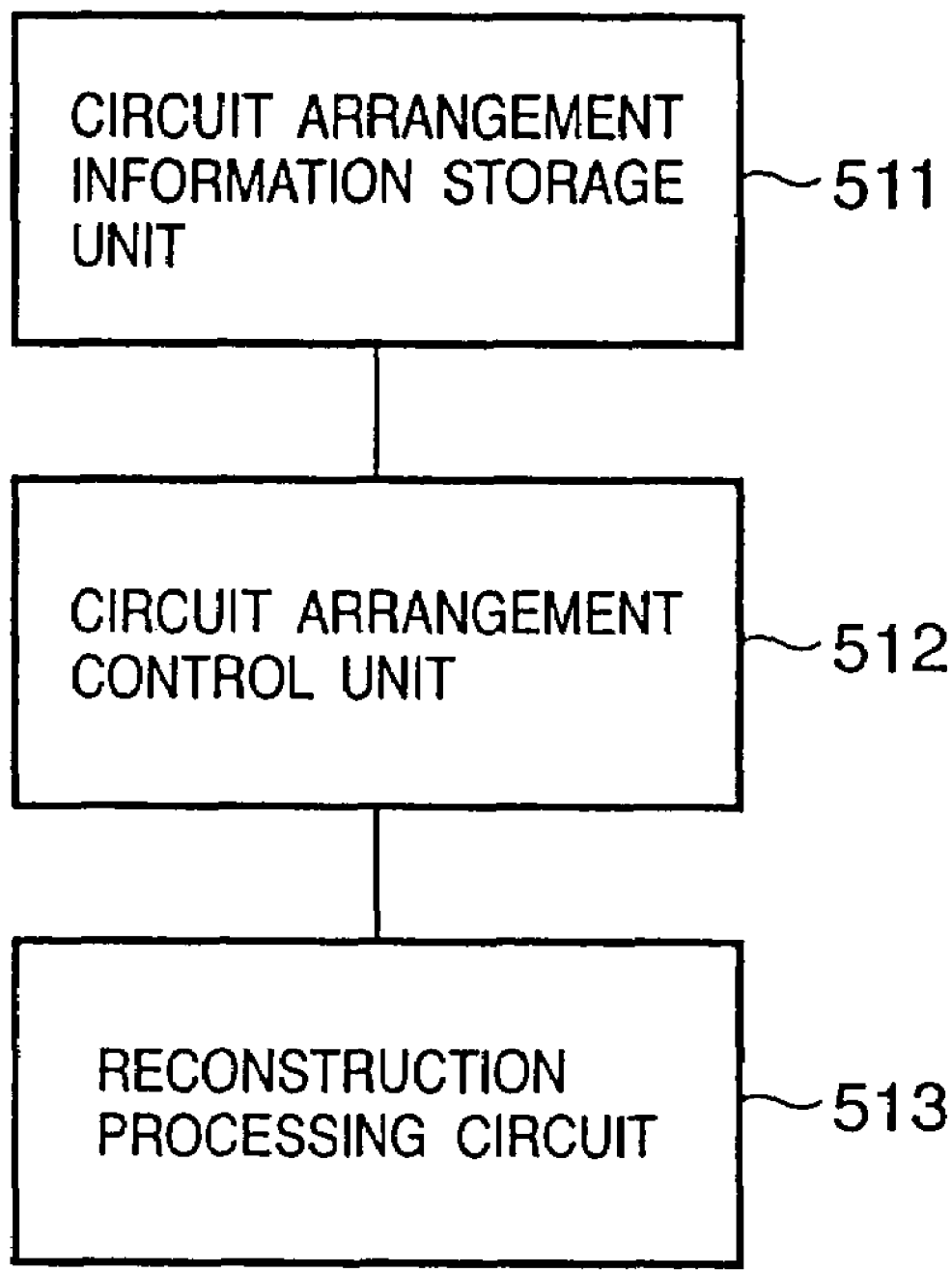
FIG. 26 is a block diagram showing the arrangements of a synapse section and neuron element.

The circuit arrangement control unit 512 shown in FIG. 26 outputs control signals to the switch block control lines and analog processing block control lines shown in FIG. 24. A control signal corresponding to the former controls ON/OFF control information of the switch element in each switch block SW (FIGS. 27 to 29). A control signal corresponding to the latter controls the modulation characteristic (e.g., the pulse phase modulation amount) for signal in a synapse element or a characteristic such as the time window width or weight function of time-window weighted integration in a neuron element.

Each analog processing block AB (both $AB^I$ and $AB_S$) is surrounded by the switch blocks SW. Since the number of input/output directions is six, each block has a hexagonal shape. However, each block may have any other shape with a predetermined number of inputs/outputs. FIG. 24 shows the connection state between the blocks. Numbers around the switch block $SW_2$ indicate general signal transmission directions (vertical and oblique directions) from the switch block SW. For these transmission directions, a solid line indicates a state wherein the interconnection through the switch block SW allows signal transmission between the blocks (between the switch blocks or between the switch block and the analog processing block), and a broken line indicates a state wherein the interconnection does not allow signal transmission.

The ON/OFF operation of each switch block SW is set for each signal input/output direction (six directions in FIG. 24) through the switch block control line running in the horizontal direction in FIG. 24. A plurality of types of data of the ON/OFF pattern of each switch block SW are stored in a predetermined memory (e.g., an SRAM, DRAM, or MRAM) in advance. They can be updated (switched) in accordance with processing contents.

Figure 27A:
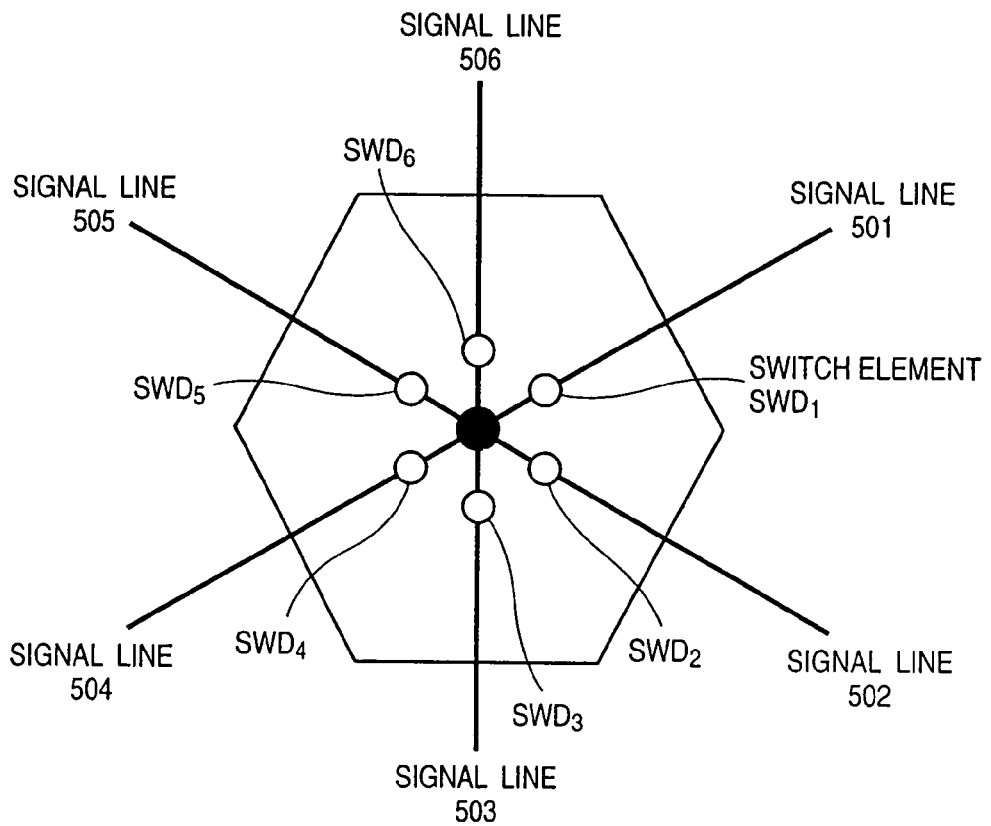
FIGS. 27A and 27B are views showing the arrangement of a switch block.
Figure 27B:
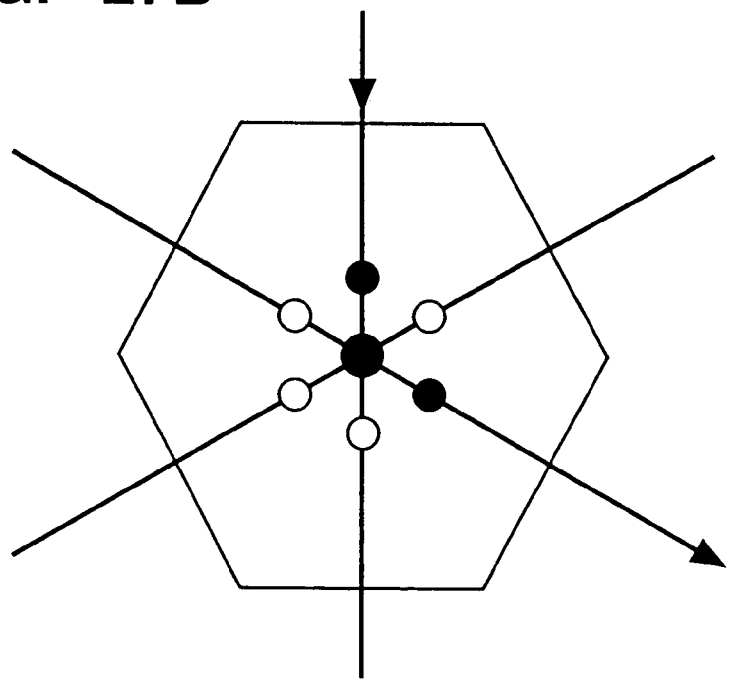
Figure 28A:
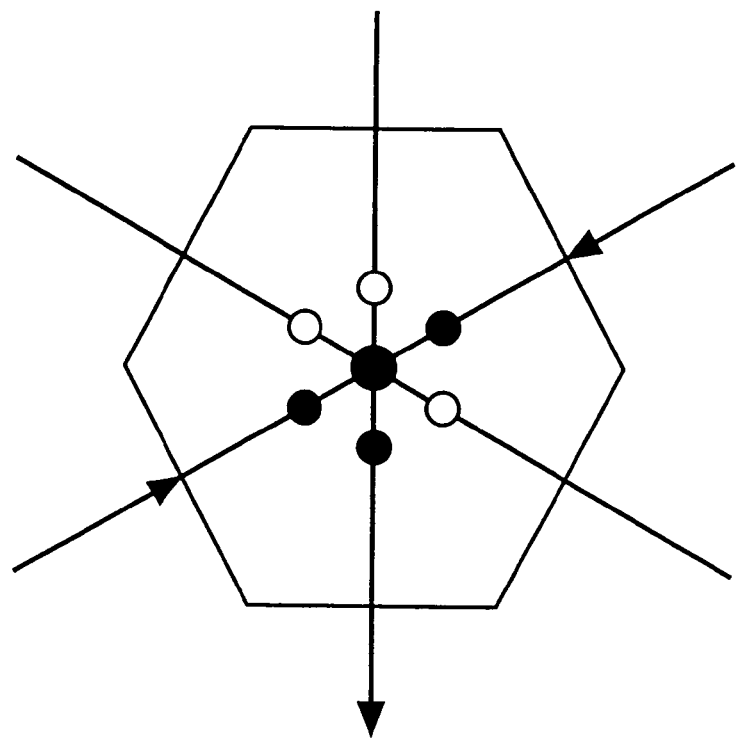
FIGS. 28A and 28B are views showing the arrangement of a switch block.

FIG. 27A shows the arrangement of the switch block SW. A total of six switch elements serving as digital circuit elements are arranged in the respective directions. With the respective ON/OFF patterns (the ON state is indicated by ●, and the OFF state is indicated by ○), the control function of output direction as shown in FIG. 27B and a function of integrating a plurality of input signals and outputting them to a predetermined direction as shown in FIG. 28A can be realized.

Figure 28B:
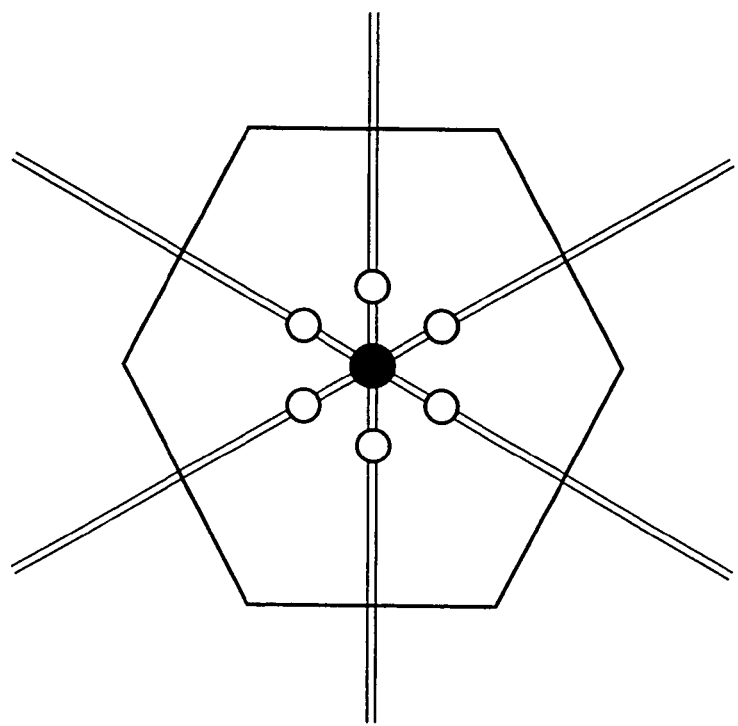
Figure 29:
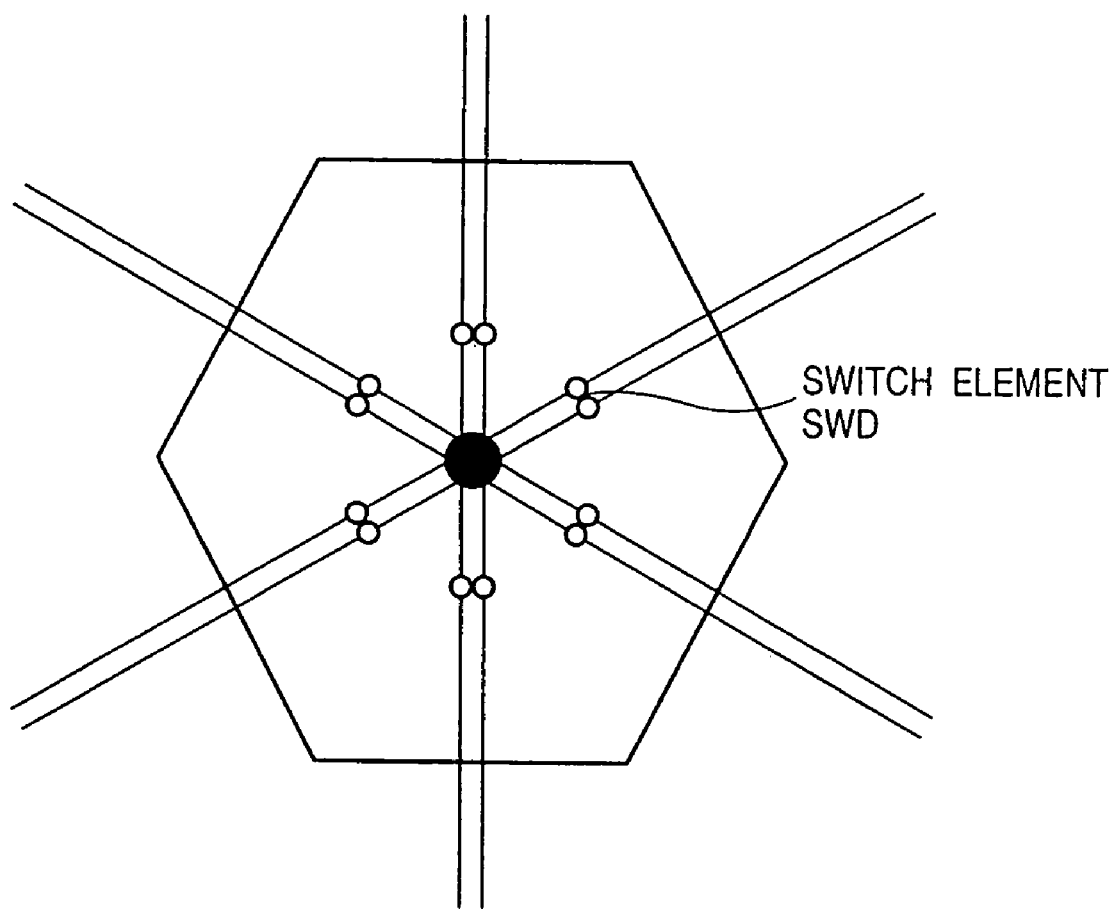
FIG. 29 is a view showing the arrangement of a switch block.

As shown in FIG. 28B or 29, a plurality of signals lines may be independently set in each direction. Referring to FIG. 28B, one switch element is assigned to a plurality of signal lines running in the same direction. Referring to FIG. 29, a switch element is arranged in correspondence with each of a plurality of signal lines running in the same direction. With this arrangement, a plurality of pulse signal flows can be independently controlled by a single switch block SW. As a switch element, an element described in the prior art is used. State control of the switch elements in the switch block is performed at a predetermined clock timing through the switch block control line.

Signal lines 501 and 502 in FIGS. 23 and 24 are lines for transmitting a signal analog-modulated by the synapse element $Ab_S$ to the neuron element $AB^I$. This corresponds to the arrangement shown in FIG. 28B used in the switch block SW. Referring to FIG. 23, the signal line 501 transmits a signal to the neuron element $AB^{I+1}{}_3$, and the signal line 502 transmits a signal to the neuron element $AB^{I+1}{}_4$.

These signal lines are used as a local common bus line through which a pulse train signal formed in a set of predetermined interval patterns propagates.

For the illustrative convenience, only two signal lines are shown in FIG. 24. Actually, more signal lines may be arranged. However, when the number of signal lines increases, the occupation ratio of the interconnection area to the entire circuit becomes too high, and the degree of integration may not be increased. Hence, the number of signal lines is limited.

A number of signal lines beyond the limitation may be required, for example, when n neuron elements in the I+1 layer are to receive output signals from s partially overlapping neuron elements in the I layer using m (n>m) signal lines after the signals undergo analog modulation in different amounts by synapse elements.

In this case, ON/OFF pattern of the switch block SW connected to the neuron element AB block is time-divisionally switched. At this time, the modulation amount of an analog modulation circuit (to be described later) in the analog processing block $AB_S$ serving as a synapse element is also updated in accordance with the control signal from the circuit arrangement control unit 512 through the analog block control line (FIG. 24).

The function of each block in the signal processing circuit of this embodiment will be described next. The switch block SW controls the flow of a signal from an analog processing block ($AB^I$ or $AB_S$) connected to it, thereby determining the range (to be referred to as a "receptive field" hereinafter) of neuron elements in the lower layer from which the neuron elements of upper layer level receive inputs. A connection structure given by the receptive field can be arbitrarily set by the ON/OFF patterns of a plurality of switch blocks SW.

The distribution structure of synaptic connection weight in the receptive field can be arbitrarily given by setting individual parameters of a plurality of modulation circuits in the analog processing block (to be described later).

As a result, it is unnecessary to store synaptic weight information or interconnection information in a digital memory element and to frequently access the memory. For this reason, a high-speed parallel processing characteristic can be ensured. Simultaneously, flexibility and extendibility can be obtained so that the circuit arrangement can be changed in accordance with the processing contents (e.g., the type of feature to be extracted).

Figure 25A:
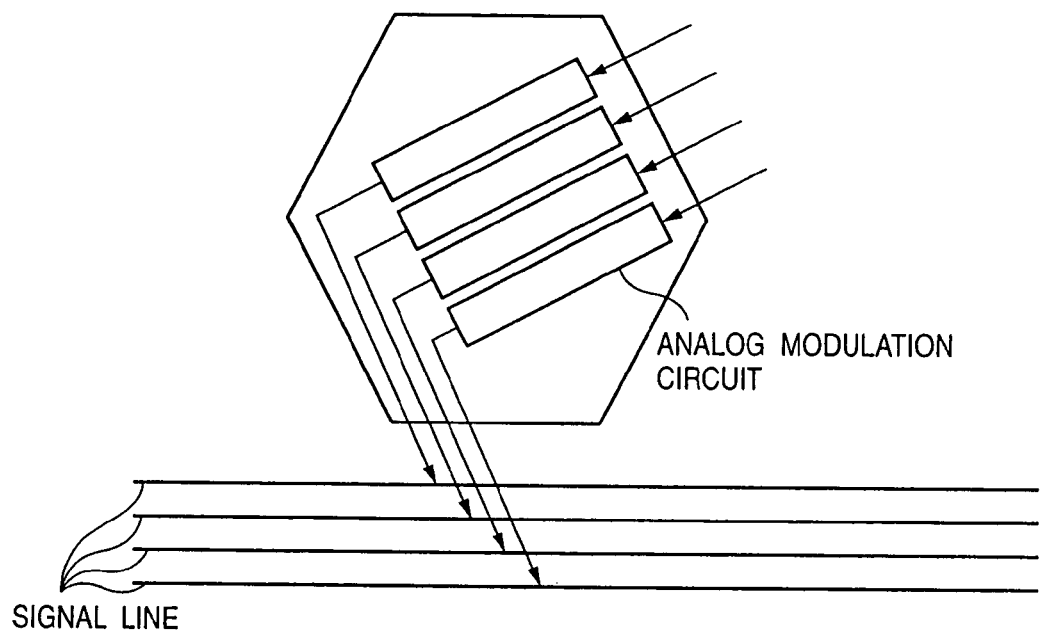
FIGS. 25A and 25B are views showing the arrangement of a synapse analog processing block.
Figure 25B:
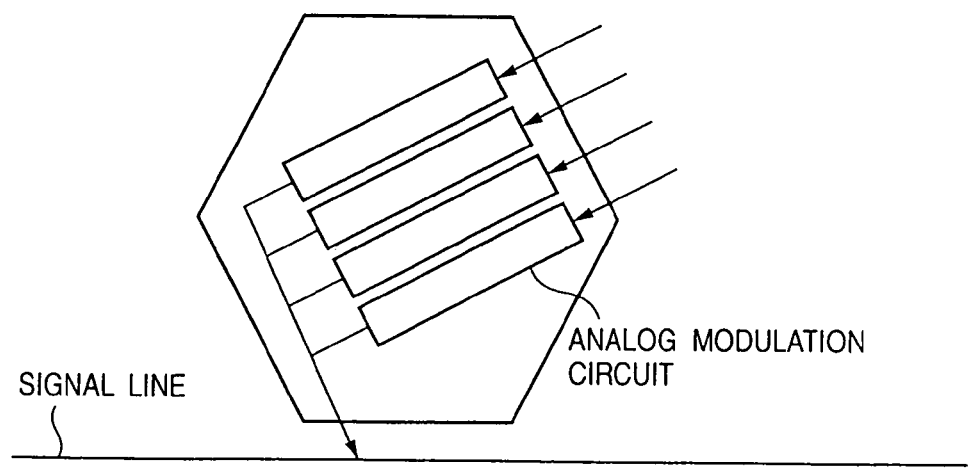

The analog processing block $AB_S$ is a multiple-input/multiple-output element capable of individually setting a signal modulation amount in accordance with a plurality of synaptic weight values. The analog processing block $AB_S$ typically outputs a signal obtained by integrating an input signal with a synaptic weight value (in the embodiment to be described later, the analog processing block $AB_S$ outputs the phase modulation signal of an input pulse signal). As shown in FIGS. 25A and 25B, the analog processing block $AB_S$ incorporates a plurality of analog modulation circuits in correspondence with the plurality of synaptic weight values.

One analog processing block $AB_S$ can set the range of each neuron on an output side I and input side J within a predetermined range and incorporates a plurality of analog modulation circuits for executing modulation corresponding to a synaptic weight value determined by an output-side neuron element address and input-side neuron element address. FIGS. 25A and 25B shows the structure.

FIG. 25A shows the arrangement of the synapse element used in the present invention, which incorporates analog modulation circuits equal in number to the output lines (input lines). For the illustrative convenience, FIGS. 25A and 25B show no analog block control lines. The modulation amount (in this embodiment, modulation of the pulse phase (delay amount) or pulse width) of each analog modulation circuit is set or updated through the control line.

FIG. 25B shows the arrangement of a multiple-input/single-output synapse element. This element is used when a plurality of neuron elements in the upper layer are to time-divisionally receive signal outputs from overlapping neurons in the lower layer, and the signals undergo analog modulation in different amounts by the synapse element in accordance with the address or location of the neuron element in the upper layer.

For example, referring to FIG. 23, both the signal transmission path (indicated by the dotted arrow) from the neuron element $AB^I{}_3$ in the I layer to the neuron element $AB^{I+1}{}_3$ in the I+1 layer and that (indicated by the solid arrow) from the neuron element $AB^I{}_3$ to the neuron element $AB^{I+1}{}_2$ pass through the synapse element $AB_{S3}$.

In the synapse element $AB_{S3}$, the parameters of the plurality of internal modulation circuits are set such that different modulation amounts (pulse phase modulation, pulse width modulation, or the like) are obtained for the respective transmission paths (or the addresses of the upper layer neurons).

With this arrangement, even when neuron elements close to each other have overlapping receptive field structures, a plurality of signal transmission paths can be set through a single analog processing block $AB_S$. As a result, the problem of heavy interconnections between the circuit elements of a neural circuit network can be reduced, and the number of circuit elements can be decreased.

In pulse phase modulation(to be described below), the analog modulation amount can be given by a charge amount applied to a capacitor as a component of a synapse circuit. A predetermined charge amount is applied to a floating gate element or capacitor of each modulation circuit in the analog processing block $AB_S$ through the analog processing block control line (FIG. 24).

The circuit arrangement control unit 512 shown in FIG. 26 reads out synaptic weight value data (e.g., an applied voltage for giving a predetermined accumulated charge amount) stored in the circuit arrangement information storage unit 511 and then injects a current until charges corresponding to the synaptic weight value are accumulated (a voltage is generated) in the floating gate element (or capacitor). After that, the circuit arrangement control unit 512 time-serially accesses the synapse circuit elements $AB_{S_k}$ (k=1, 2, . . . ) as components of a receptive field structure and applies a voltage to inject charges (hot electrons), thereby setting the synaptic weight distribution structure (receptive field structure). Note that a memory element (e.g., an MRAM or FeRAM) capable of quickly rewriting data corresponding to the weight value and holding the data for a predetermined time may be used.

A case wherein a neural network circuit for recognizing an image by parallel and hierarchical processing using the arrangement shown in FIG. 23 will be described next. The processing contents of the neural network circuit will be described first in detail with reference to FIG. 30. The same reference numerals as in FIG. 11 denote similar parts in FIG. 30. This neural network circuit hierarchically processes information related to recognition (detection) of an object or geometrical feature in a local region of input data. Its basic structure is a so-called convolutional network structure, as described above with reference to FIG. 11. The output from the final layer (uppermost layer) corresponds to a recognition result, i.e., the category of a recognized object and its position information on the input data.

A data input layer 101 inputs local region data from a CMOS sensor or a photoelectric conversion element such as a CCD element under an instruction of a scanning unit 301. The first feature detection layer (1,0) of feature detection layers 102 detects local lower-order features (it may include not only a geometrical feature such as a specific direction component or specific spatial frequency component but also a color component feature) from an image pattern input from the data input layer 101 for each local region around each position in the entire frame (or for each local region around each predetermined sampling point in the entire frame). The lower-order features may have a plurality of feature categories at a portion at a plurality of scale levels or resolutions. Hence, the feature detection layer (1,0) is formed from neuron elements, each has a receptive field structure corresponding to the type of feature (e.g., to extract a line segment in a predetermined direction as a geometrical feature, the gradient of the line segment as the geometrical structure) and generates a pulse train in accordance with the detection level.

The first feature integration layer (2,0) of feature integration layers 103 is formed from neuron elements, each has a predetermined receptive field structure (a receptive field means the connection range with the output element of the immediately preceding layer, and a receptive field structure means the connection weight distribution) and generates a pulse sequence. The feature integration layer 103 (2,0) integrates (by means of arithmetic processing such as local averaging or sub-sampling by maximum output detection) a plurality of neuron element outputs in the same receptive field from the feature detection layer 102 (1,0). The receptive fields of neurons in the same feature class of the feature detection layer have a common structure.

Each of feature detection layers 102 (1,1), (1,2), . . . , (1,M) subsequent to the feature detection layer 102 and feature integration layers 103 (2,1), (2,2), . . . , (2,M) has a predetermined receptive field structure and functions like the above-described layer. That is, the former ((1.1), . . . ) detects a plurality of different features in each feature detection module 104. The latter ((2.1), . . . ) integrates detection results about the same type of feature from the preceding feature detection layer in each feature integration module 106. The former feature detection layer is connected (wired) to receive the outputs from neuron elements in the preceding feature integration layer belonging to the same channel. In sub-sampling, i.e., processing executed in the feature integration layer, for outputs from a local region (local receptive field of the feature integration layer neuron) from feature detection cells of the same feature category, local averaging or maximum value detection is executed.

The above-described parallel and hierarchical structure is implemented by the arrangement shown in FIG. 23, and synapses constitute the analog processing block $AB_S$, and neuron elements in the I layer constitute the analog processing block $AB^I$.

As described above, FIG. 12A shows the arrangement of a connection section related to the outputs (inputs when viewed from the cell) of neurons ($n_i$) for feature integration (detection) cells that form a receptive field with respect to a given feature detection (integration) cell. A portion serving as a signal transmission unit indicated by a bold line forms a common bus line. Pulse signals from a plurality of neurons are time-serially arranged and transmitted on the signal transmission line.

So-called excitatory connection amplifies a pulse signal in a synaptic connection section S. Conversely, inhibitory connection attenuates a signal. In transmitting information by a pulse signal, amplification and attenuation can be realized by any one of amplitude modulation, pulse width modulation, phase modulation, and frequency modulation of the pulse signal. In this embodiment, the synaptic section S is mainly used as a pulse phase modulation element. Amplification of a signal is converted into a substantial advance of the pulse arrival time as an amount unique to a feature. Attenuation is converted into a substantial delay. That is, synaptic connection gives an arrival position (phase) on a time axis unique to each feature at a neuron as an output destination. Excitatory connection qualitatively gives an advance in phase of an arrival pulse with respect to a reference phase, and inhibitory connection gives a delay in effect.

Referring to FIG. 12A, each neuron element $n_j$ outputs a pulse signal (spike train) and executes so-called integrate-and-fire type input/output processing. A neuron circuit of the analog processing block $AB^I$ will be described next. Each neuron element is an extended model of a so-called integrate-and-fire neuron. Each neuron element is the same as a so-called integrate-and-fire neuron in that the element fires and outputs a pulse signal when a result obtained by linearly and time-spatially adding input signals (pulse sequence corresponding to an action potential) exceeds a threshold value.

FIG. 12B shows the basic arrangement representing the operation principle of a pulse generation circuit (CMOS circuit) serving as a neuron element. It is an extended version of a known circuit (IEEE Trans. on Neural Networks Vol. 10, p. 540) and can execute weighted integration of input pulse signals in a predetermined time window (for a higher-order feature detection method by time-windowed integration, see Japanese Patent Application No. 2000-181487 by the present applicant). As input signals, excitatory and inhibitory inputs are received.

The operation control mechanism of the pulse firing timing of each neuron element is irrelevant to the present invention, and a description thereof will be omitted.

Signal transmission between neurons by pulse signals can be executed by so-called AER (Address Event Representation) (Lazzaro et al. Silicon Auditory Processors as Computer Peripherals, in Tourestzky, D. (ed), Advances in Neural Information Processing Systems 5. San Mateo, Calif.: Morgan Kaufmann Publishers, 1993) or the like. Alternatively, a method disclosed in Japanese Patent Application No. 2000-181487 by the present applicant may be used. These methods are suitable to transmit pulse signals from a plurality of neurons through a local common bus, as shown in FIG. 12A.

The above-described pattern recognition apparatus can be mounted in an image input apparatus such as a camera or an image output apparatus such as a printer or display. As a result, a specific object can be recognized or detected using the compact circuit arrangement with low power consumption, and predetermined operations, e.g., for the image input apparatus, processes such as focusing, exposure correction, zooming, and color correction for a specific object can be executed. Even for the image output apparatus, processes such as optimum color correction for a specific object can be automatically executed.

As described above with reference to FIG. 5, even when the pattern detection (recognition) apparatus with the arrangement of this embodiment is mounted in an image sensing apparatus, focusing to a specific object, or color correction and exposure control for a specific object can be executed.

10th Embodiment

Figure 31:
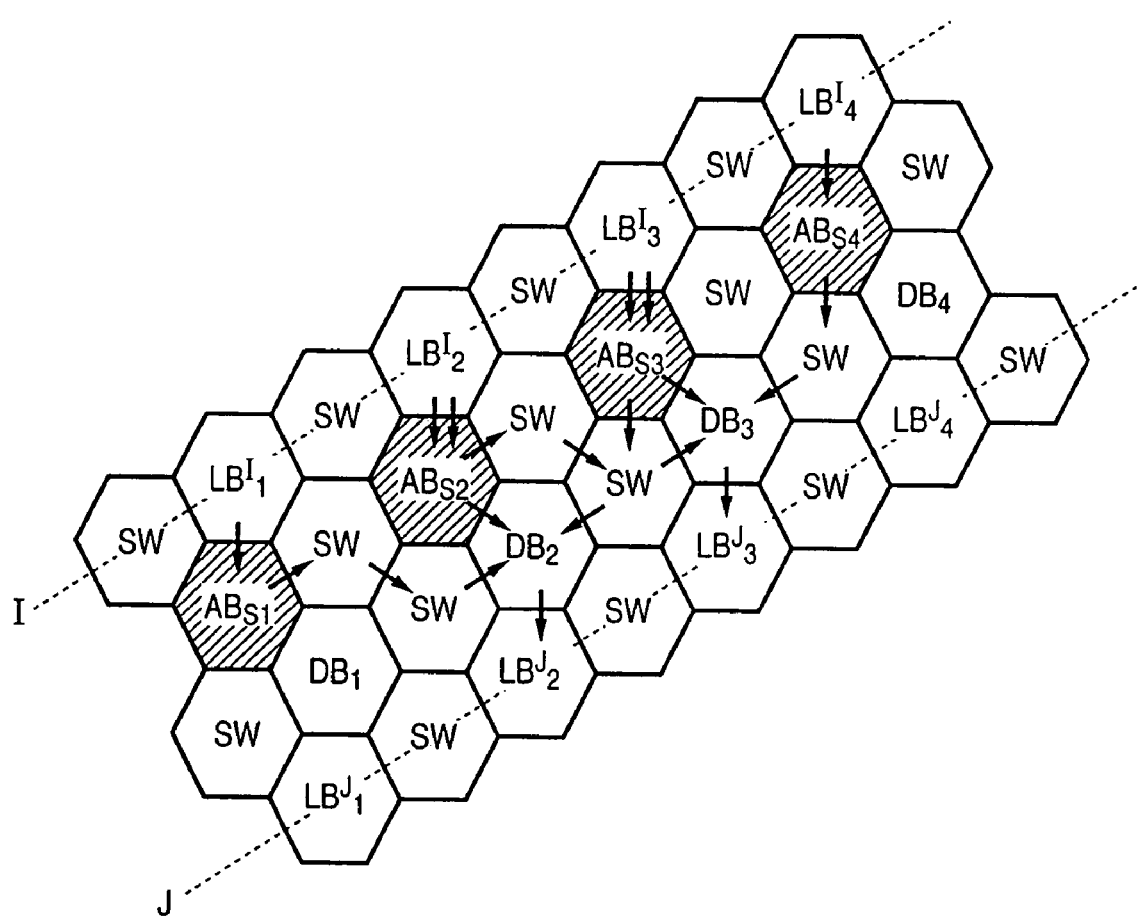
FIG. 31 is a view showing the arrangement of main part of an arithmetic processing circuit.

FIG. 31 shows another arrangement of a neural network circuit implemented as a reconfigurable analog-digital mixed type circuit. The reconfigurable signal processing circuit according to this embodiment is another embodiment for implementing a hierarchical neural network circuit for pattern recognition, as shown in FIGS. 12A and 12B, and is the same as in the ninth embodiment in that a pulse signal is phase-modulated by a synapse circuit (analog processing block) in accordance with a detection category to hierarchically detect lower- to higher-order features.

This signal processing circuit is composed of analog processing blocks $AB_S$ each serving as a synapse element, digital processing blocks DB for giving a phase delay of a pulse signal, switch blocks SW for changing a receptive field structure (local connection structure between neurons), and logic processing blocks LB (some of neuron elements) for outputting predetermined signals on the basis of the output from an analog processing block $AB_{TT}$. The overall arrangement including a circuit arrangement information storage unit 501 and circuit arrangement control unit 502 is the same as in the ninth embodiment shown in FIG. 26.

When logic processing elements and other digital circuit elements are distributed and mixed like analog circuit elements, the influence of a variation in operation characteristic between the analog processing elements can be reduced, and stable operation can be performed even in a large-scale integrated circuit. This is because the digital circuit elements can absorb the factors of variation in analog processing elements.

Referring to FIG. 31, the transmission paths of signals to be received by a neuron element $LB^J_3$ of the Jth layer from neuron elements of the Ith layer (J>I and, generally, J=I−1) are $LB^I_4 \to AB_{S4} \to SW \to DB_3 \to LB^J_3$, $LB^I_3 \to AB_{S3} \to DB_3 \to LB^J_3$, and $LB^I_2 \to AB_{S2} \to SW \to DB_3 \to LB^J_3$.

The transmission paths of signals to be received by a neuron element $LB^J_2$ of the Jth layer from neuron elements of the Ith layer are $LB^I_3 \to AB_{S3} \to SW \to DB_2 \to LB^J_2$, $LB^I_2 \to AB_{S2} \to DB_2 \to LB^J_2$, and $LB^I_1 \to AB_{S1} \to SW \to DB_2 \to LB^J_2$.

Figure 32:
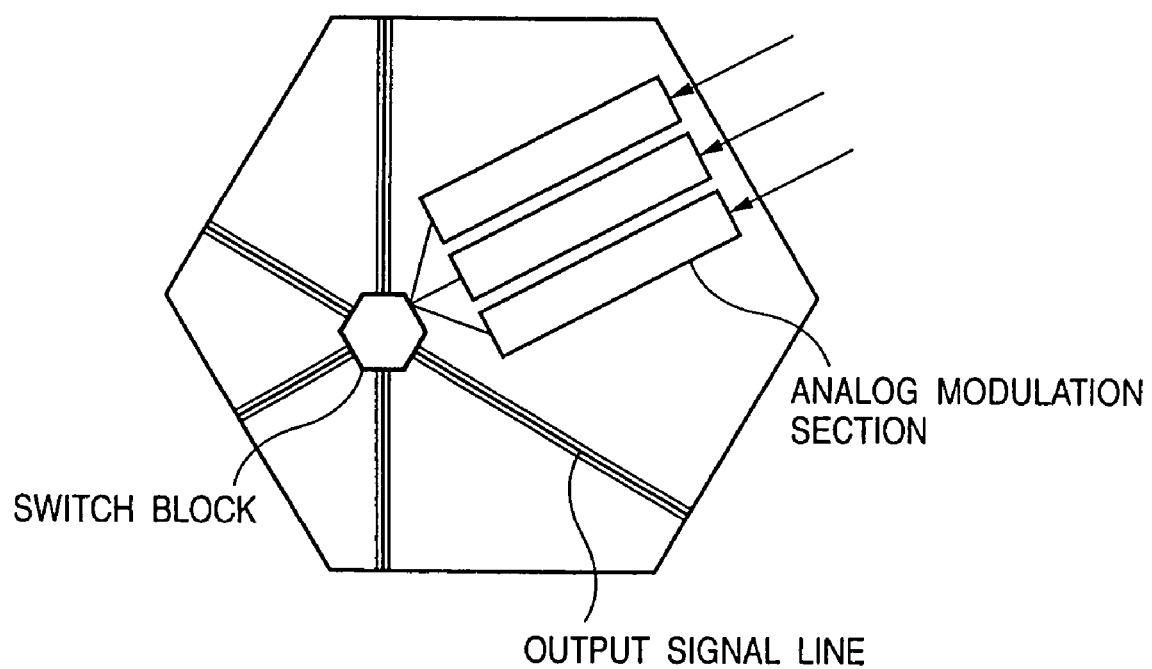
FIG. 32 is a view showing the arrangement of a synapse analog processing block.

The two path types each including three paths have partially overlapped path at a synapse element $AB_S$. As in the ninth embodiment, the amount of analog modulation executed by the synapse element at the overlapping portion generally changes depending on the signal path. In addition, the synapse element $AB_S$ has a branch output function to an appropriate path (direction) as well as the modulation function for input signals from a plurality of paths (signal lines). For this reason, the synapse element analog processing block $AB_S$ used in this embodiment employs the arrangement shown in FIG. 32. The analog processing block $AB_S$ independently receives three input signals and incorporates three analog modulation units and one switch element. The outputs from the analog modulation units can be arbitrarily output from the switch element to five directions.

Figure 33:
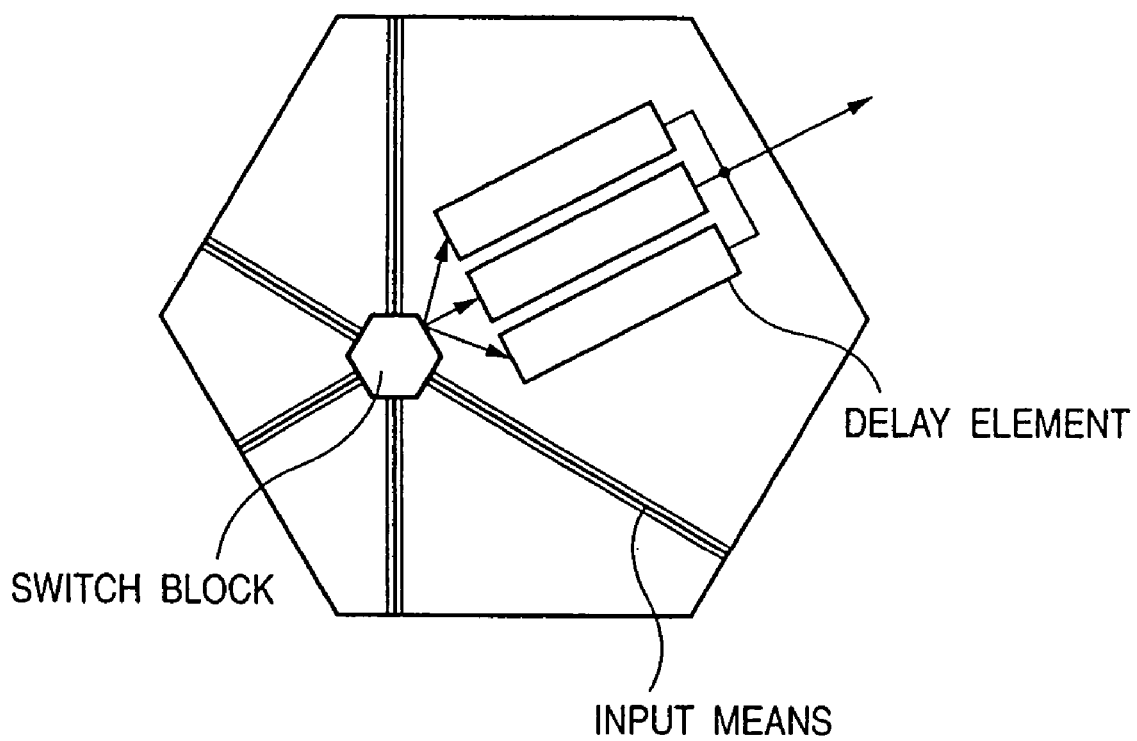
FIG. 33 is a view showing a digital processing block according to the 10th embodiment of the present invention.

FIG. 33 shows the arrangement of the digital processing block DB used in this embodiment. The digital processing block DB incorporates three delay elements and one switch block. This switch block is different from the switch block SW shown in FIG. 25A or 25B especially in that the switch block of this embodiment is formed from a switch element for temporally branching the output direction. The outputs from the three delay elements are integrated and output to one signal line.

Figure 34:
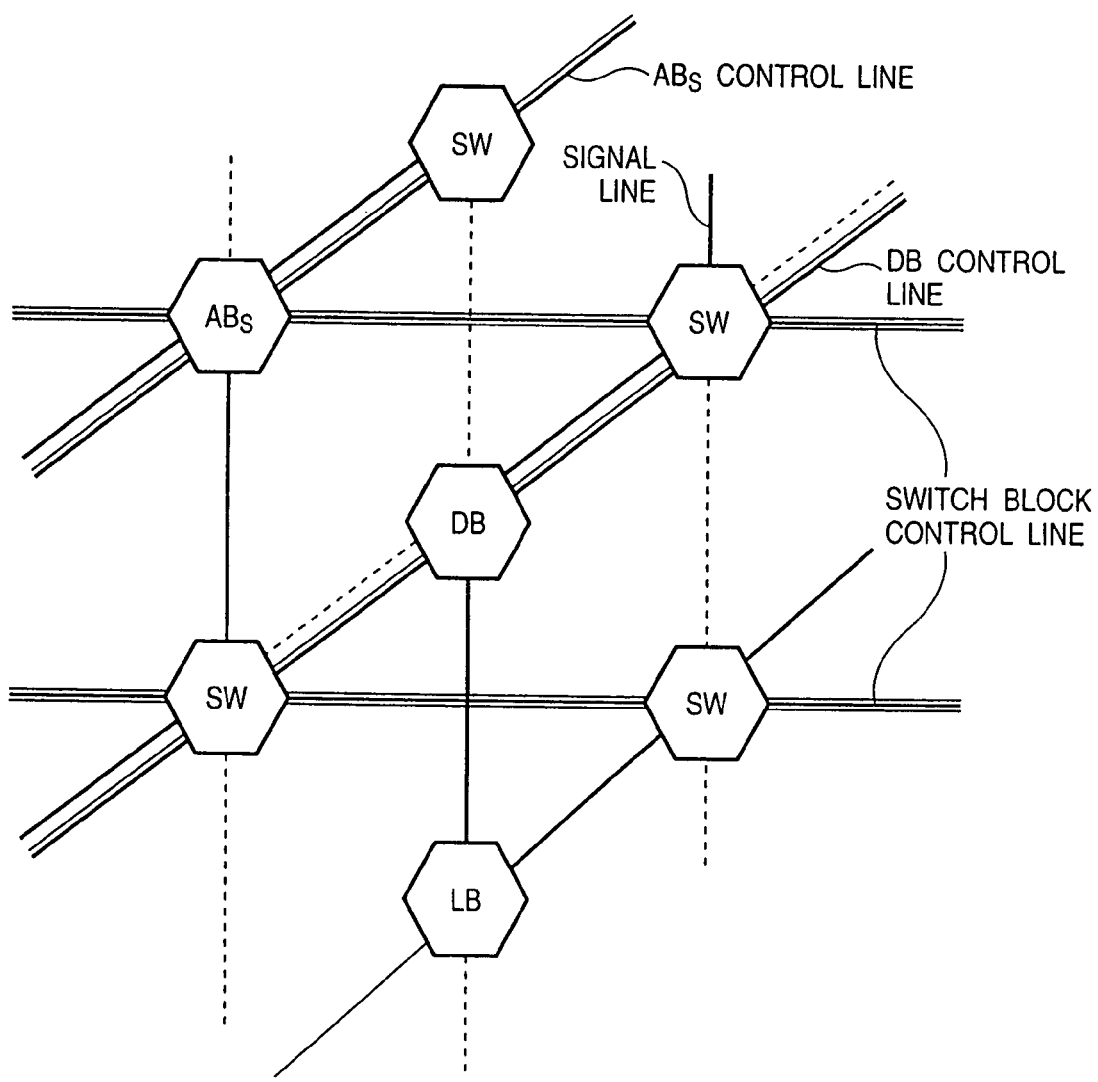
FIG. 34 is a view showing connection between basic component blocks of a reconfigurable signal processing circuit.

The synapse analog processing block $AB_S$ receives a pulse signal, applies predetermined pulse phase modulation (or time delay), and outputs the signal, as in the ninth embodiment. The modulation amount (or delay amount) is controlled through an $AB_S$ control line shown in FIG. 34. The delay characteristic of the digital processing block DB that gives a time delay is controlled through a DB control line shown in FIG. 34.

In this embodiment, the function of integrating a plurality of lower category detection signals by neuron elements is formed using the logic processing block LB. Some of the neuron element circuits constitute the logic processing blocks LB. The digital processing block is constituted by a kind of combinatorial logic circuit for determining whether input signals in a combination corresponding to a recognition category are received, by looking up a list structure data described in a list or dictionary format in advance and a predetermined recognition (detection) signal output circuit (flip-flop circuit and logic circuit).

As the simplest logic circuit form, as shown in the ninth embodiment, phase modulation is performed by a synapse circuit, and a plurality of pulse signal sequences representing different feature categories are received by the logic processing block and ANDed. In this embodiment, before ANDing by the logic processing block LB, the delay elements (digital circuit elements) in the digital processing block DB provide predetermined delays to the input pulses such that almost the same pulse arrival times can be obtained on the time axis.

For example, for a pulse signal representing detection of a given feature category, let $t_n$ be the pulse arrival time with respect to reference time. A delay element provides a delay of $T - t_n$ ($T > t_n$) to the pulse signal. Since the delay amount is digitally given, the outputs pulses from the delay elements sometimes do not strictly coincide on the time axis. The accuracy of the delay amount is set such that the magnitude of mismatch becomes about ½ or less of the pulse width.

When a logic processing block is to receive pulse signals modulated by the synapse circuit element through a common path, as in the ninth embodiment, the above-described delay element switches (modulates) the delay amount in accordance with the input pulse. The pulse signals are input to a multiple-input/single-output AND element through a multiplexer circuit.

With the above arrangement, detection of higher-order feature data given by a list structure of lower-order features can be realized by simple AND processing. However, in the simple AND processing, no higher-order feature is detected unless all the lower-order feature data as components are detected. A logic circuit may be designed such that a corresponding higher-order feature is detected when the ratio of detected components is equal to or more than a predetermined value. For example, assume that a higher-order feature is composed of M lower-order feature elements should be detected by detecting N lower-order feature elements in a predetermined spatial layout. To do this, an N-input/single-output AND element for receiving $_MC_N$ (=M!/(M−N)!N!) (m!=m(m−1) . . . 2.1) pulse signals with different combinations is set, and the outputs are ORed.

The list structure data will be described next. As shown in FIGS. 35A to 35E, a list structure in which medium-order (lower-order) patterns that form a higher-order pattern are connected is given.

FIGS. 35A to 35E show an example of the data structure. A higher-order pattern category is "face". Medium-order pattern categories to be detected in correspondence with "face" can be "eye", "nose", and "mouth". For each medium-order pattern as well, a lower-order pattern list structure (tree structure) data that constitutes the medium-order pattern is given.

In this data structure, the spatial configuration information of each medium-order pattern as a component is not described. This is because the arrangement using the hierarchical neural network circuit shown in FIGS. 12A and 12B is on the assumption that each feature detection layer neuron has synaptic connection capable of detecting the presence of a plurality of local feature elements that satisfy the spatial configuration learned in advance for the immediately preceding feature detection layer (Japanese Patent Application No. 2000-181487). That is, if local feature elements that satisfy a predetermined spatial configuration relationship are present, their detection signals (pulse signals) are input to the feature detection layer neuron at a preset time interval. In the feature detection layer neuron element, the data that describes the spatial configuration relationship between the feature elements need not be referred to.

Figure 35A:
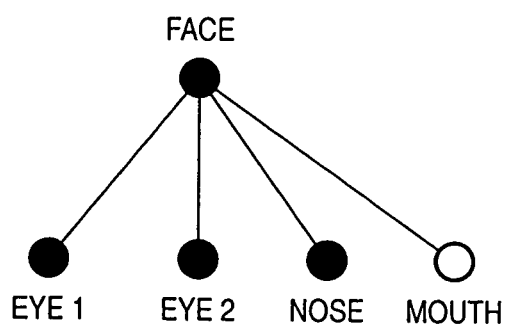
FIGS. 35A to 35E are views showing list structure data representing the layout relationship between medium-order features.
Figure 35B:
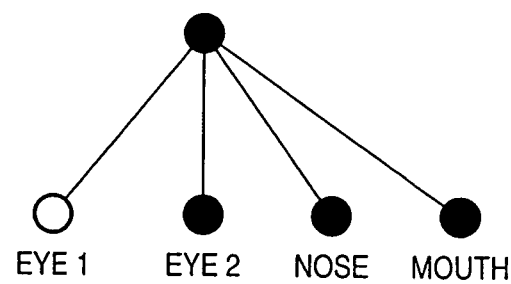
Figure 35C:
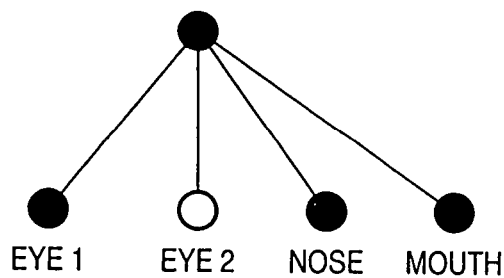
Figure 35D:
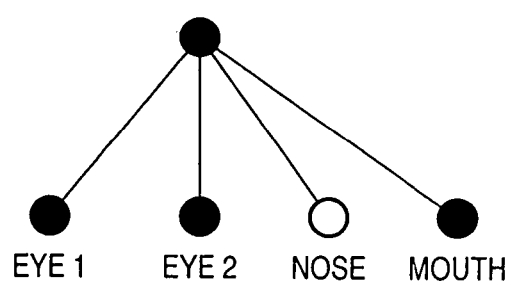
Figure 35E:
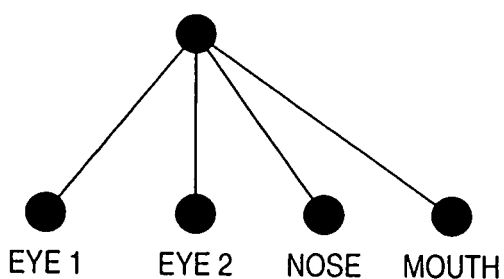

Referring to FIGS. 35A to 35E, ● indicates a medium-order pattern that is necessary for detection of "face" and is already detected, and ○ indicates an undetected medium-order pattern. FIGS. 35A and 35B show that it is obviously necessary to detect at least three medium-order features.

11th Embodiment

Figure 36:
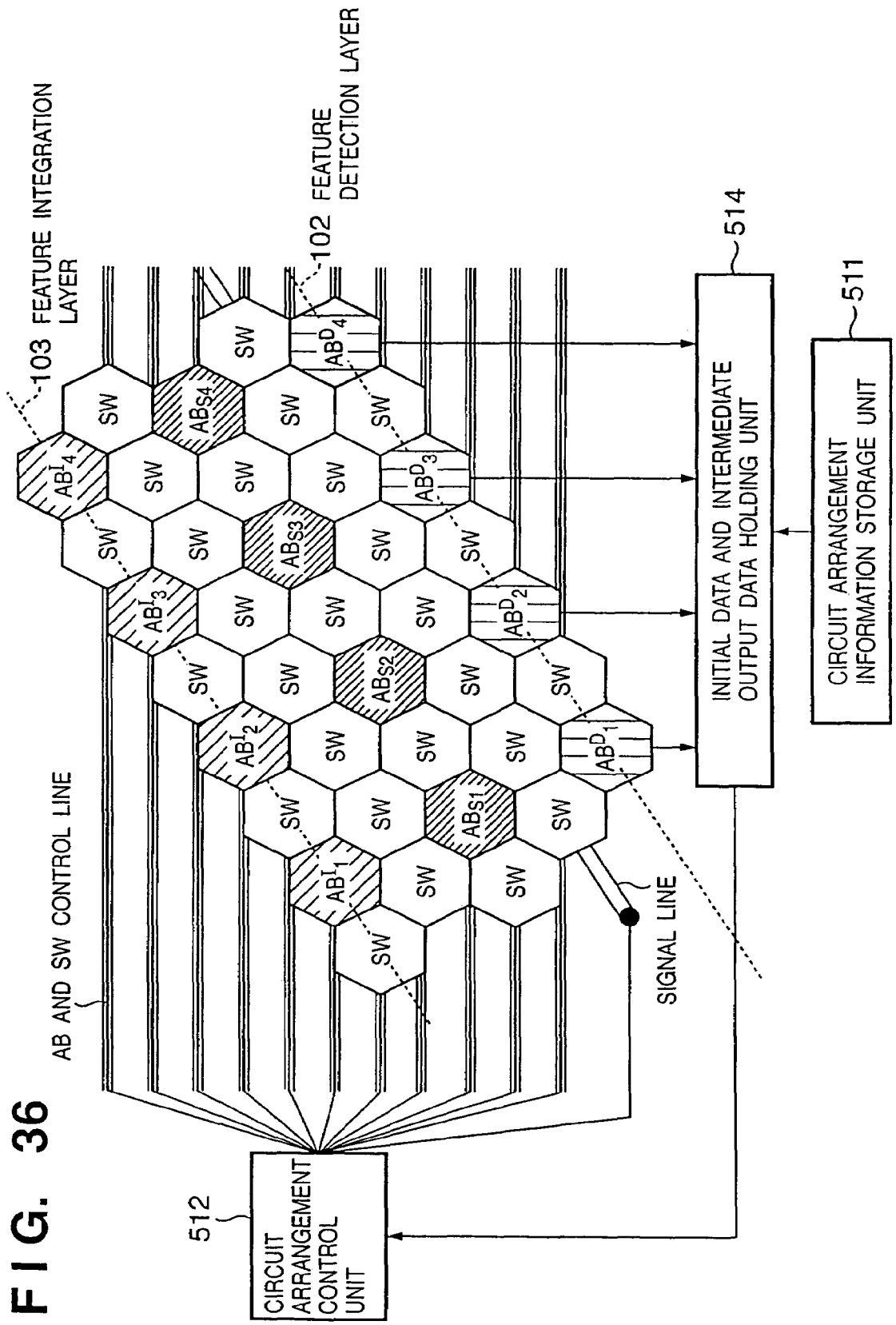
FIG. 36 is a view showing the arrangement of main part of an arithmetic processing circuit according to the 11th embodiment.

FIG. 36 shows the arrangement of main part. In this embodiment, an initial data and intermediate output data holding unit 514 is used. The circuit arrangement is controlled (reconfigured) while feeding back intermediate output data, thereby substantially implementing a parallel and hierarchical processing circuit shown in FIGS. 12A and 12B. The number of types (categories or sizes) of features to be detected in each feature detection layer at given time is one. The type is time-serially updated by a circuit arrangement control unit 512. For this reason, the numbers of feature types arranged in parallel in a reconfiguration processing circuit 513 can be greatly decreased as compared to the number N of feature types in the ninth embodiment (s=1 is also possible).

The reconfiguration processing circuit 513 for executing pattern recognition hierarchically does it at each sampling point on input data while holding an intermediate processing result related to the pattern category to be detected that time-serially changes in the intermediate output holding unit 514.

The circuit arrangement control unit 512 outputs the detection result (neuron element $AB^D$) for each feature detection layer 102, which is read out from the intermediate output holding unit 514, to each neuron element ($AB^I$) of a feature integration layer 103 and also sets the ON/OFF pattern of a switch block SW and the parameter of an analog processing block AB on the basis of circuit arrangement information read out from a circuit arrangement information storage unit 511.

In the reconfiguration processing circuit 513, the feature detection layers 102 and feature integration layers 103 which are alternately cascaded hierarchically detect lower- or higher-order patterns, as in the ninth embodiment (FIG. 12A). In this embodiment, however, to virtually realize the hierarchical arrangement of processing, the detection is time-serially executed. With this arrangement, the entire circuit scale can be largely reduced.

The outputs from the respective feature detection layers 102 undergo the same sub-sampling processing as in the above embodiment in the subsequent feature integration layers 103 and are temporarily stored in the intermediate output information holding unit 514. The feature detection layer 102 updates the synaptic weight distribution (local receptive field structure), as will be described below, and also time-serially receives the detection result for each feature type from the intermediate output data holding unit 514.

For example, the local receptive field structure of the feature detection layer 102 for detecting a pattern (medium-order pattern) corresponding to an eye is updated (or set) as a local receptive field structure unique to each of lower-order patterns $P_1$, $P_2$, . . . , $P_n$ that constitute the medium-order pattern, every time a feature detection layer output for each pattern $P_k$ (k=1, . . . , n) is received from the intermediate output data holding unit 514. The receptive field structure of each neuron of the feature detection layer is updated in accordance with the feature type. However, the receptive field structure of each neuron in the feature integration layer is not updated if the receptive field size in the feature types is the same.

The local receptive field structure is held as digital data in the circuit arrangement information storage unit 511 for each feature type to be input, read out from the storage unit 511, and updated by a control signal from the circuit arrangement control unit 512.

For example, the receptive field structure of neurons in the feature detection layer 102 (layer for detecting a medium-order feature) that was detecting a pattern corresponding to an eye at certain time is updated in a predetermined order in accordance with a control signal from the circuit arrangement control unit 512 such that a pattern corresponding to the nose or mouth is detected at another time.

For input data, multiplex processing is executed such that different feature detection (recognition) processes are time-serially executed by the single reconfiguration processing circuit 513. With this processing, the circuit scale can be largely reduced, as compared to a circuit arrangement for simultaneously detecting a plurality of features in parallel, individually at a sampling position on input data.

The structure of the receptive field temporally controlled is given by the circuit arrangement information storage unit 511 and circuit arrangement control unit 512 which are constituted by, e.g., an SRAM (or MRAM or FRAM) (not shown) for storing circuit arrangement information data in which dynamically reconfigurable analog and digital circuit elements are mixed.

Figure 30:
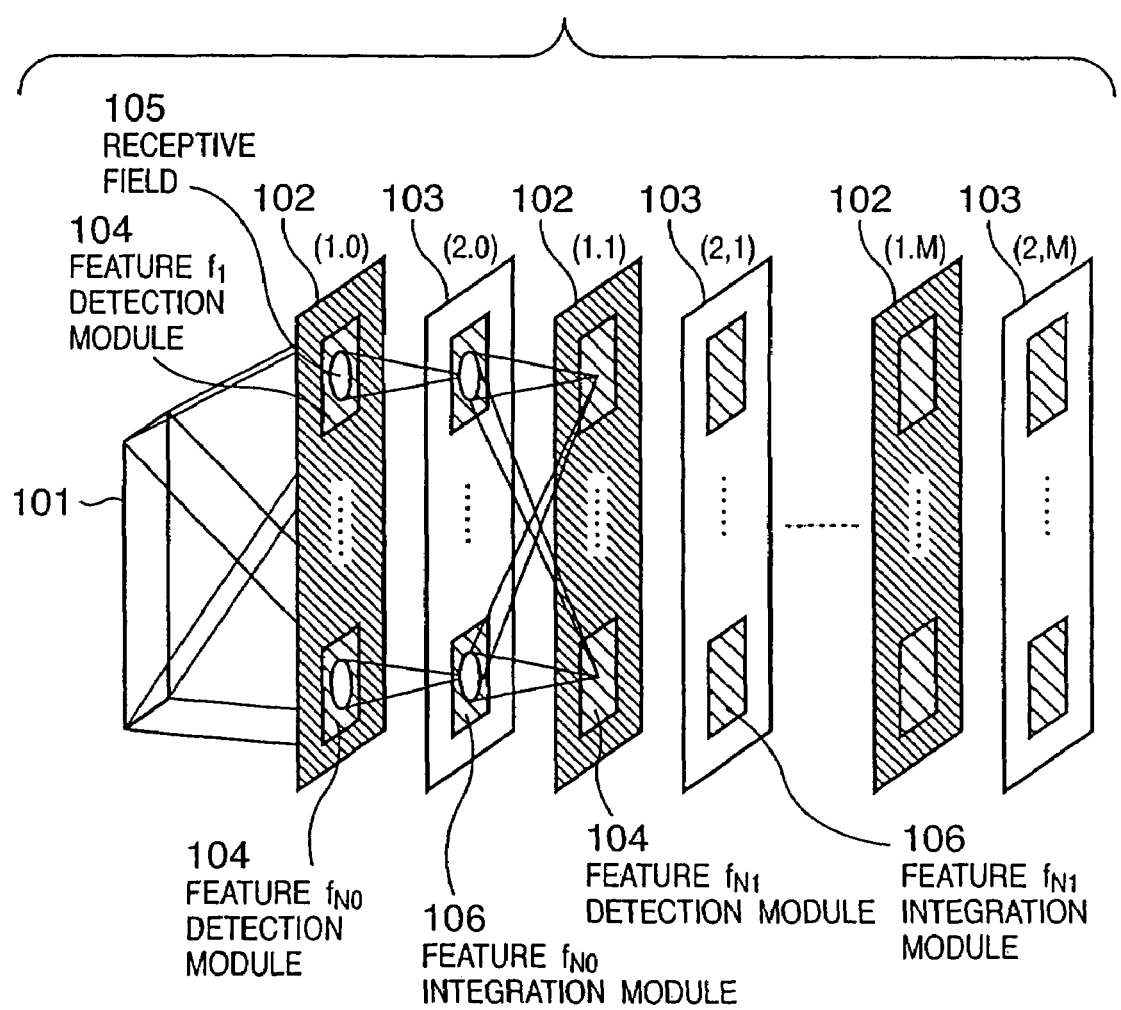
FIG. 30 is a view showing the overall arrangement of a reconstructable signal processing circuit.

To implement a hierarchical neural network circuit composed of neurons with local receptive field structures as shown in FIG. 30, a storage unit and circuit arrangement control unit for updating the circuit arrangement information for each layer are generally necessary. In this embodiment, one set of the circuit arrangement information storage unit 511 and circuit arrangement control unit 512 suffices regardless of the number of layers of the hierarchical structure, as will be described below.

For example, when the number of feature types (e.g., the feature category or size) to be detected by the feature detection layer 102 at each sampling point on input data at certain time is one, the local receptive fields of the feature detection layer neurons have an identical structure. As a result, the circuit arrangement information storage unit 511 and circuit arrangement control unit 512, which give the receptive field structure, can be shared to time-serially supply circuit arrangement information to each switch block SW and analog processing block $AB_S$.

The weight coefficient for each connection that reflects the receptive field structure is updated and set by updating synapse circuit weight data of the analog processing block $AB_S$ in accordance with weight coefficient data supplied from the circuit arrangement information storage unit 511.

For example, assume that a synaptic weight value is given by the amount of injected charges accumulated in a floating gate element in the analog processing block $AB_S$. In this case, the synaptic weight is set by injecting charges corresponding to the weight value of each synapse, which corresponds to the weight coefficient data stored in the circuit arrangement information storage unit 511, through the $AB_S$ control line shown in FIG. 24.

As described above, according to the ninth to 11th embodiments of the present invention, in a parallel processing circuit arrangement including a plurality of analog processing elements, analog signal processing elements and switch elements as digital circuit elements are arrayed on predetermined grids and controlled to arbitrarily control the interconnection structure between the processing elements and the weight of a signal transmitted between the processing elements. Hence, a plurality of circuit arrangements can be formed in various ways by a small number of basic circuit arrangements. A large-scale parallel processing analog processing circuit can be implemented by a small-scale circuit arrangement without increasing/decreasing the number of circuit elements.

In addition, analog signal processing elements, and logic processing circuits and switch elements as digital circuit elements are arrayed on predetermined grids and controlled to arbitrarily set and control the interconnection structure between the elements and the weight of signal transmission between the elements through the analog processing elements. Hence, the circuit scale can be greatly reduced as compared to an arrangement including only analog circuit elements or only digital circuit elements.

Especially, when the logic processing elements and other digital circuit elements are distributed and mixed like the analog circuit elements, the influence of a variation in operation characteristic between the analog processing elements can be reduced, and stable operation can be performed even in a large-scale integrated circuit.

12th Embodiment

Figure 37:
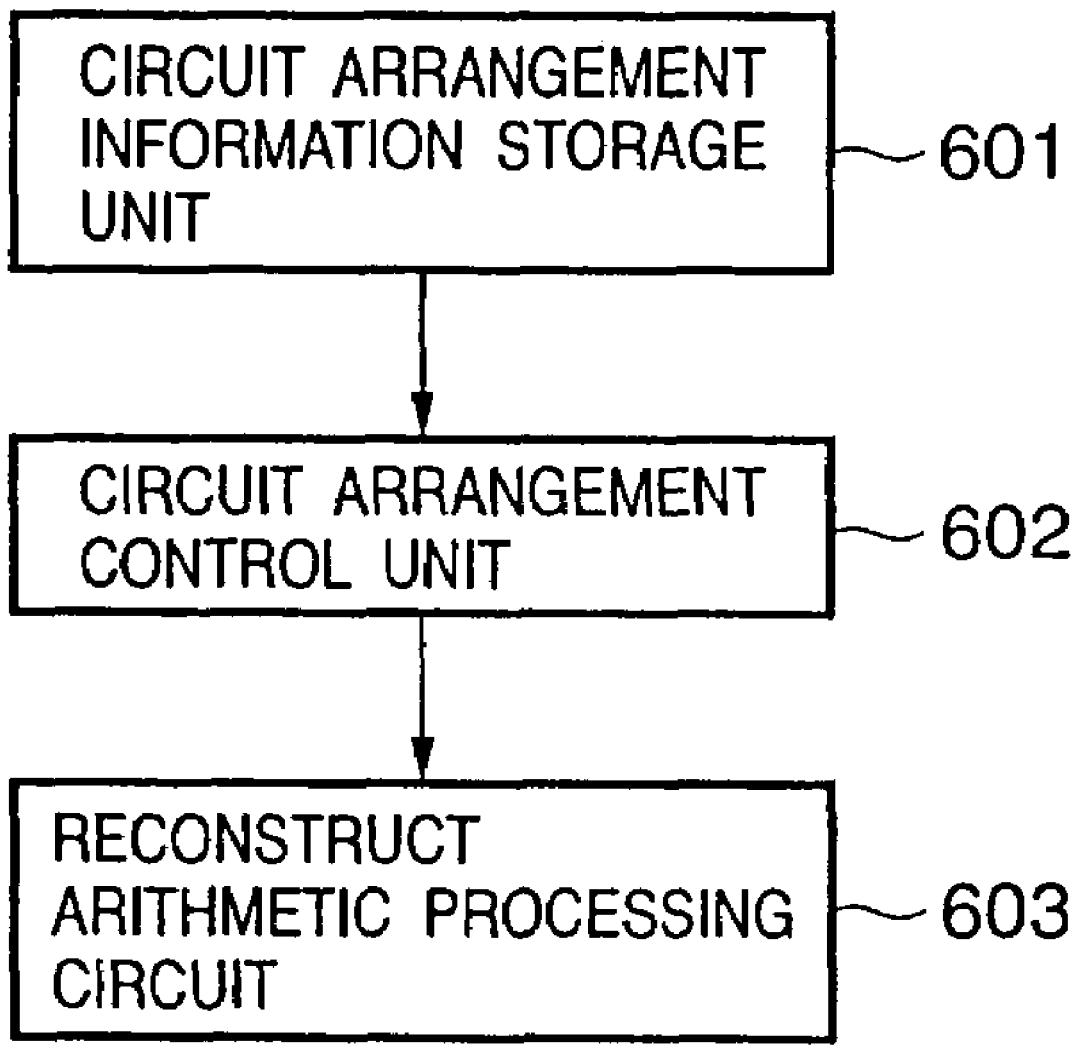
FIG. 37 is a block diagram showing the overall arrangement of a signal processing circuit according to the 12th embodiment.

[Signal Processing Circuit]
FIG. 37 is a block diagram showing the overall arrangement of a signal processing circuit according to this embodiment. Referring to FIG. 37, reference numeral 601 denotes a circuit arrangement information storage unit; 602, a circuit arrangement control unit; and 603, a reconfigurable arithmetic processing circuit. The circuit arrangement control unit 602 dynamically reconfigures the circuit arrangement in the reconfigurable arithmetic processing circuit 603 in accordance with circuit arrangement information stored in the circuit arrangement information storage unit 601. The reconfigurable arithmetic processing circuit 603 will be described below in detail, and the circuit reconfiguration mechanism according to this embodiment will be described with reference to FIGS. 38 to 42.

FIG. 38 is a view showing the arrangement of main part of the reconfigurable arithmetic processing circuit 603 according to this embodiment. When the circuit arrangement control unit 602 outputs signals onto control lines (not shown in FIG. 38; the control lines are indicated by 631 and 632 in FIG. 39) in accordance with information stored in the circuit arrangement information storage unit 601, the signal path connecting analog processing blocks AB in FIG. 38 or the processing function of each analog processing block is determined.

Figure 39:
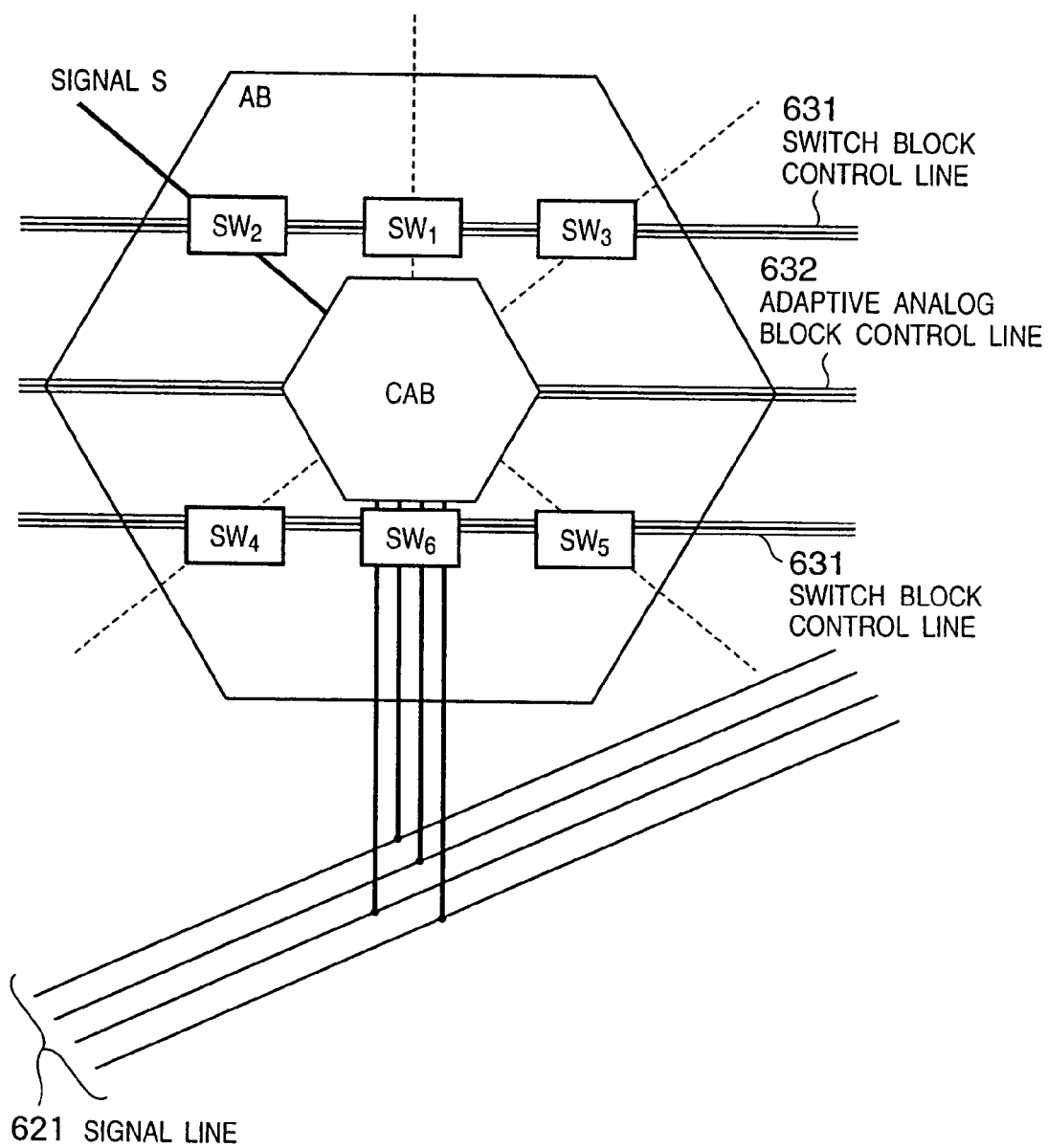
FIG. 39 is a view showing the detailed arrangement of each analog processing block.

As shown in FIG. 38, the reconfigurable arithmetic processing circuit 603 has an arrangement in which a plurality of hexagonal analog processing blocks are laid out in parallel. FIG. 39 shows the detailed arrangement of each analog processing block. As shown in FIG. 39, each analog processing block has a plurality of (six) switch blocks (SW) capable of multiple-input/multiple-output, an adaptive analog processing block (CAB: Configurable Analog Block), a switch block control line 631 for transmitting a signal between the blocks or controlling the ON/OF pattern of each switch block SW, and an adaptive analog block control line 632 for controlling the signal modulation parameter of the adaptive analog processing block. Each control line (631 or 632) includes a clock signal line (not shown). The circuit arrangement control unit 602 transmits a control signal to a predetermined block at a predetermined clock timing.

The analog processing block need not physically have a hexagonal shape. The hexagon employed here comes from the hexagonal close-packed array in crystallography. To closely pack a space with identical polygonal blocks, a hexagon can be used as a polygon with the maximum number of sides. When the number of sides is large, a lot of signals can be simultaneously input from other blocks. Since the space utilization efficiency in spatially laying out blocks is highest, the final circuit area can also conveniently be reduced. Switch blocks $SW_1$ to $SW_6$, each corresponding to the sides of the hexagon are arranged to switch from neighboring blocks of the sides to each input line to the adaptive analog processing block CAB.

The adaptive analog processing block (CAB) is a configurable circuit capable of realizing the function of either neuron element or synapse element (to be described below) in accordance with the control signal (configuration control signal) of the adaptive analog block control line 632, which is supplied in synchronism with a predetermined clock. A synapse element and neuron element form the neural network circuit. Each function will become apparent from the following description. Referring to FIG. 38, a neuron element is indicated by $AB^I$, and a synapse element is indicated by $AB_S$. These elements have identical adaptive analog processing block (CAB) structures and realize different functions (neuron element or synapse element) by the configuration control signal.

The adaptive analog processing block (CAB) is used to execute analog processing and is not always composed of only an analog circuit element such as a capacitor or resistor. It may incorporate a digital circuit element. The adaptive analog processing block (CAB) of this embodiment includes switch elements for controlling the internal circuit arrangement in accordance with the configuration control signal (c1 to c4 in FIG. 44; to be described later).

Each switch block (SW) that exists in the analog processing block AB together with the adaptive analog processing block (CAB) is a circuit block for controlling the connection state of a signal line that connects the CAB in the analog processing block to the CAB in another analog processing block in synchronism with a predetermined clock signal. The signal line here means a line through which an input or output signal of the adaptive analog processing block (CAB) propagates. Each signal line includes a single line or a plurality of lines running in the same direction. Each switch block (SW) ON/OFF-controls a signal line that runs in the neighborhood (e.g., the signal line 621 for $SW_4$, $SW_5$, and $SW_6$), thereby realizing connection between adaptive analog processing blocks (CAB) of adjacent layers (e.g., I layer and I+1 layer). In this case, each switch block (SW) can individually ON/OFF-control a plurality of signal lines, e.g., like the switch block $SW_6$ shown in FIG. 39.

As an example of an arrangement for outputting signals from a single adaptive analog processing block (CAB) to a plurality of signal lines, a synapse element is realized by an adaptive analog processing block to input signals to a plurality of neuron elements of a feature detection layer, as will be described below.

Referring to FIG. 38, the transmission paths of signals to be received by a neuron element $AB^{I+1}{}_3$ of the I+1th layer are $AB^I{}_4 \rightarrow AB_{S4} \rightarrow AB^{I+1}{}_3$, $AB^I{}_3 \rightarrow AB_{S3} \rightarrow AB^{I+1}{}_3$, and $AB^I{}_2 \rightarrow AB_{S2} \rightarrow AB^{I+1}{}_3$. The transmission paths of signals to be received by a neuron element $AB^{I+1}{}_2$ of the I+1th layer are $AB^I{}_3 \rightarrow AB_{S3} \rightarrow AB^{I+1}{}_2$, $AB^I{}_2 \rightarrow AB^I{}_{S2} \rightarrow AB^{I+1}{}_2$, and $AB^I{}_1 \rightarrow AB_{S1} \rightarrow AB^{I+1}{}_2$. The two sets of paths partially overlap. The amount of analog modulation executed by the synapse element at the overlapping portion generally changes depending on the signal path. The synapse element employs the arrangement shown in FIGS. 42A and 42B such that a different modulation amount can be applied for each path (input signal and a neuron element at an output destination) (details will be described later).

Figure 46:
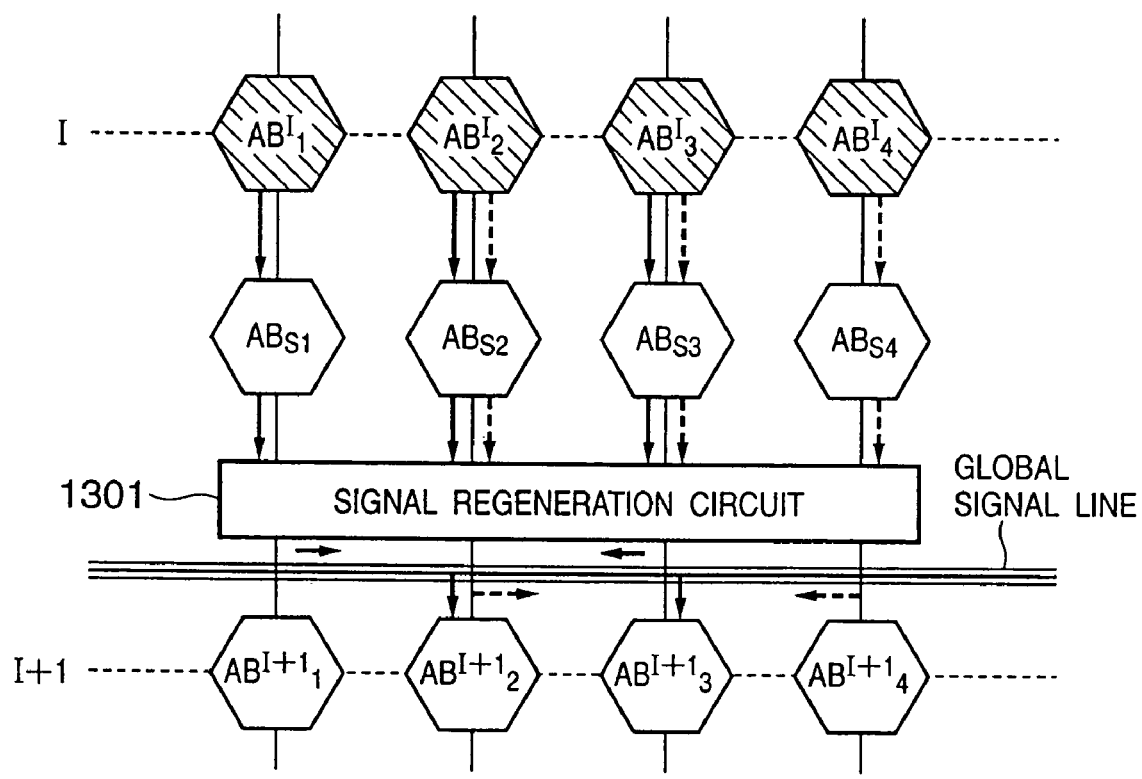
FIG. 46 is a view showing another arrangement of a neural circuit network implemented as a reconfigurable analog-digital mixed (merged) circuit.

Referring to FIG. 38, each of two signal lines 621 running between the arrays of neuron element analog processing blocks ($AB^I$ and $AB_{I+1}$) and the array of synapse element analog processing blocks ($AB_S$) represents a global signal line through which a pulse signal propagates. As shown in FIG. 46 (13th embodiment), the global signal line may be used only to propagate a signal from a synapse element to a neuron element of a subsequent layer. In this case, signal propagation from the neuron element to the synapse element is done by local connection (local signal line). Details will be described in the 13th embodiment.

The circuit arrangement control unit 602 shown in FIG. 37 outputs control signals to the switch block control line 631 and adaptive analog block control line 632 shown in FIG. 39. The control signal sent onto the switch block control line 631 ON/OFF-controls the switch elements (FIGS. 41A and 41B and FIGS. 42A and 42B) in each switch block SW. On the other hand, the control signal sent onto the adaptive analog block control line 632 controls the signal modulation characteristic (e.g., the pulse phase modulation characteristic) of a synapse element or a characteristic such as a time window width or weight function of time-windowed, weighted integration of a neuron element.

In the analog processing block, the signal transmission direction of each switch block (SW) is determined in accordance with its position in the analog processing block, as shown in FIG. 39. For example, referring to FIG. 39, the switch blocks $SW_1$ and $SW_6$ are related to signal transmission in the vertical direction. A solid line in FIG. 39 indicates a state wherein the interconnection between the blocks (between the switch block and that of another analog processing block or between the switch block and the adaptive analog processing block) through the switch block SW allows signal transmission, and a broken line indicates a state wherein the interconnection does not allow signal transmission.

Figure 54A:
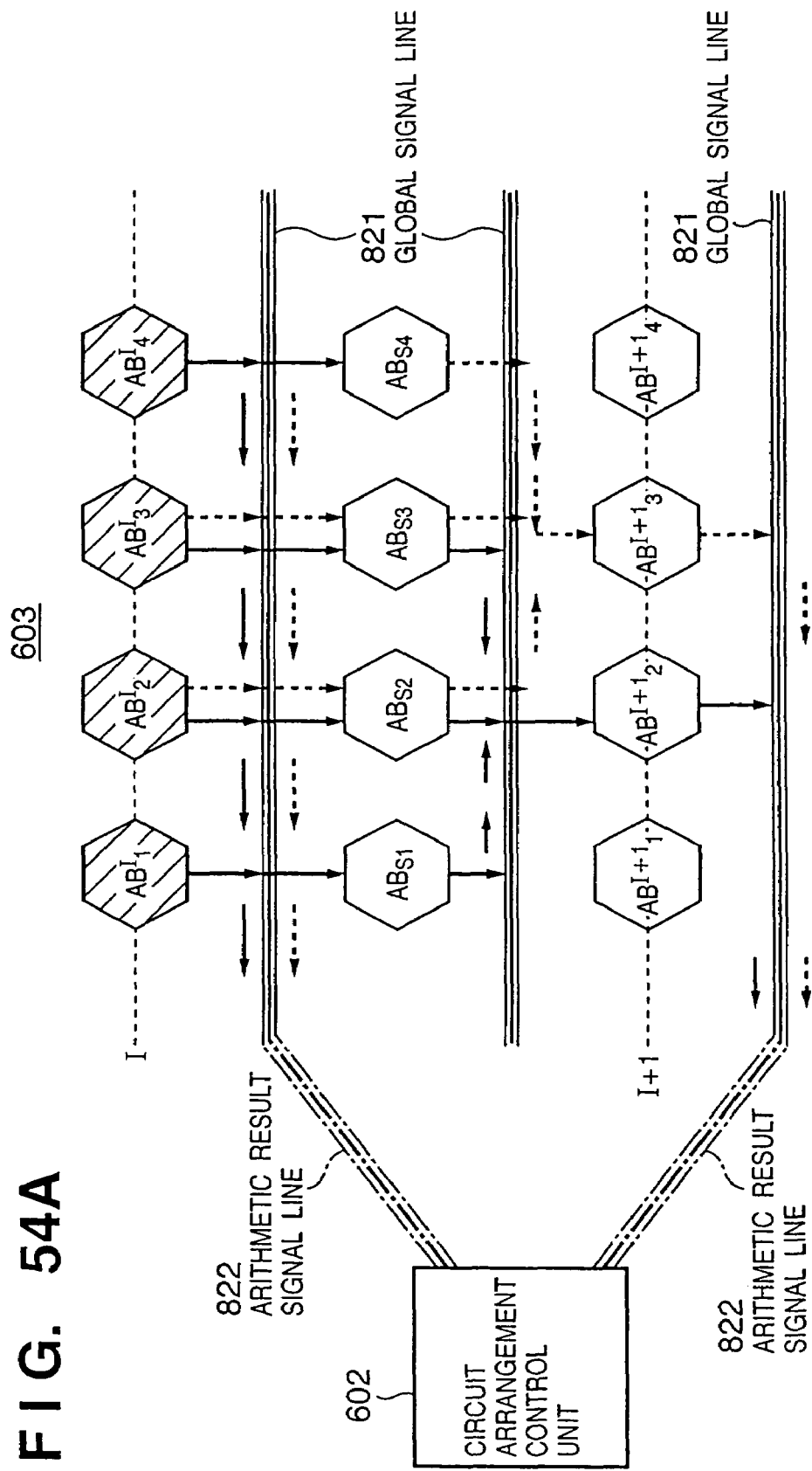
FIG. 54A is a view showing the arrangement of main part of a reconfigurable arithmetic processing circuit 603 according to the 17th embodiment.
Figure 54B:
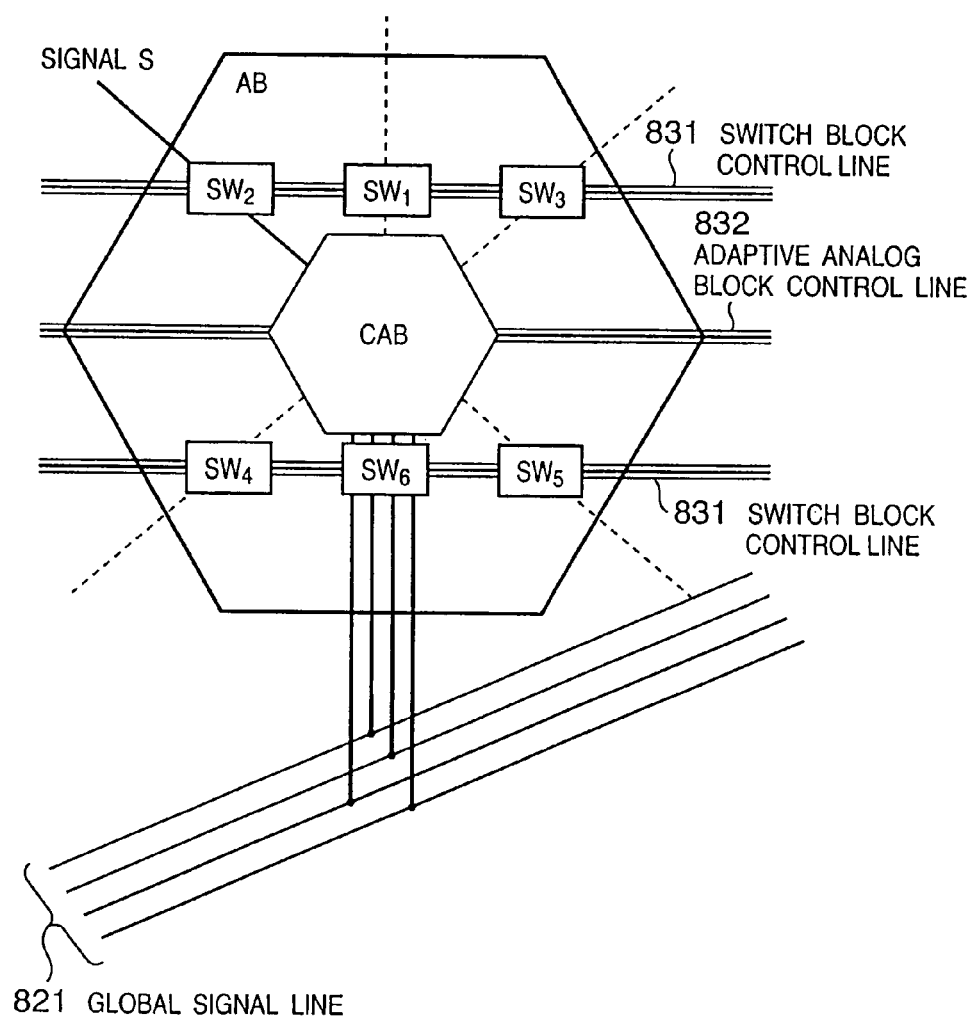
FIG. 54B is a view showing the detailed arrangement of each analog processing block in the 17th embodiment.

The ON/OFF operation of each switch block SW is set by the control signal transmitted from the circuit arrangement control unit 602 through the switch block control line 831 in FIG. 54B. A plurality of types of data of the ON/OFF pattern of each switch block SW are stored in advance in a predetermined memory (SRAM, DRAM, or MRAM) in the circuit arrangement information storage unit 601 and can be updated (switched) in accordance with the processing contents.

Figure 40A:
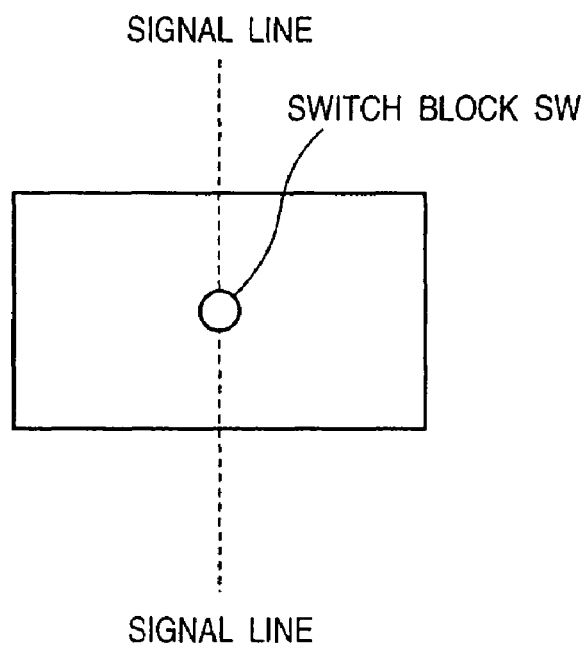
FIGS. 40A and 40B are views for explaining the arrangement of a switch block SW.
Figure 40B:
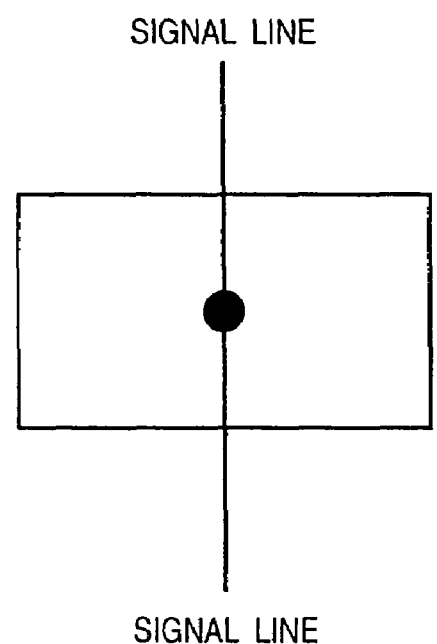
Figure 41A:
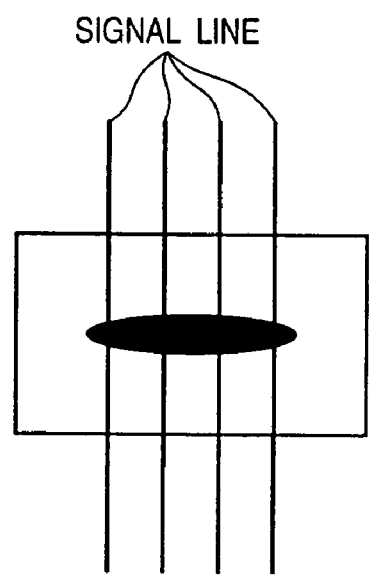
FIGS. 41A and 41B are views for explaining the arrangement of a switch block SW.
Figure 41B:
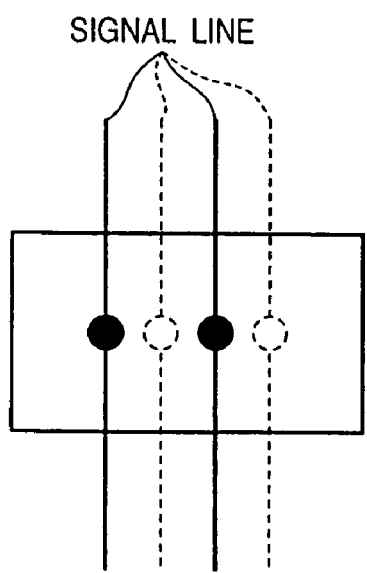

FIGS. 40A and 40B and FIGS. 41A and 41B are views for explaining the arrangement of the switch block SW. FIG. 40A shows an OFF state of a switch element serving as a digital circuit element which is arranged on a signal line. FIG. 40B shows an ON state (the ON state is indicated by ●, and the OFF state is indicated by ○). As shown in FIG. 41A, one switch element may be assigned to a plurality of signal lines running in the same direction to set the entire ON/OFF states of the plurality of signal lines. Alternatively, as shown in FIG. 41B, switch elements may be arranged for a plurality of signal lines running in the same direction, respectively, to independently set the plurality of signal lines. In this case, a plurality of pulse signal flows can be individually controlled by a single switch block. As a switch element, an element described in the prior art is used. State control of the switch elements in the switch block is performed at a predetermined clock timing through the switch block control line 631.

The global signal lines 621 shown in FIG. 38 or 39 include signal lines for transmitting output signals from neuron elements to the adaptive analog processing blocks CAB serving as synapse elements and signal lines for transmitting analog-modulated signals from synapse elements to neuron elements. The latter signal lines are illustrated as signal lines running between the synapse analog processing blocks $AB_S$ and the neuron analog processing blocks $AB^{I+1}$ in FIG. 38. These signal lines are used as a local common bus line through which a pulse train signal with a set of pulse interval pattern propagates.

When the number of signal lines increases, the occupation ratio of the interconnection area to the entire circuit becomes too high, and the degree of circuit integration cannot be increased. Hence, the number of signal lines is normally limited. Depending on a required circuit arrangement, a number of signal lines beyond the limitation may become necessary. For example, consider a case wherein n neuron elements in the I+1th layer are to receive output signals from s neuron elements whose receptive fields (ranges where the neurons of the preceding layer whose output is to be received are present) partially overlap in the Ith layer using m signal lines (n>m and s>m) after each signal undergoes analog modulation in different amounts by synapse elements.

In this case, the setting of the switch element SW in the analog processing block $AB_S$ serving as a synapse element and the degree of modulation of the adaptive analog processing block (CAB) are switched in synchronism with a clock signal, thereby time-divisionally inputting signals to the analog processing block $AB^{I+1}$ serving as a neuron element. To establish connection between the neuron element $AB^{I+1}$ and the synapse element $AB_S$ for executing predetermined modulation for the output signal from the neuron element $AB^I$ in accordance with the weight value (or the feature type to be detected or the neuron element at the output destination), part of a signal from the neuron element $AB^I$ belonging to the receptive field of a given neuron element $AB^{I+1}$ is time-divisionally input by controlling the switch block in the neuron element $AB^{I+1}$. At this time, the modulation amount of an analog modulation circuit (to be described later) in the adaptive analog processing block (CAB) in the synapse element $AB_S$ is also updated in accordance with the control signal input from the circuit arrangement control unit 602 through adaptive analog block control line 632 (FIG. 39).

The function of each block in the signal processing circuit of this embodiment will be described next.

The switch block SW can control the flow of a signal from an adaptive analog processing block (CAB) connected to it by ON/OFF operation. As a result, the range (to be referred to as a "receptive field" hereinafter) of neuron elements in the lower layer (preceding layer) from which the neuron elements of upper layer level receive inputs is determined. Part (or whole) of a connection structure given by the receptive field can be arbitrarily set by the ON/OFF patterns of a plurality of switch blocks SW arranged in the analog processing block.

The distribution structure of synaptic connection weight in the receptive field can be arbitrarily given by setting individual parameters of a plurality of modulation circuits in the adaptive analog processing block (CAB)(to be described later).

As a result, it is unnecessary to store synaptic weight information or interconnection information in a digital memory element and to frequently access the memory. For this reason, a high-speed parallel processing characteristic can be ensured. Simultaneously, flexibility and extendibility can be obtained so that the circuit arrangement can be changed in accordance with the processing contents (e.g., the type of feature to be extracted from an input image).

Figure 42A:
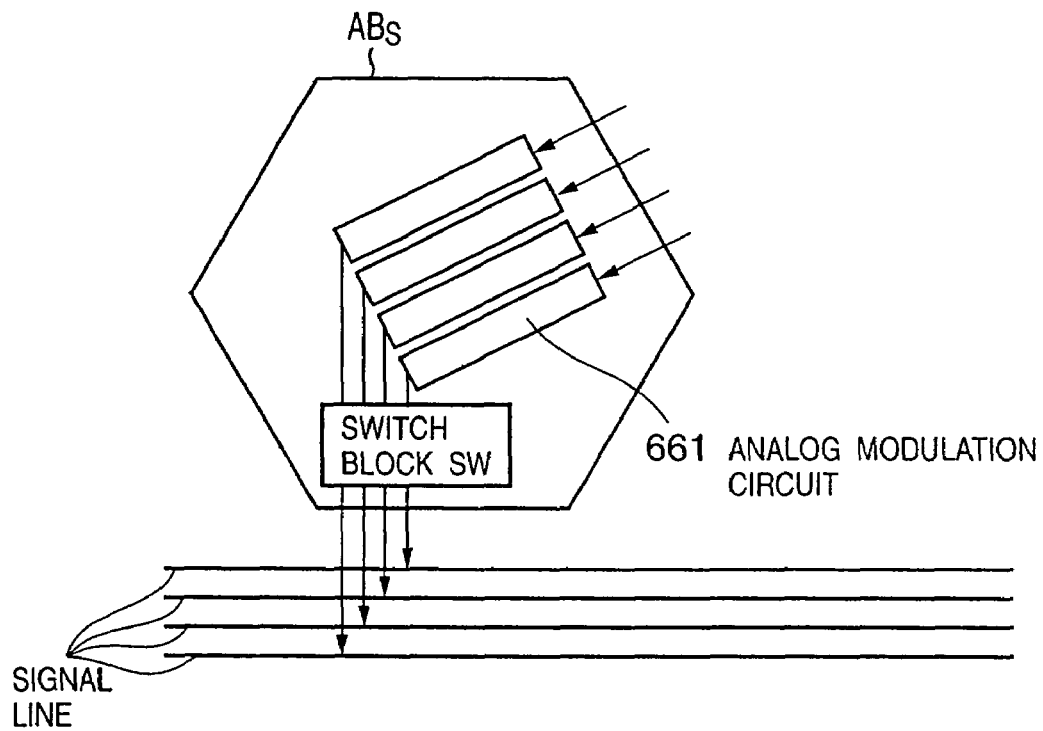
FIGS. 42A and 42B are views for explaining the arrangement of an adaptive analog processing block in a synapse analog processing block $AB_S$.
Figure 42B:
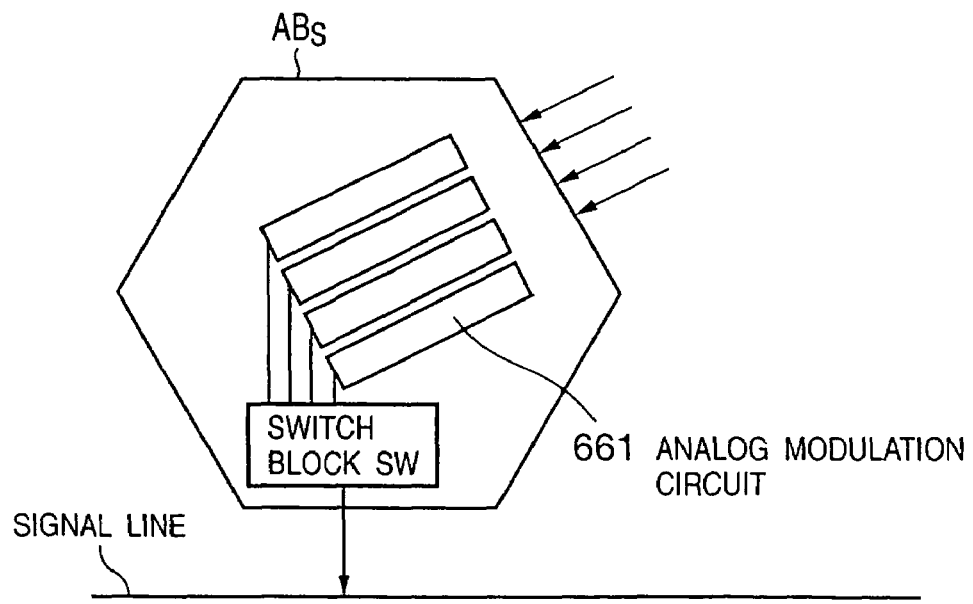

The analog processing block $AB_S$ serving as a synapse element is a multiple-input/multiple-output element capable of individually setting a signal modulation amount in accordance with a plurality of synaptic weight values. The analog processing block $AB_S$ typically outputs a signal obtained by integrating an input signal with a synaptic weight value (in the embodiment to be described later, the analog processing block $AB_S$ outputs the phase modulation signal of an input pulse signal). As shown in FIGS. 42A and 42B, the adaptive analog processing block of the analog processing block $AB_S$ incorporates a plurality of analog modulation circuits in correspondence with the plurality of synaptic weight values.

One analog processing block $AB_S$ can set the range of each neuron on an output side I and input side J within a predetermined range and incorporates a plurality of analog modulation circuits 661 for executing modulation corresponding to a synaptic weight value determined by an output-side neuron element address and input-side neuron element address.

FIG. 42A shows the arrangement of the synapse element used in this embodiment, which incorporates analog modulation circuits equal in number to the output lines (input lines). For the illustrative convenience, FIGS. 42A and 42B show no adaptive analog block control line 632. The modulation amount (in this embodiment, modulation of the pulse phase (delay amount) or pulse width) of each analog modulation circuit is set or updated through the control line 632.

FIG. 42B shows the arrangement of a multiple-input/single-output synapse element. This element is used when a plurality of neuron elements in the upper layer are to time-divisionally receive signal outputs from overlapping neurons in the lower layer, and the signals undergo analog modulation in different amounts by the synapse element in accordance with the location or address of neurons in the upper layer.

For example, referring to FIG. 38, both the signal transmission path (indicated by the dotted arrow) from the neuron element $AB^I_3$ in the Ith layer to the neuron element $AB^{I+1}_3$ in the I+1th layer and that (indicated by the solid arrow) from the neuron element $AB^I_3$ to the neuron element $AB^{I+1}_2$ pass through the synapse element $AB_{S3}$. In the synapse element $AB_{S3}$, the parameters of the plurality of internal modulation circuits are set such that different modulation amounts (pulse phase modulation, pulse width modulation, or the like) are obtained for the respective transmission paths (or the addresses of the upper layer (the I+1th layer) neurons).

With this arrangement, even when neuron elements close to each other have overlapping receptive field structures, a plurality of signal transmission paths can be set through a single analog processing block $AB_S$. As a result, the problem of heavy interconnection loads between the circuit elements of a neural network circuit can be reduced, and the number of circuit elements can be decreased.

In pulse phase modulation(to be described below), the analog modulation amount can be given by a charge amount applied to a capacitor as a component of a synapse circuit. A predetermined charge amount is applied to a floating gate element or capacitor of each modulation circuit in the analog processing block $AB_S$ through the adaptive analog block control line 632 (FIG. 39).

The circuit arrangement control unit 602 shown in FIG. 37 reads out synaptic weight value data (e.g., an applied voltage for giving a predetermined accumulated charge amount) stored in the circuit arrangement information storage unit 601 and then injects a current until charges corresponding to the synaptic weight value are accumulated (a voltage is generated) in the floating gate element (or capacitor). After that, the circuit arrangement control unit 602 time-serially accesses the synapse circuit elements $AB_{Sk}$ (k=1, 2, ...) as components of a receptive field structure and applies a voltage to inject charges (hot electrons), thereby setting the synaptic weight distribution structure (receptive field structure). Note that a memory element (e.g., an MRAM or FeRAM) capable of quickly rewriting data corresponding to a load value and holding the data for a predetermined time may be used.

[Pattern Recognition Apparatus]

The above signal processing circuit can be applied to a parallel pulse signal processing circuit technology for pattern recognition. Such pattern recognition can be applied to an image sensing device or video camera having a voice input function and pattern recognition function and capable of operation such as tracking or gazing, or a visual head that can be mounted on a robot.

A case wherein a neural network circuit for recognizing an image by parallel hierarchical processing using the above-described signal processing circuit will be described next. The neural network circuit according to this embodiment hierarchically processes information related to recognition (detection) of an object or geometrical feature in a local region of input data. Its basic structure is a so-called convolutional network structure, as in the ninth embodiment (FIG. 30).

When the parallel hierarchical structure shown in FIG. 30 is implemented by the arrangement shown in FIG. 38, one layer has synapse elements and neuron elements. A synapse element is formed from the analog processing block $AB_S$, and a neuron element is formed from the analog processing block $AB^I$.

The arrangement of a connection section related to the outputs (inputs when viewed from the cell) of neurons ($n_t$) of a feature integration (or feature detection) cell that forms a receptive field with respect to a given feature detection (or feature integration) cell is the same as that described with reference to FIG. 12A. Referring to FIG. 38, neuron elements 201 are represented by $AB^I_k$ and $AB^{I+1}_k$ (k=1, 2, . . . ), and synapse circuits 202 are represented by $AB_{Sk}$ (k=1, 2, . . . .) A portion serving as a signal transmission unit 203 indicated by a bold line forms a local common bus line. Pulse signals from a plurality of neurons are time-serially arranged and transmitted on the signal transmission line.

So-called excitatory connection amplifies a pulse signal in the analog processing block $AB_S$ serving as a synapse connection section. Conversely, inhibitory connection attenuates a signal. In transmitting information by a pulse signal, amplification and attenuation can be realized by any one of amplitude modulation, pulse width modulation, phase modulation, and frequency modulation of the pulse signal. In this embodiment, the analog processing block $AB_S$ serving as a synapse connection section is mainly used as a pulse phase modulation element. Amplification of a signal is converted into a substantial advance of the pulse arrival time as an amount unique to a feature to be detected. Attenuation is converted into a substantial delay. As a circuit for performing pulse phase modulation, arrangements disclosed in Japanese Patent Laid-Open Nos. 10-327054, 5-37317, and 6-61808 are known.

Synaptic connection gives an arrival position (phase) on a time axis unique to each feature at a neuron as an output destination. In addition, synaptic connection can also provide a predetermined synaptic weight with a phase shift corresponding to a value obtained by multiplying the input signal level (given by a phase) by the weight coefficient. Excitatory connection qualitatively gives an advance in phase of an arrival pulse with respect to a reference phase, and inhibitory connection gives a delay.

Referring to FIG. 12A, each neuron element $n_j$ outputs a pulse signal (spike train) and executes so-called integrate-and-fire type input/output processing. A neuron circuit of the analog processing block $AB^I$ will be described first. Each neuron element is an extended model of a so-called integrate-and-fire neuron. Each neuron element is the same as a so-called integrate-and-fire neuron in that the element fires and outputs a pulse signal when a result obtained by linearly and time-spatially adding input signals (pulse sequence corresponding to an action potential) exceeds a threshold value.

Arithmetic processing of spatio-temporal weighted sum (weighted sum) of an input pulse will be described next. As shown in FIG. 43B, in each neuron, the weighted sum of input pulses is obtained using a predetermined weight function, and the weighted sum is compared with a threshold value. In a feature detection layer neuron, each sub-time-window generated inside generally represents the time range in which a pulse output from a neuron element for detecting a feature of similar or same type is integrated. That is, the weighted sum of pulse signals from neuron elements of the preceding layer, which detect the same feature category and belong to the receptive field of the integrate-and-fire neuron, is calculated in the sub-time-window. A feature integration layer neuron receives a pulse from a feature detection layer neuron belonging to the same feature category as that for the feature integration layer neuron. In this case, the weighted sum may be calculated in one time window. Alternatively, the receptive field of the neuron may be divided to set sub-time-window for each divided receptive field, and the weighted sum may be calculated in each sub-time-window. The latter sub-time-window setting may be done in the feature detection layer neuron. In FIG. 43B, $\tau_j$ indicates the peak position of the weight function of a sub-time-window j, which is represented by the start time reference of the time window (the elapse time from the start time). The weight function is generally a function of the distance (shift on the time axis) from a predetermined position (this position represents the expected pulse arrival time when a feature to be detected is detected at the maximum level).

Phase modulation in correspondence with a feature type is executed in the synapse. In this case, multiplication according to the synaptic weight may be executed for the neuron output level of the preceding layer by referring to the weight function value on the time axis. Consider a case wherein the weight function shape in each sub-time-window is symmetrical. When it is assumed that the central position τ of the weight function in each sub-time window (time slot) of the neuron indicates the time delay after learning between neurons, the neural network circuit which calculates the spatio-temporal weighted sum (weighted sum) of input pulses can be regarded as a radial basis function network (to be referred to as an RBF hereinafter) in of the time domain. A time window $F_{Ti}$ of a neuron $n_i$ using the weight function of a Gaussian function is given by $$F_{Ti} = \sum_j^N b_{ij}\delta(t - \tau_{ij})\exp\left(-\frac{(t - \tau_{ij})^2}{\sigma_{ij}^2}\right)$$

where σ is the spread of each sub-time window, and $b_{ij}$ is the coefficient factor.

Note that the weight function may take a negative value. For example, assume that a given feature detection layer neuron is expected to finally detect a triangle, and a feature ($F_{false}$) that is obviously a non-component of the pattern (i.e., triangle) is detected. In this case, a pulse corresponding to the feature ($F_{false}$) can give a weight function and connection from the feature detection (integration) cell with a negative contribution in the summation processing of inputs such that no triangle detection output is finally done even when contribution from the remaining feature elements is large.

A spatio-temporal sum $X_i(t)$ of input signals to the neuron $n_i$ of the feature detection layer is given by $$X_i(t) = \Sigma S_{ij} F_{Tj}(t) Y_j(t - \tau_{ij} - \epsilon_{ij})$$

where $\epsilon_j$ is the initial phase of the output pulse from the neuron $n_j$, which can always be set to 0 when convergence to 0 occurs due to synchronous firing with the neuron $n_i$ or the phase of the time window is forcibly synchronized with 0 by timing pulse input from a pacemaker neuron. When pulse inputting shown in FIG. 43A and weighted summation by the weight function shown in FIG. 43B are executed, time transition of the weighted sum value as shown in FIG. 43E is obtained. When the weighted sum value has reached a threshold value (Vt), the feature detection neuron outputs a pulse. The output pulse signal from the neuron $n_i$ is output to the neuron of the upper layer with a time delay (phase) given by the output level as the squashing nonlinear function of the spatio-temporal sum (i.e., input sum) of input signals, as described above (the pulse output has a fixed frequency (binary value) and is output by adding a phase modulation amount as a squashing function about the spatio-temporal sum of input signals to a phase corresponding to a fixed delay amount determined by learning).

For the sake of simplicity, a feature detection neuron for detecting a triangle as a feature will be described below. The immediately preceding feature integration layer responds to a geometrical feature (feature element) such as L-shaped patterns ($f_{11}, f_{12}, \ldots$) having various directions, combinatorial patterns ($f_{21}, f_{22}, \ldots$) of line segments having continuity (connectivity) to L-shaped patterns, or combinations ($f_{31}, \ldots$) of some of two sides of triangles. Referring to FIG. 43C, $f_{41}$, $f_{42}$, and $f_{43}$ corresponding to $f_{11}$, $f_{12}$, and $f_{13}$ are features forming triangles with different directions.

Unique delay amounts are set by learning between neurons having interlayer connection. As a result, setting is done in advance in the triangle feature detection neuron such that pulses corresponding to major component features of a triangle arrive in each sub-time-window (time slot) ($W_1$, $W_2, \ldots$) obtained by dividing the time window.

Figure 43A:
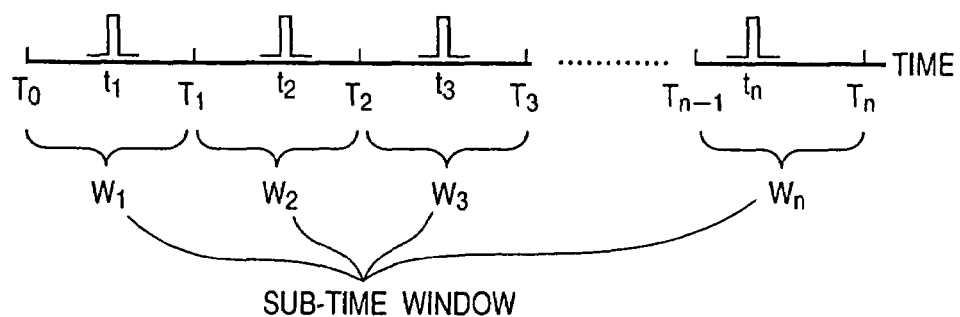
FIGS. 43A to 43E are views for explaining a pulse signal and its processing.
Figure 43B:
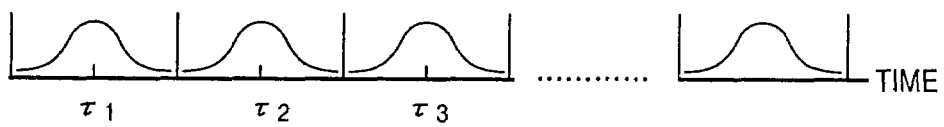
Figure 43C:
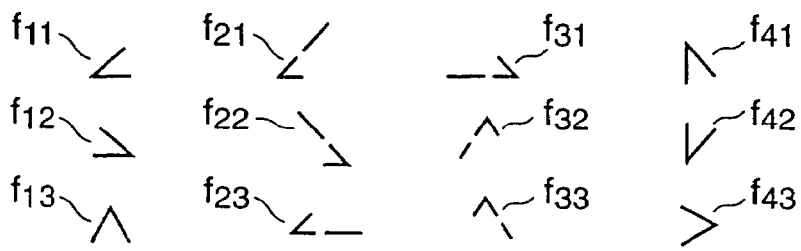
Figure 43D:
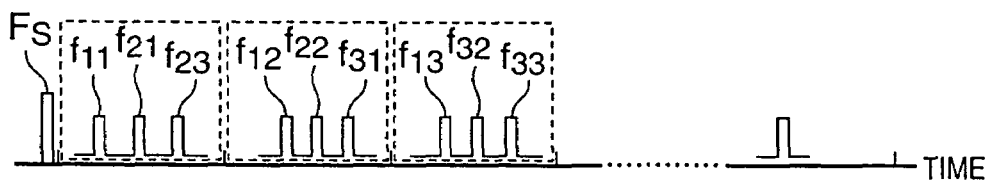
Figure 43E:
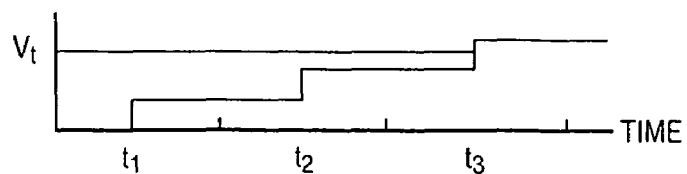

For example, pulses corresponding to a combination of sets of features that form a triangle as a whole arrive first in the sub-time-windows $W_1, W_2, \ldots, W_n$ obtained by diving the time window into n sub-windows, as shown in FIG. 43A. The delay amounts are set by learning such that pulses corresponding to the L-shaped patterns ($f_{11}, f_{21}$, and $f_{23}$) arrive in $W_1$, and pulses corresponding to the feature elements ($f_{12}, f_{22}$, and $f_{31}$) arrive in $W_2$. Pulses corresponding to the feature elements ($f_{13}, f_{32}$, and $f_{33}$) arrive in $W_3$. In FIG. 43D, pulses, each representing feature elements with continuity or connectivity (for example, in FIG. 43C, pulses corresponding to the feature element at the upper left are $f_{11}, f_{21}$, and $f_{23}$) arrive in one sub-time window (time slot).

Main circuit element blocks of a neuron element include an integrator, a comparator, and a window function generator. Main circuit elements of a synapse element are a waveform generator incorporating an integrator and a comparator. The two elements have common circuit element blocks in terms of functionality. As the adaptive analog processing block (CAB), such common circuit element blocks are selectively used on the basis of a configuration control signal, thereby realizing different functions in a small area.

Figure 44:
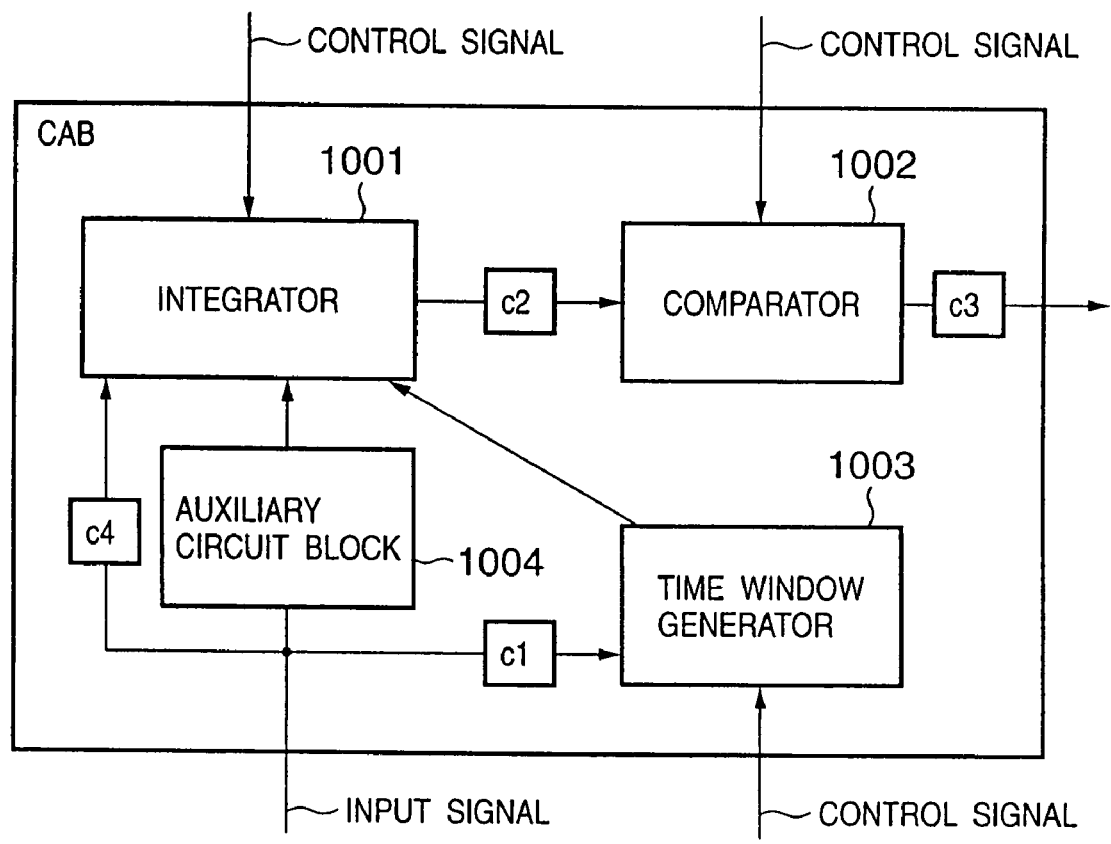
FIG. 44 is a block diagram showing the arrangement of an adaptive analog processing block of an adaptive analog processing block.

FIG. 44 shows the schematic arrangement of the adaptive analog processing block (CAB) which implements a synapse element serving as a pulse phase modulation element and a neuron element serving as an integrate-and-fire element as well, depending on configuration control signal. In FIG. 44, c1, ..., c4 indicate switch elements ON/OFF-controlled in accordance with a configuration control signal. The characteristics of an integrator 1001, comparator 1002, and time window generator 1003 are controlled on the basis of a configuration control signal input from an external device (circuit arrangement control unit 2) through the adaptive analog block control line 632 (FIG. 39).

A configuration control signal is represented by a binary configuration bit signal, e.g., (0,1,1,0) whose bits represent the ON/OFF states of the switch elements c1 to c4. When the configuration control signal is (0,1,1,0), the states of the switches are set to c1:0, c2:1, c3:1, and c4: 0 (0 represents an OFF state, and 1 represents an ON state). As a result, the arrangement of a synapse element for executing pulse phase modulation (delay time control) is implemented. Note that an auxiliary circuit block 1004 is a circuit block including other components necessary for pulse phase modulation operation.

FIG. 45 is a circuit diagram showing the basic arrangement of a pulse generation circuit serving as a neuron element. When the output from the comparator as an integration result of a post-synaptic current I(t) given as a function of time t by an RC circuit becomes large, an active potential (internal potential) $V_{Cint}(t)$ becomes zero. Under the function of a timer which is setting a refractory period, $V_{Cint}(t)$ is held at low level. That is, when the comparator outputs a signal, the timer operates to turn on the switch shown in FIG. 11 during a predetermined time (during the refractory period). As a result, even when the input current I(t) is received, the input to the comparator becomes zero (GND). When $V_{Cint}(t)$ becomes zero after a signal is output from the comparator, the output from the comparator becomes small. As a result, a spike-like signal is generated. The response characteristic of a neuron element is given by $$\frac{dV_{Cint}(t)}{dt} = -\frac{V_{Cint}(t)}{RC_{int}} + \frac{I(t)}{C_{int}}$$

To obtain a processing time on the order of 10 msec in the entire process of hierarchical parallel processing of this embodiment, the time constant $RC_{int}$ is set to 10 μsec, and the refractory period is set to about 1 μsec. The operation control mechanism of the pulse firing timing of each neuron element is irrelevant to the present invention, and a description thereof will be omitted.

Figure 8:
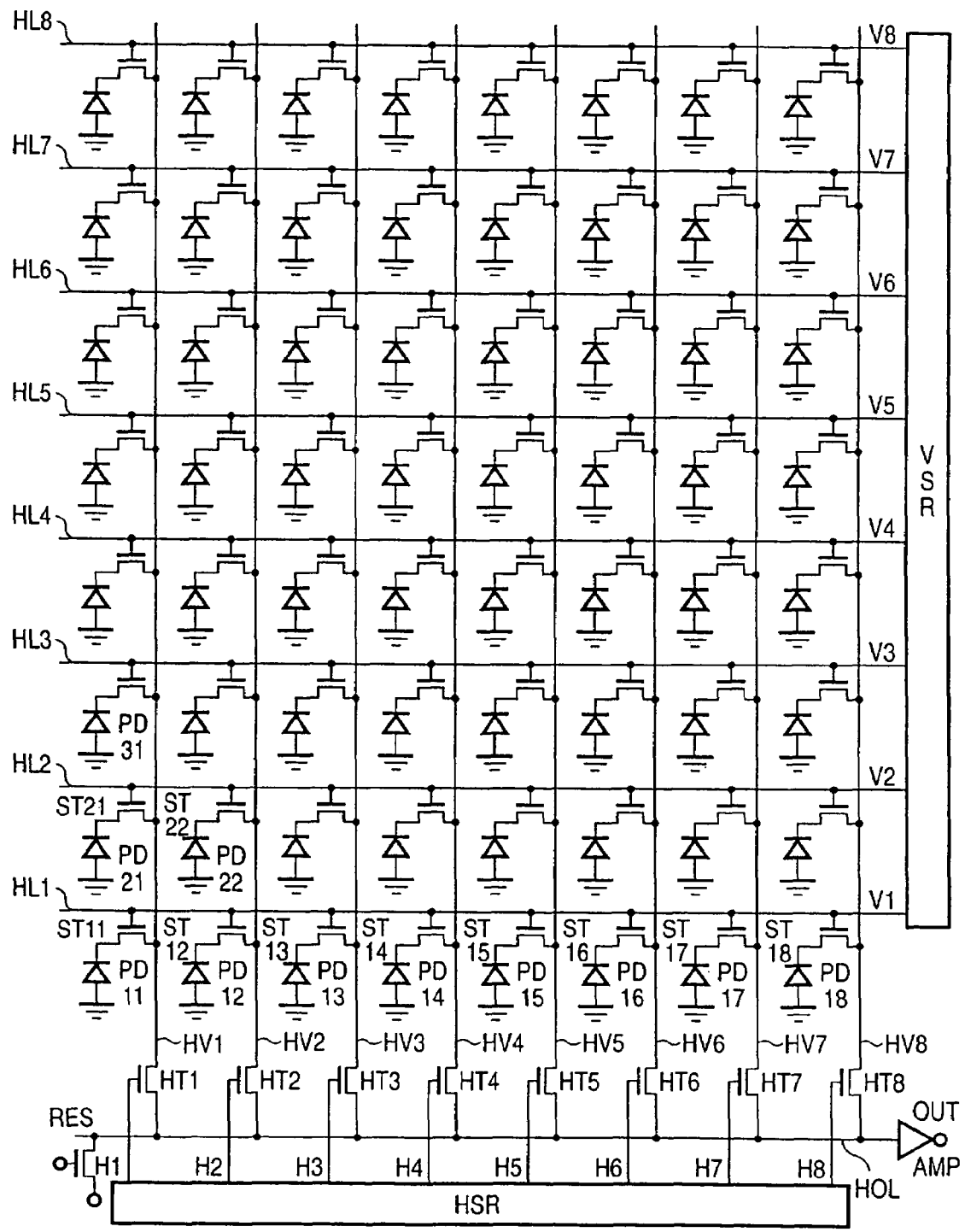
FIG. 8 is a circuit diagram showing the arrangement of main part of a sensor circuit.
Figure 9:
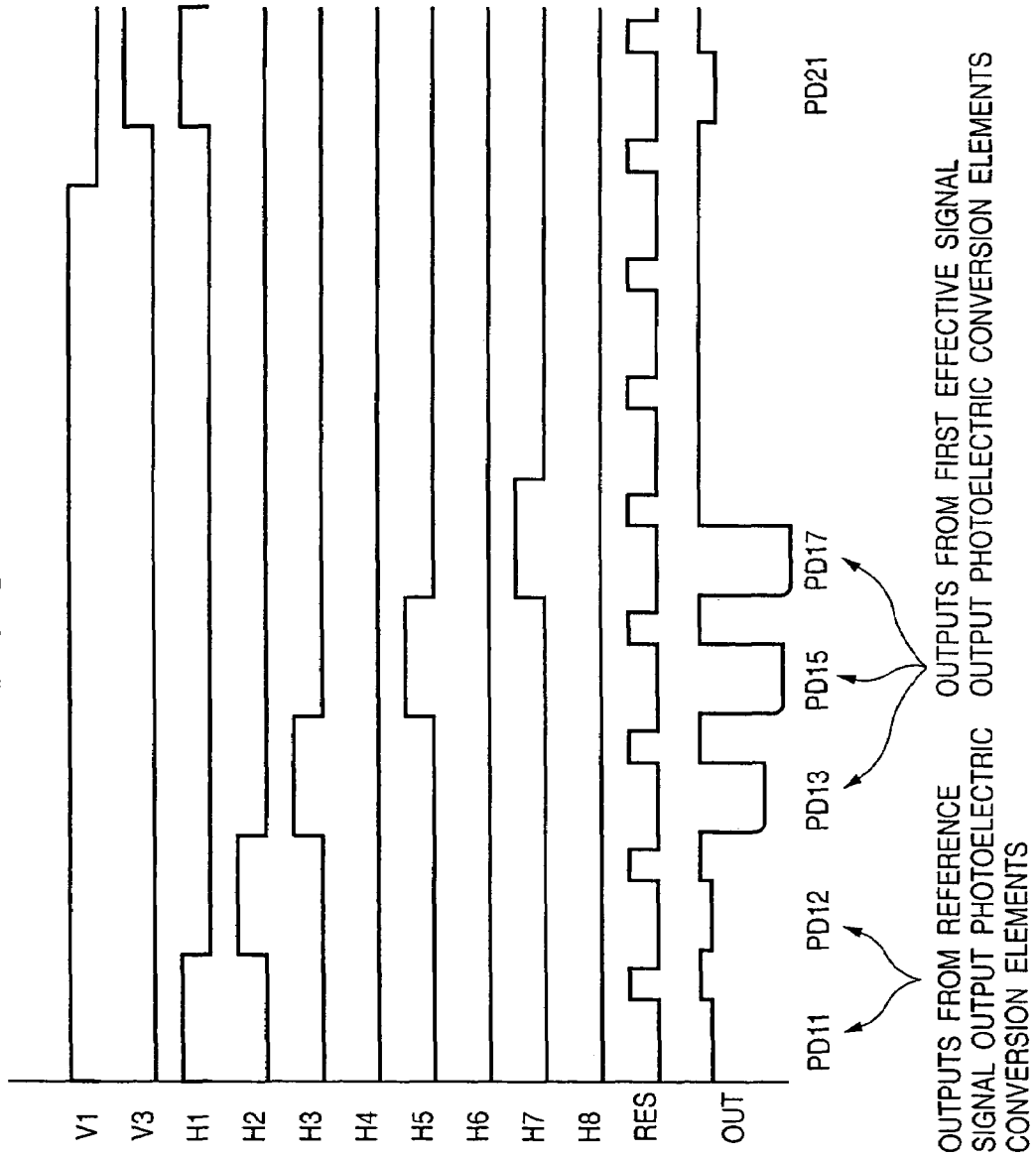
FIG. 9 is a timing chart showing timing control of an interlaced read by the sensor circuit.

Signal transmission between neurons by pulse signals can be executed by so-called AER (Address Event Representation) (Lazzaro et al. Silicon Auditory Processors as Computer Peripherals, in Tourestzky, D. (ed), Advances in Neural Information Processing Systems 5. San Mateo, Calif.: Morgan Kaufmann Publishers, 1993) or the like. Another method may be used. These methods are suitable to transmit pulse signals from a plurality of neurons through a local common bus, as shown in FIG. 8.

The above-described pattern recognition apparatus can be mounted in an image input unit such as a camera or an image output unit such as a printer or display. As a result, a specific object can be recognized or detected using the compact circuit arrangement with low power consumption, and predetermined operations can be executed. For example, for the image input unit, processes such as focusing, exposure correction, zooming, and color correction for a specific object can be executed. Even for the image output unit, processes such as optimum color correction for a specific object can be automatically executed.

[Application Example to Image Sensing Apparatus]

When the pattern detection (recognition) apparatus with the arrangement of this embodiment is mounted in an image sensing apparatus, focusing to a specific object, or color correction and exposure control for a specific object can be executed, as described above in FIG. 5 with reference to the ninth embodiment.

13th Embodiment

Figure 47:
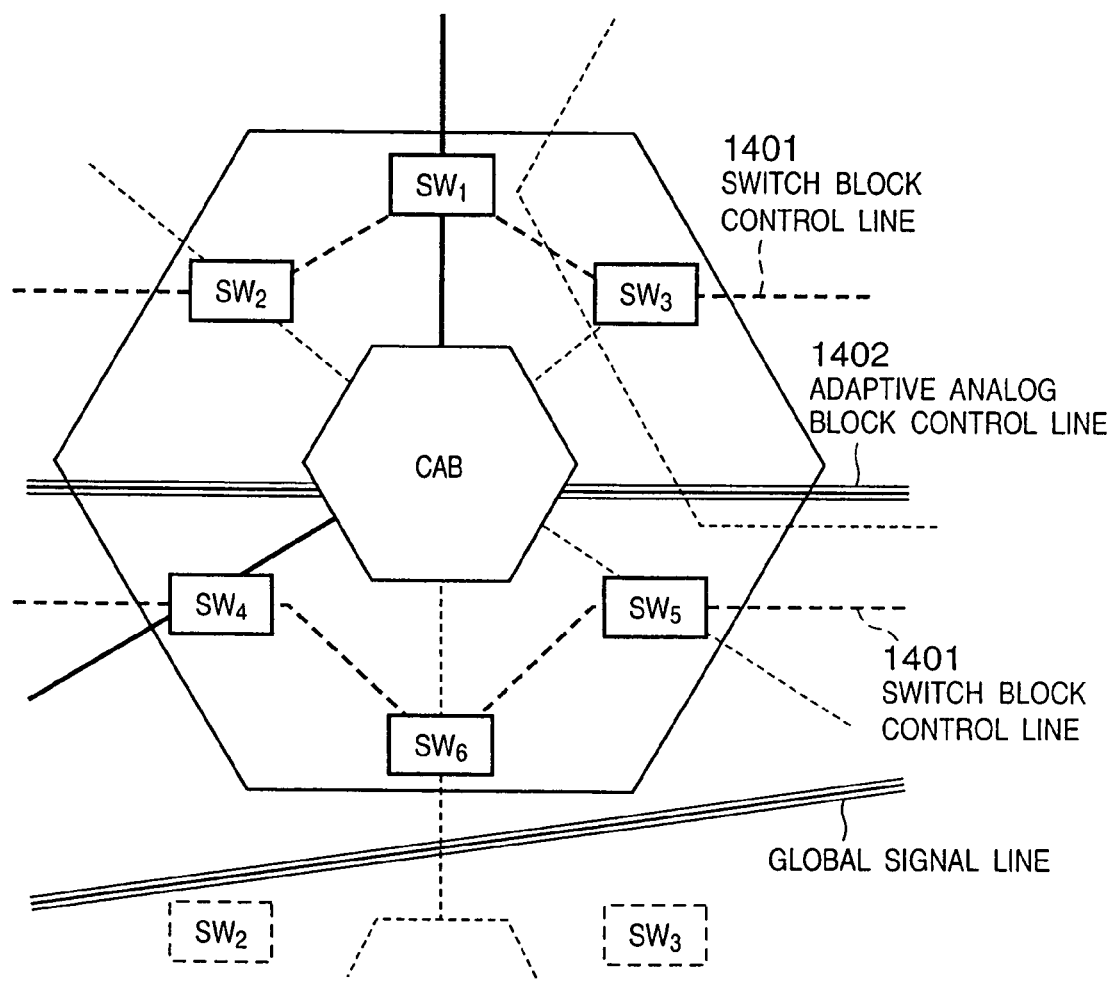
FIG. 47 is a view showing the arrangement of an analog processing block shown in FIG. 46.

FIG. 46 is a view showing the arrangement of a neural network circuit implemented as a reconfigurable analog-digital mixed (merged) circuit, which is different from that of the 12th embodiment (FIG. 38). FIG. 47 is a view showing the arrangement of an analog processing block shown in FIG. 46.

The reconfigurable signal processing circuit according to the 13th embodiment implements a hierarchical neural network circuit for pattern recognition described with reference to FIGS. 30, 12A, and 12B, which is the same as in the 12th embodiment in that a pulse signal is phase-modulated by a synapse circuit (analog processing block) in accordance with the detection category to hierarchically detect lower- to higher-order features. The overall arrangement including a circuit arrangement information storage unit 601 and circuit arrangement control unit 602 is also the same as in the 12th embodiment shown in FIG. 37. As shown in the 12th embodiment, paths from a feature integration layer to a feature detection layer partially overlap at a synapse element $AB_S$. As in the 12th embodiment, the amount of analog modulation executed by the synapse element at the overlapping portion can change depending on the signal path. The synapse analog processing block $AB_S$ receives a pulse signal, gives predetermined pulse phase modulation (or time delay) to the signal, and outputs the signal, as in the 12th embodiment. The modulation amount (to delay amount) is controlled through an adaptive analog processing block control line shown in FIG. 47.

As a characteristic feature of the 13th embodiment, each neuron element time-divisionally receives an output pulse sequence from each neuron belonging to the receptive field of the preceding layer while regenerating pulse outputs from some or all neuron elements in the receptive field by a signal regeneration circuit 1301. In a block $AB^{l+1}_k$, by the signal regeneration circuit 1301, a weighted sum corresponding to a regenerated signal pulse sequence is obtained basically for some outputs from predetermined neurons in the preceding layer, with which synaptic connection is formed. The weighted sum is sequentially obtained while updating the regeneration range, thereby completing weighted summation for all outputs. In this embodiment, when a feature detection layer neuron element receives a pulse signal phase-modulated by a synapse, as the above-described signal regeneration, pulse signals are generated at a timing that reproduces the expected arrival times with respect to the reference time of the time window integration described in the 12th embodiment.

Figure 48:
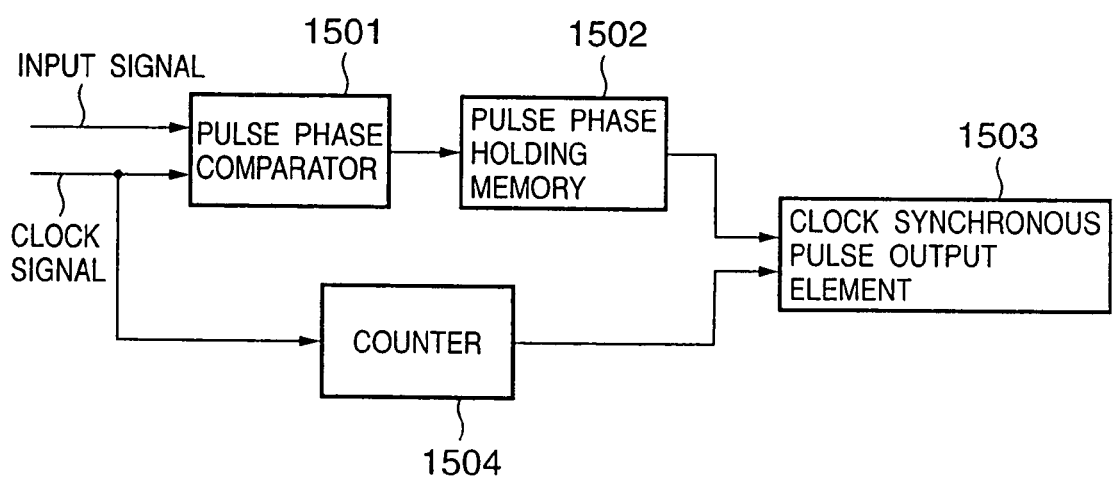
FIG. 48 is a block diagram showing the arrangement of a signal regeneration circuit.

FIG. 48 is a block diagram showing the arrangement of the signal regeneration circuit 1301. As shown in FIG. 46, the signal regeneration circuit 1301 is present between a line of synapse element array and a line of neuron element array for receiving modulated pulse signals from the synapse elements. As shown in FIG. 48, the signal regeneration circuit 1301 comprises a pulse phase comparator 1501, pulse phase holding memory 1502, clock—synchronous pulse output element 1503, and counter 1504.

The pulse phase comparator 1501 receives a clock signal (externally supplied or input as a reference timing signal autonomously generated in the arithmetic processing unit) and a pulse signal from a neuron element and outputs an output voltage corresponding to the phase of the pulse signal. The pulse phase holding memory 1502 is formed from a capacitor, MRAM, FRAM, or any other memory elements. When a capacitor is used, charges proportional to the phase delay amount are accumulated and held. The charge amount is obtained by applying a voltage proportional to the output signal from the pulse phase comparator 1501 to the capacitor. The counter 1504 is used to identify a sub-time-window by receiving a clock signal (i.e., sub-time-window generation time is synchronized with the clock signal). The pulse output element outputs pulse signals in accordance with the expected arrival times corresponding to a position on the time axis of a sub-time window from a clock signal reference (time window generation time).

In this case, the pulse phase delay amount of the pulse output element is given by a delay from the start time of the sub-time-window. The delay until the start time of the sub-time-window is given as an offset by setting the time when the counter 1504 is updated as the start time of the time window. With this arrangement, no large capacity (bit accuracy) need be ensured for the pulse phase holding memory 1502.

When a given feature detection layer neuron element time-divisionally receives a plurality of pulse signal inputs from a plurality of regions in its receptive field and executes appropriate time-windowed, weighted integration for each pulse, the signal regeneration circuit aims at the following effects. In divisionally processing output signals from all neurons in the receptive field (time division multiplex processing) instead of simultaneously receiving and processing the signals, they can be processed at once on a neuron side for executing the time integration. In addition, the step of inputting a pulse signal and the step of executing the time-windowed weighted integration for the input pulse signal can be alternately and separately executed, and as a result, accumulation of errors in the time domain in the transform (i.e., weighted integration) processing of large-scale pulse sequence data is eliminated. Furthermore, state reproduction is repeated every small time width without using any circuit for generating a time window having a large span on the time-axis and an accompanying weight function, thereby preventing any increase in circuit scale (area).

The signal regeneration circuit 1301 may regenerate either some or all of the output pulse signals from neurons in the receptive field of the preceding layer. To regenerate some pulse signals, the time-windowed, weighted integration at a feature detection neuron of the subsequent layer is sequentially executed for those regenerated signals. In both of partial regeneration and total regeneration, the time-windowed, weighted integration is executed while generating a time window or sub-time-window in synchronism with a clock signal and receiving a predetermined pulse signal in the receptive field. To regenerate the signals from all neurons and execute the weighted summation processing, for example, the output state of the preceding layer, which is simultaneously observed at given time, is held in the signal regeneration circuit, and after that, the output from the feature integration layer neurons belonging to the receptive field is regenerated and a weighted sum is calculated sequentially at each neuron of the feature detection layer.

As described above, according to the 13th embodiment, by regenerating all pulse signals from neurons in the receptive field, different features can be detected whenever the entire receptive field structure is controlled using the same neuron element analog processing block. The function of the feature detection layer neuron and that of the feature integration layer neuron can be alternately realized. The above-described partial signal regeneration is executed mainly when a pulse output from the receptive field of a given neuron element is scanned and input. In both cases, in dynamic reconfiguration processing of an analog-digital merged type circuit, large-scale parallel hierarchical processing can be realized while keeping the circuit scale smaller than in the 12th embodiment by executing signal regeneration processing. Upon receiving a pulse signal for the feature integration layer for a plurality of feature categories, for example, the feature detection layer neuron can receive pulse signals through the signal regeneration circuit for each feature category. Alternatively, the receptive field can be divided into regions for one feature category, and the pulse signal from the preceding feature integration layer neurons belonging to each region can be received through the signal regeneration circuit.

14th Embodiment

Figure 49:
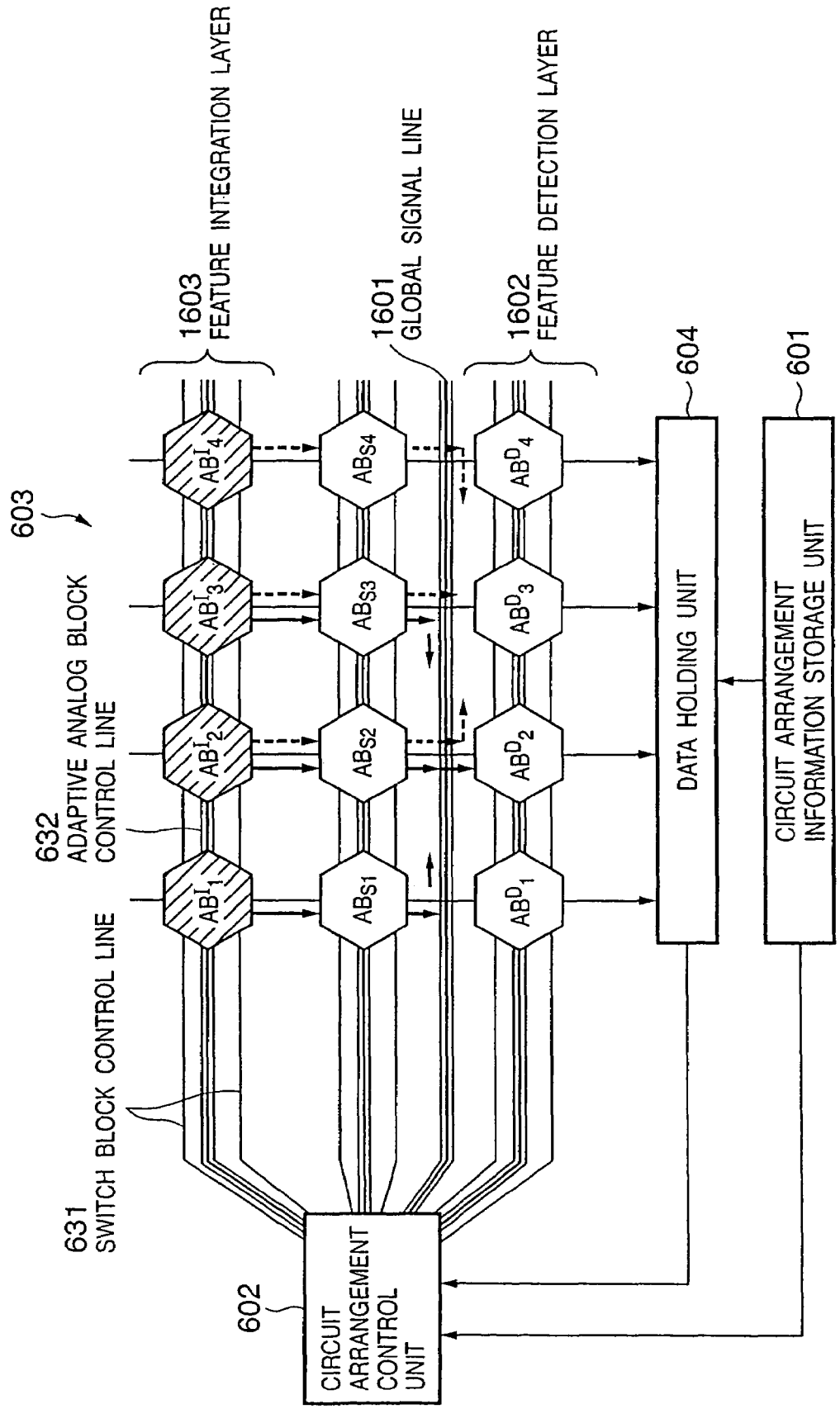
FIG. 49 is a view showing the arrangement of main part of a signal processing circuit according to the 14th embodiment.

FIG. 49 is a view showing the arrangement of main part of a signal processing circuit according to the 14th embodiment. In this embodiment, a data holding unit 604 for holding initial data and intermediate output data is used. The circuit arrangement is controlled (reconfigured) while feeding back intermediate output data, thereby substantially implementing a parallel hierarchical processing circuit shown in FIG. 12A by two layers. The number of types (categories or sizes) of features to be detected in each feature detection layer at given time is one. The type of feature is time-serially updated by a circuit arrangement control unit 602. For this reason, the number s of feature types detected in parallel by a reconfigurable arithmetic processing circuit 603 can be greatly decreased as compared to the number of feature types in the 12th embodiment (s=1 is also possible).

The reconfigurable arithmetic processing circuit 603 for executing pattern recognition hierarchically does it at each sampling point on input data while holding an intermediate processing result related to pattern detection of a category that time-serially changes in the data holding unit 604. The circuit arrangement control unit 602 outputs the detection result (neuron element $AB^D$) at each feature detection layer 1602, which is read out from the data holding unit 604, to each neuron element ($AB^I$) of a feature integration layer 1603 and also sets the ON/OFF pattern of switch blocks SW in each analog processing block and the parameter of an analog processing block AB on the basis of circuit arrangement information read out from a circuit arrangement information storage unit 601.

In the reconfigurable arithmetic processing circuit 603, feature detection layers 102 and feature integration layers 103 which are alternately cascaded hierarchically detect lower- or higher-order patterns, as in the 12th embodiment (FIGS. 30 and 12A). In the 14th embodiment, however, to virtually realize the hierarchical arrangement of processing, the detection is time-serially executed. With this arrangement, the entire circuit scale can be largely reduced.

The outputs from the respective feature detection layers 1602 undergo the same sub-sampling processing as in the above embodiment in the subsequent feature integration layers 1603 and are temporarily stored in the data holding unit 604. In the feature detection layer 1602, the synaptic weight distribution (local receptive field structure) is updated, as will be described below, and also the detection result is time-serially input for each feature type from the data holding unit 604.

For example, the local receptive field structure of the feature detection layer 1602 for detecting a pattern (medium-order pattern) corresponding to an eye is updated (or set) as a local receptive field structure unique to lower-order patterns $P_1, P_2, \ldots, P_n$ that constitute the medium-order pattern every time a feature detection layer output for each pattern $P_k$ (k= 1, ..., n) is received from the data holding unit 604. The receptive field structure of each neuron of the feature detection layer 1602 is updated in accordance with the feature type. However, the receptive field structure of each neuron of the feature integration layer 1603 is not updated if the receptive field size in the feature types is the same.

The local receptive field structure is held as digital data in the circuit arrangement information storage unit 601 for each feature type to be input. The circuit arrangement control unit 602 reads out this data from the circuit arrangement information storage unit 601 and updates the local receptive field structure by a control signal. For example, the receptive field structure of the neuron of the feature detection layer 102 (layer for detecting a medium-order feature) that was detecting a pattern corresponding to an eye at certain time is updated in a predetermined order in accordance with a control signal from the circuit arrangement control unit 602 such that a pattern corresponding to the nose or mouth is detected at another time.

For input data, multiplex processing is executed such that different feature detection (recognition) processes are time-serially executed by the single reconfigurable arithmetic processing circuit 603. With this processing, the circuit scale can be largely reduced, as compared to a circuit arrangement for simultaneously detecting a plurality of features in parallel, individually at a sampling position on input data. The structure of the receptive field temporally controlled is given by the circuit arrangement information storage unit 601 and circuit arrangement control unit 602 which are constituted by, e.g., an SRAM (or MRAM or FRAM) (not shown) for storing circuit arrangement information data in which dynamically reconfigurable analog and digital circuit elements are mixed.

To implement a hierarchical neural circuit network formed from neurons with local receptive field structures as shown in FIG. 12A, the circuit arrangement information storage unit 601 and circuit arrangement control unit 602 for updating the circuit arrangement information for each layer are generally necessary. In this embodiment, one set of the circuit arrangement information storage unit 601 and circuit arrangement control unit 602 suffices regardless of the number of layers of the hierarchical structure, as will be described below.

For example, when the number of feature types (e.g., the feature category or size) to be detected by the feature detection layer 102 at each sampling point on input data at certain time is one, the local receptive fields of the feature detection layer neurons have an identical structure. As a result, the circuit arrangement information storage unit 601 and circuit arrangement control unit 602, which give the receptive field structure, can be shared to time-serially supply circuit arrangement information to each switch block SW and analog processing block $AB_S$.

The weight coefficient for each connection that reflects the receptive field structure is updated and set by updating synapse circuit weight data of the analog processing block $AB_S$ in accordance with weight coefficient data supplied from the circuit arrangement information storage unit 601. For example, assume that a synaptic weight value is given by the amount of injected charges accumulated in a floating gate element in the analog processing block $AB_S$. In this case, the synaptic weight is set by injecting charges corresponding to the weight value of each synapse, which corresponds to the weight coefficient data stored in the circuit arrangement information storage unit 601, through an adaptive analog block control line 632 shown in FIG. 49.

15th Embodiment

Figure 50:
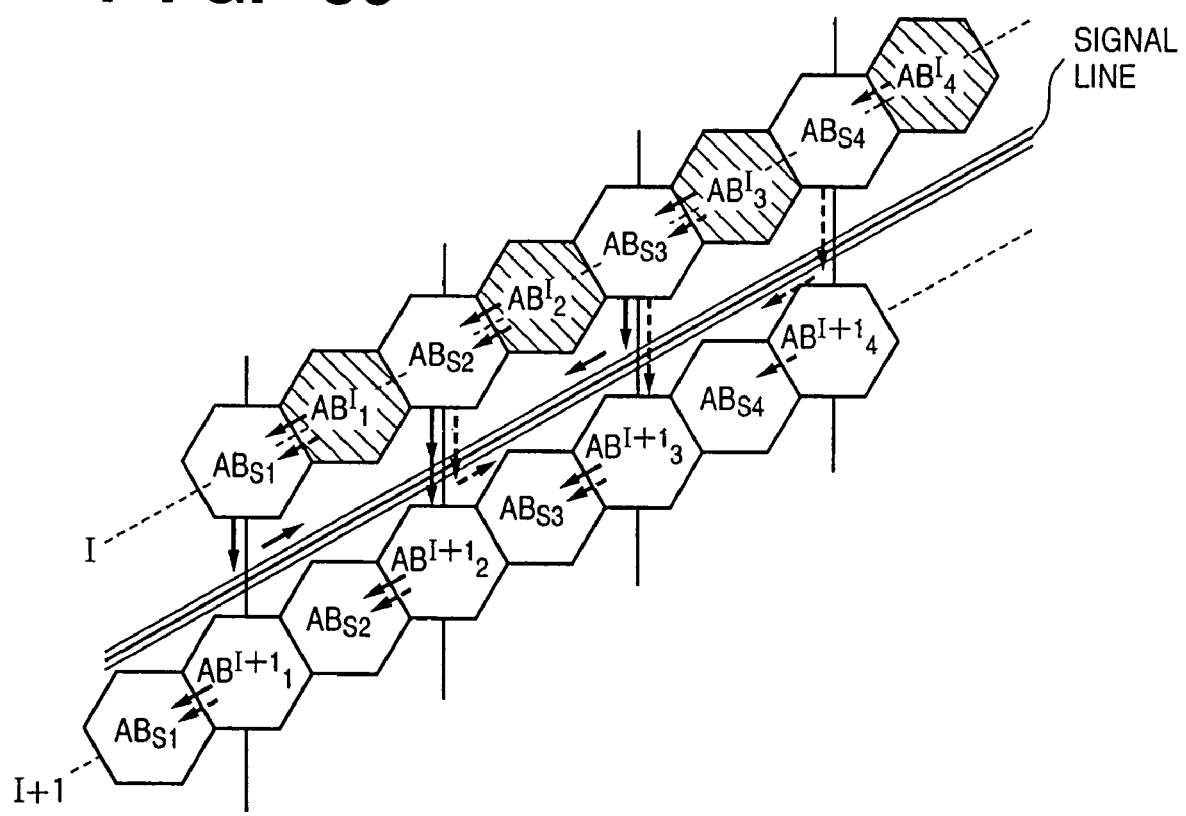
FIG. 50 is a view showing the arrangement of main part of a reconfigurable arithmetic processing circuit according to the 15th embodiment.

FIG. 50 is a view showing the arrangement of main part of a reconfigurable arithmetic processing circuit according to the 15th embodiment. As a structure unique to this embodiment, neuron elements and synapse elements are arranged adjacent and in series in each layer. Global signal lines run between the adjacent layers. Additionally, in this embodiment, to allow information transmission (signal propagation) between adjacent analog processing blocks to increase the space unitization efficiency and to reduce the circuit scale, a structure in which switch blocks (SW) are shared, as shown in FIG. 47, is employed. FIG. 47 shows a structure in which switch block $SW_3$ is shared by two analog processing blocks.

The 15th embodiment has the same characteristic feature as that shown in FIG. 46 (13th embodiment) in that connection from a neuron element to a synapse element is realized by a local signal line.

In the 15th embodiment, however, each of circuits for implementing the neuron and synapse elements is a circuit block having the same function as that of the analog processing block according to the above-described embodiment. The ON/OFF patterns of switch elements in each adaptive analog processing block (CAB.) are individually and appropriately controlled by a control signal from a circuit arrangement control unit 2. Consequently, the synapse elements and neuron elements are spatially alternated, as shown in FIG. 50.

With this array structure, the space utilization efficiency becomes higher than in each of the above embodiments. As a result, the number of circuit blocks decreases, and the entire circuit scale can be reduced.

16th Embodiment

Figure 51:
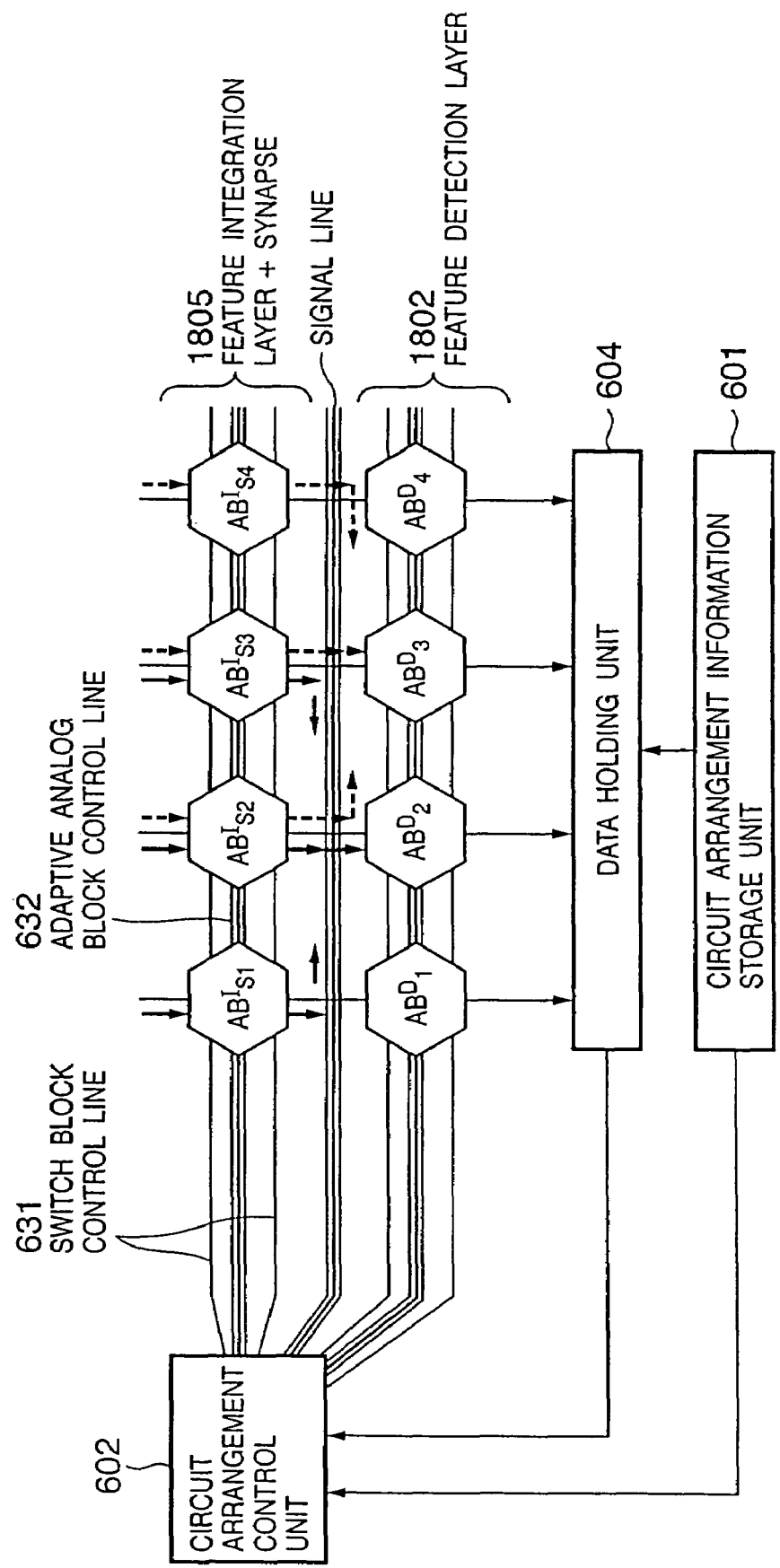
FIG. 51 is a view showing the arrangement of a signal processing circuit according to the 16th embodiment.

FIG. 51 is a view showing the arrangement of a signal processing circuit according to the 16th embodiment. As an arrangement unique to the 16th embodiment, a neuron element corresponding to a feature integration layer and a synapse element for modulating the output from the neuron element are implemented by temporally reconfiguring each circuit arrangement in a single analog processing block ($AB^I_S$). Referring to FIG. 51, a layer plane on which a plurality of analog processing blocks $AB^I_S$ are arrayed is represented by a feature integration layer+synapse 1805. Analog processing blocks that constitute a feature detection layer 1802 are represented by $AB^D$.

Figure 52:
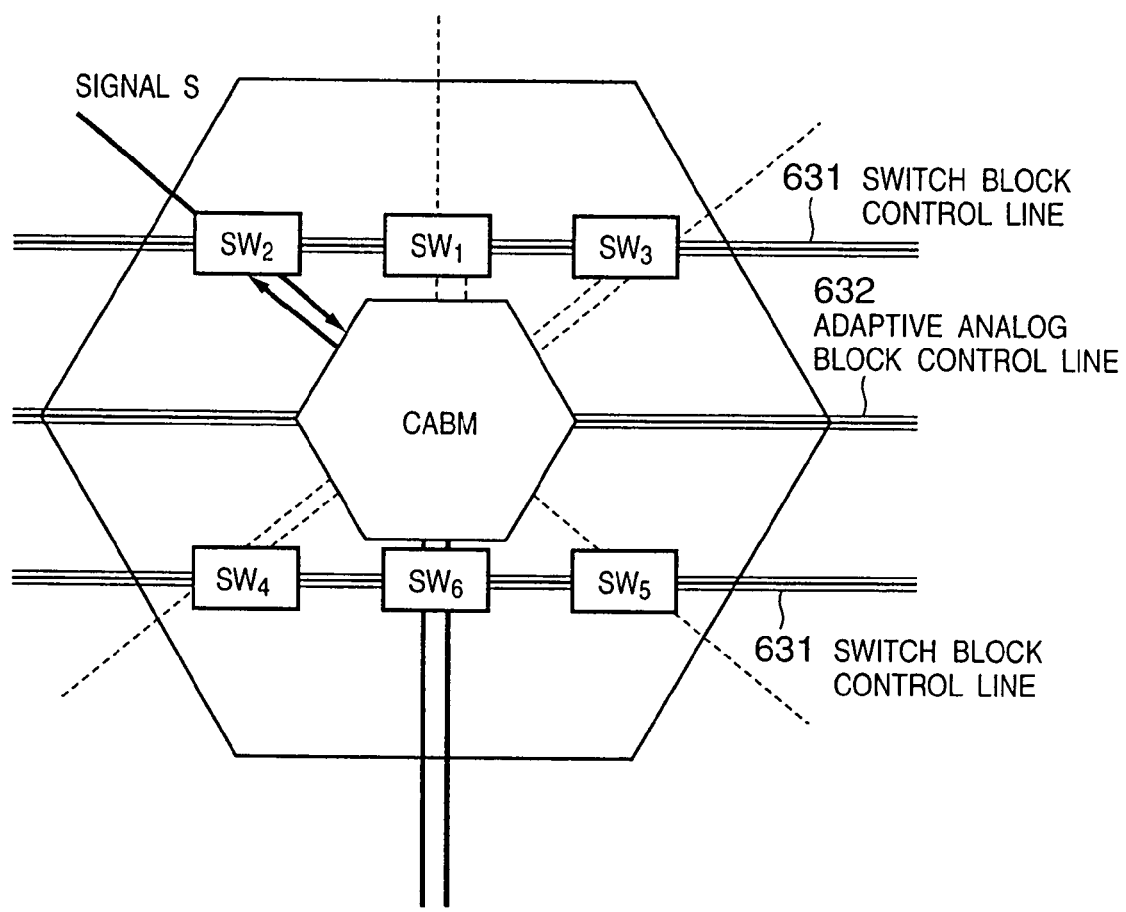
FIG. 52 is a view showing the arrangement of each analog processing block used in the 16th embodiment.
Figure 53:
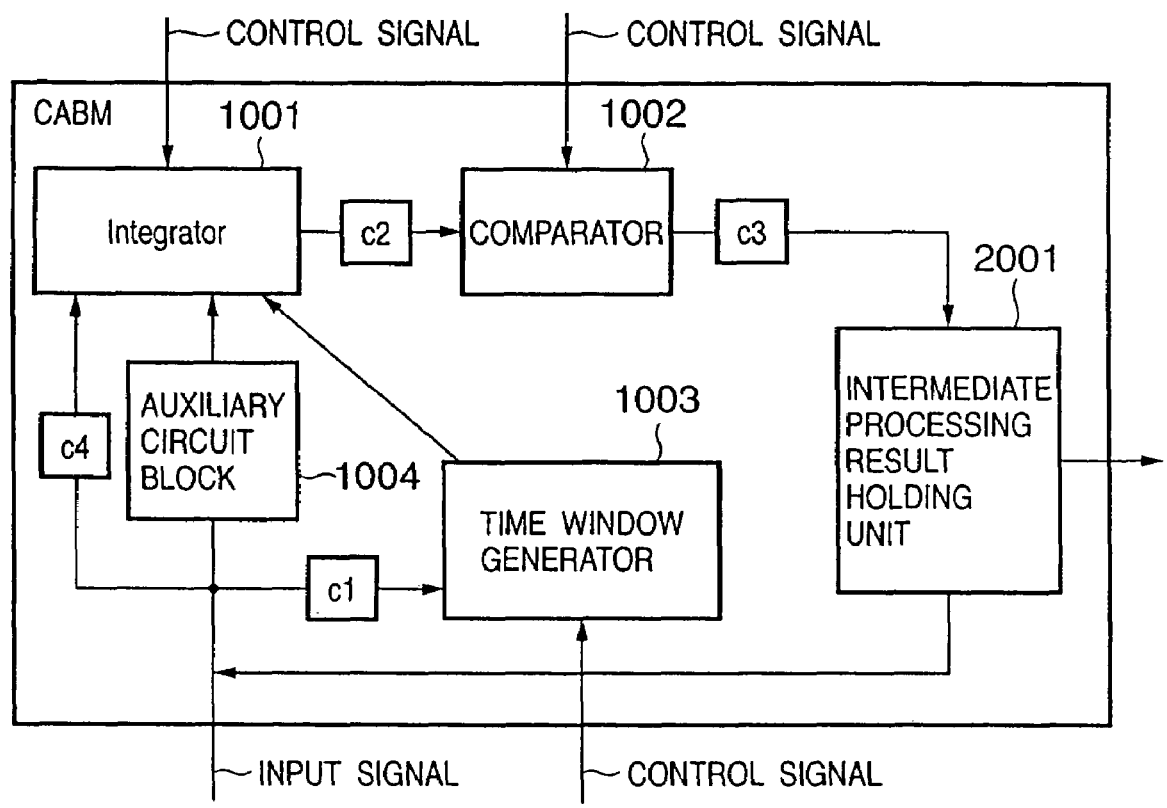
FIG. 53 is a block diagram showing the arrangement of an intermediate output holding type adaptive analog processing block.

FIG. 52 is a view showing the arrangement of each analog processing block used in the 16th embodiment. Each analog processing block in the 16th embodiment has an adaptive analog processing block CABM having an arrangement shown in FIG. 53. That is, in the adaptive analog processing block, CABM used in the 16th embodiment, an adaptive analog processing block (CAB) having the arrangement shown in FIG. 44 and an intermediate processing result holding unit 2001 for holding intermediate output data are arranged in a single circuit block.

As described above, according to the 16th embodiment, some parts of neuron elements and synapse elements are realized by reconfiguring single analog processing blocks. Hence, the same hierarchical parallel processing as in the above embodiments can be executed with a smaller number of analog processing blocks. In addition, since the intermediate processing result holding unit 2001 is arranged in each analog processing block, the circuit scale can be made smaller. As a result, the space utilization efficiency can be further improved, and the circuit scale can be further reduced.

As described above, according to the above-described 12th to 16th embodiments, in a parallel processing circuit arrangement including a plurality of analog processing elements, an adaptive signal processing block capable of changing its function and switch elements are arranged in one processing block, the processing blocks are arrayed on a predetermined grids, and each element is controlled to arbitrarily control the interconnection structure between the processing elements and the synaptic weight of signals transmitted between the processing elements. Hence, a plurality of types of circuit arrangements can be formed by a small number of basic circuit arrangements. Especially, when the characteristic of a common circuit element block is adaptively controlled in the adaptive processing block, and the connection structure between the elements is also controlled, a large-scale parallel processing analog processing circuit can be implemented by a small-scale circuit arrangement without increasing/decreasing the number of circuit elements.

When a signal regeneration circuit is arranged, as in the 13th embodiment, and dynamic reconfiguration processing is executed while partially regenerating an output as an intermediate result or totally regenerating outputs for one receptive field or one feature category in the hierarchical processing, large-scale hierarchical processing can be realized with a smaller circuit.

As described above, according to the 12th to 16th embodiments, the signal processing function including the interconnection structure between arithmetic processing blocks and modulation by an arithmetic processing block can be controlled. Hence, various kinds of circuits can be formed by a small number of basic circuit arrangements.

17th Embodiment

[Signal Processing Circuit]

The overall arrangement of a signal processing circuit according to the 17th embodiment is the same as that of the 13th embodiment (FIG. 37). A reconfigurable arithmetic processing circuit 603 according to the 17th embodiment will be described below in detail, and the circuit reconfiguration mechanism according to this embodiment will be described with reference to FIGS. 54A and 54B and above-described FIGS. 40 to 42.

FIG. 54A is a view showing the arrangement of main part of the reconfigurable arithmetic processing circuit 603 according to the 17th embodiment. When a circuit arrangement control unit 602 outputs signals onto control lines (not shown in FIG. 54A; the control lines are indicated by 831 and 832 in FIG. 54B) in accordance with information stored in a circuit arrangement information storage unit 601, the signal path between analog processing blocks AB in FIG. 54A and the processing function of each analog processing block are determined.

As shown in FIG. 54A, the reconfigurable arithmetic processing circuit 603 has an arrangement in which a plurality of hexagonal analog processing blocks are laid out in parallel. FIG. 54B shows the detailed arrangement of each analog processing block. As shown in FIG. 54B, each analog processing block has a plurality of (six) switch blocks (SW) enabling multiple-input/multiple-output functionality, an adaptive analog processing block (CAB: Configurable Analog Block), a switch block control line 831 for transmitting a signal between the blocks or controlling the ON/OF pattern of each switch block SW, and an adaptive analog block control line 832 for controlling the signal modulation parameter of the adaptive analog processing block.

The reconfigurable arithmetic processing circuit 603 also has a signal line (to be referred to as an arithmetic result signal line 822 hereinafter) for inputting the arithmetic result of a predetermined adaptive analog processing block to the circuit arrangement control unit 602. The arithmetic result signal line 822 is connected to a global signal line 821 (to be described later) and is indicated by a triple alternate long and short dashed line (it also applies to the following embodiments). Each control line (831 or 832) transmits a control signal having contents based on the arithmetic result of a predetermined adaptive analog processing block to a predetermined block at a timing based on the arithmetic result.

The analog processing block need not physically have a hexagonal shape, as described above in the 13th embodiment.

The adaptive analog processing block (CAB) is a configurable circuit capable of realizing the function of either neuron element or synapse element (to be described below) in accordance with the control signal (configuration control signal) of the adaptive analog block control line 832, which is supplied at a timing (to be described in detail later) based on the arithmetic result of a predetermined adaptive analog processing block (CAB). Synapse elements and neuron elements form a neural network circuit. Each function will become apparent from the following description. Referring to FIG. 54A, a neuron element is indicated by $AB^I$, and a synapse element is indicated by $AB_S$. These elements have identical adaptive analog processing block (CAB) structures and realize different functions (neuron element or synapse element) by the configuration control signal.

The adaptive analog processing block (CAB) is used to execute analog processing and is not always formed from only an analog circuit element such as a capacitor or resistor. It may incorporate a digital circuit element. The adaptive analog processing block (CAB) of this embodiment includes switch elements for controlling the internal circuit arrangement in accordance with the configuration control signal (c1 to c4 in FIG. 44).

Each switch block (SW) that exists in the analog processing block AB together with the adaptive analog processing block (CAB) is a circuit block for controlling the connection state of signal lines that connect the CAB in the analog processing block to the CAB in other analog processing blocks at a timing based on the arithmetic result of a predetermined adaptive analog processing block. The signal line here means a line through which an input or output signal of the adaptive analog processing block (CAB) propagates. Each signal line includes a single line or a plurality of lines running in the same direction. Each switch block (SW) ON/OFF-controls a signal line that runs in the neighborhood (e.g., a signal line 21 for $SW_4$, $SW_5$, and $SW_6$), thereby realizing connection between adaptive analog processing blocks (CAB) of adjacent layers (e.g., the Ith layer and the I+1th layer). In this case, each switch block (SW) can individually ON/OFF-control a plurality of signal lines, e.g., like the switch block $SW_6$ shown in FIG. 54B.

As an example of an arrangement for outputting signals from a single adaptive analog processing block (CAB) to a plurality of signal lines, a synapse element is realized by an adaptive analog processing block to input signals to a plurality of neuron elements of a feature detection layer, as will be described below.

Referring to FIG. 54A, the transmission paths of signals to be received by a neuron element $AB^{I+1}_3$ of the I+1th layer are $AB^I_4 \rightarrow AB_{S4} \rightarrow AB^{I+1}_3$, $AB^I_3 \rightarrow AB_{S3} \rightarrow AB^{I+1}_3$, and $AB^I_2 \rightarrow AB_{S2} \rightarrow AB^{I+1}_3$. The transmission paths of signals to be received by a neuron element $AB^{I+1}_2$ of the I+1th layer are $AB^I_3 \rightarrow AB_{S3} \rightarrow AB^{I+1}_2$, $AB^I_2 \rightarrow AB_{S2} \rightarrow AB^{I+1}_2$, and $AB^I_1 \rightarrow AB_{S1} \rightarrow AB^{I+1}_2$. The two sets of paths partially overlap. The amount of analog modulation executed by the synapse element at the overlapping portion generally changes depending on the signal path. The synapse element employs the arrangement described above with reference to FIGS. 42A and 42B such that a different modulation amount can be applied for each path (input signal and a neuron element at an output destination).

Referring to FIG. 54A, each of two signal lines 821 running between the arrays of analog processing blocks ($AB^I$ and $AB^{I+1}$) for neuron elements and the array of analog processing blocks ($AB_S$) for synapse elements represents a global signal line through which a pulse signal propagates.

The circuit arrangement control unit 602 shown in FIG. 37 outputs control signals to the switch block control line 831 and adaptive analog block control line 832 shown in FIG. 54B. The control signal sent onto the switch block control line 831 ON/OFF-controls the switch elements (FIGS. 40A and 40B and FIGS. 41A and 41B) in each switch block SW. On the other hand, the control signal sent onto the adaptive analog block control line 832 controls the signal modulation characteristic (e.g., the pulse phase modulation characteristic) of a synapse element or a characteristic such as time window width or the weight function of time-windowed, weighted integration of a neuron element.

The control signal output to the adaptive analog block control line 832 also controls the integrated value (details will be described later) of input signals in an analog processing block AB. In this embodiment, the control signal 832 controls to reset the integrated value of an input signal in an adaptive analog processing block to 0.

The control signal from the circuit arrangement control unit 602 described above is output at a timing based on an arithmetic result by an analog processing block. That is, when the sum value of output values of the analog processing blocks AB, which are input to the circuit arrangement control unit 602, exceeds a predetermined level, the control signal is output after the elapse of predetermined time that is set in advance. The sum value of output values from the analog processing blocks may be an integrated value of signal levels input to the circuit arrangement control unit 602 within a predetermined time. If the signal is a pulse signal, the number of pulses input within a predetermined time may be used. Hence, that the sum value exceeds a predetermined level that is set in advance means that a corresponding feature type is detected at the predetermined level that is set in advance.

In this embodiment, as the predetermined time before a control signal is output, which is set in advance, a period equal to or more than a time interval in which all analog processing blocks belonging to a single layer end arithmetic operations is set. That is, to reflect the arithmetic results of all the analog processing blocks in a single layer in response to the presence/absence (i.e., ON/OFF) of control signal output, the sum value of the arithmetic results of all analog processing blocks must be calculated. Hence, as the predetermined time before a control signal is output, which is set in advance, a period equal to or more than an expected time interval in which all analog processing blocks belonging to a single layer end arithmetic operations is set. With this arrangement, in the circuit arrangement control unit, the time to calculate the sum value of arithmetic results of all analog processing block can be ensured.

Conversely, if the sum of output values from some analog processing blocks, which are input to the circuit arrangement control unit 602, does not exceed the predetermined level, all of the relevant input-side switch blocks in the processing blocks of the subsequent layer are turned off to omit processing for the subsequent layer. No other circuit arrangement switching is executed.

As described above, when the control signal is output at a timing based on the arithmetic results of analog processing blocks, circuit arrangement switching operation in a given layer is executed only when the arithmetic result of the preceding layer is equal to or more than a predetermined level. If the arithmetic result of the preceding layer is less than the predetermined level, circuit arrangement operation in the subsequent layer is not executed except turning off the input-side switch blocks. Since processing for the subsequent layer is not executed, power consumption can be reduced.

The control signal for the integrated value of input signals in the analog processing blocks is output after the elapse of predetermined time that is set in advance when the sum value of output values (arithmetic results) from the analog processing blocks, which are input to the circuit arrangement control unit 602, exceeds a predetermined level.

The sum value of output values from the analog processing blocks may be an integrated value of signal levels input to the circuit arrangement control unit 602 within a predetermined time. If the signal is a pulse signal, the number of pulses input within a predetermined time may be used. In addition, the predetermined time before a control signal is output, which is set in advance, changes depending on the type of control signal. If the control signal is a large current or a high-voltage pulse with which the integrated value of input signals of the analog processing blocks exceeds the threshold value in a very short time, the analog processing blocks have a period (refractory period) when no input signal integration is performed, and the refractory period is longer than the difference in input signal arrival time at each analog processing block, which is expected in advance, the predetermined time must be set to be longer than the refractory period. In this case, even for an analog processing block which was in the refractory period when the sum value exceeds a predetermined level, the refractory period is canceled by the output time of control signal. Hence, initial phase reset operation by the control signal is appropriately executed.

Otherwise, i.e., if the analog processing blocks have no refractory period or the refractory period is shorter than the expected difference in input signal arrival time at each analog processing block, (case 1), or if the control signal itself resets the integrated value of input signals of the analog processing blocks to 0 independently of the presence/absence of a refractory period (case 2), the predetermined time is set to be longer than the expected difference in input signal arrival time at each analog processing block. This prevents any variation in initial phase due to the difference in arrival time of signals input to the analog processing blocks despite the fact that the initial phase reset operation has been executed. This embodiment employs the latter case (case 2).

As described above, when the control signal for the integrated value of input signals of the analog processing blocks is output at a timing based on the arithmetic results of the analog processing blocks, the initial phases are forcibly aligned by resetting the integrated value by the control signal even when the initial phases of signals output from the analog processing blocks have errors due to the influence of noise. For this reason, arithmetic operation of spatio-temporal weighted sum (weighted sum) in the analog processing block of the subsequent layer (to be described later) can be appropriately executed.

In addition, the control signal for the integrated value of input signals of the analog processing blocks is executed only when the arithmetic result of the preceding layer is equal to or more than a predetermined level. When the arithmetic result of the preceding layer is less than the predetermined level, no control signal is output in the subsequent layer. Hence, power consumption for the control signal output can be reduced.

In the analog processing block, the signal transmission direction of each switch block (SW) is determined in accordance with its position in the analog processing block, as shown in FIG. 54B. For example, referring to FIG. 54B, the switch blocks $SW_1$ and $SW_6$ are related to signal transmission in the vertical direction. A solid line in FIG. 54B indicates a state wherein the interconnection between the blocks (between the switch block and that of another analog processing block or between the switch block and the adaptive analog processing block) through the switch block SW allows signal transmission, and a broken line indicates a state wherein the interconnection does not allow signal transmission.

The ON/OFF operation of each switch block SW is set by the control signal transmitted from the circuit arrangement control unit 602 through the switch block control line 831 in FIG. 54B. A plurality of types of data of the ON/OFF pattern of each switch block SW are stored in advance in a predetermined memory (SRAM, DRAM, or MRAM) in the circuit arrangement information storage unit 601 and can be updated (switched) in accordance with the processing contents.

The arrangement of the switch block SW is the same as described above with reference to FIGS. 40A and 40B and FIGS. 41A and 41B.

The global signal lines 821 shown in FIG. 54A or 54B include signal lines for transmitting output signals from neuron elements to the adaptive analog processing blocks CAB serving as synapse elements and signal lines for transmitting analog-modulated signals from synapse elements to neuron elements. These signal lines are connected to the arithmetic result signal lines 822 for transmitting the output signals from the adaptive analog processing blocks to the circuit arrangement control unit 602. The signal lines for connecting the synapse elements and neuron elements are illustrated as signal lines running between the synapse analog processing blocks $AB_S$ and the neuron analog processing blocks $AB^{I+1}$ in FIG. 54A. These signal lines are used as a local common bus line through which a pulse sequence signal with a set of predetermined interval-patterns propagates.

When the number of signal lines increases, the occupation ratio of the interconnection area to the entire circuit becomes too high, and the degree of integration cannot be increased. Hence, the number of signal lines is normally limited. Depending on a required circuit arrangement, a number of signal lines beyond the limitation may become necessary. For example, consider a case wherein n neuron elements in the I+1th layer are to receive output signals from s neuron elements whose receptive fields (ranges where the neurons of the preceding layer whose output is to be received are present) partially overlap in the Ith layer using m signal lines (n>m and s>m) after the signals undergo analog modulation in different amounts by synapse elements.

In this case, settling is done in advance such that operation of switching the setting of the switch element SW in the analog processing block and the degree of modulation of the synapse element in the adaptive analog processing block (CAB) by a control signal is repeated a predetermined number of times after the above-described time-interval which is dependent on the arithmetic result by the analog processing block, thereby time-divisionally inputting signals to the neuron element $AB^{I+1}$. That is, when the sum of output signals of arithmetic results input from the analog processing blocks AB exceeds a predetermined value, after a predetermined time, a control signal for switching the settling of the switch block SW in the analog processing block and the degree of modulation of the synapse element in the adaptive analog processing block (CAB) is output a predetermined number of times that is set in advance.

To establish connection between the neuron element $AB^{I+1}$ and the synapse element $AB_S$ for executing predetermined modulation for the output signal from the neuron element $AB^I$ in accordance with the weight value (or the feature type to be detected or the neuron element at the output destination), part of a signal from the neuron element $AB^I$ belonging to the receptive field of a given neuron element $AB^{I+1}$ is time-divisionally input by controlling the switch block in the analog processing block serving as the neuron element $AB^{I+1}$. At this time, the modulation amount of an analog modulation circuit (to be described later) in the adaptive analog processing block (CAB) in the synapse element $AB_S$ is also updated in accordance with the control signal input from the circuit arrangement control unit 602 through the adaptive analog block control line 832 (FIG. 54B).

The function of each block in the signal processing circuit of this embodiment will be described next.

The switch block SW can control the flow of a signal from an adaptive analog processing block (CAB) connected to it by ON/OFF operation. As a result, the range (to be referred to as a "receptive field" hereinafter) of neuron elements in the lower layer (preceding layer) from which the neuron elements of upper layer level receive inputs is determined. Part (or whole) of a connection structure given by the receptive field can be arbitrarily set by the ON/OFF patterns of a plurality of switch blocks SW1 arranged in the analog processing blocks.

The distribution structure of synaptic connection weight in the receptive field can be arbitrarily given by setting individual parameters of a plurality of modulation circuits in the adaptive analog processing block (CAB)(to be described later).

As a result, it is unnecessary to store synaptic weight information or interconnection information in a digital memory element and to frequently access the memory. For this reason, a high-speed parallel processing characteristic can be ensured. Simultaneously, flexibility and extendibility can be obtained so that the circuit arrangement can be changed in accordance with the processing contents (e.g., the type of feature to be extracted from an input image).

The analog processing block $AB_S$ serving as a synapse element is a multiple-input/multiple-output element capable of individually setting a signal modulation amount in accordance with a plurality of synaptic weight values. The analog processing block $AB_S$ typically outputs a signal obtained by integrating an input signal with a synaptic weight value (in the embodiment to be described later, the analog processing block $AB_S$ outputs the phase modulation signal of an input pulse signal). As shown in FIGS. 42A and 42B, the adaptive analog processing block of the analog processing block $AB_S$ incorporates a plurality of analog modulation circuits in correspondence with the plurality of synaptic weight values.

One analog processing block $AB_S$ can set the range of each neuron on an output side I and input side J within a predetermined range and incorporates a plurality of analog modulation circuits 661 for executing modulation corresponding to a synaptic weight value determined by an output-side neuron element address together with input-side neuron element address.

FIG. 42A shows the arrangement of the synapse element used in this embodiment, which incorporates analog modulation circuits equal in number to the output lines (input lines). For the illustrative convenience, FIGS. 42A and 42B show no adaptive analog block control line 832. The modulation amount (in this embodiment, modulation of the pulse phase (delay amount) or pulse width) of each analog modulation circuit is set or updated through the control line 832.

FIG. 42B shows the arrangement of a multiple-input/single-output synapse element. This element is used when a plurality of neuron elements in the upper layer are to time-divisionally receive outputs from overlapping neurons in the lower layer, and the signals undergo analog modulation in different amounts by the synapse element in accordance with the neuron in the upper layer.

For example, referring to FIG. 54A, both the signal transmission path (indicated by the dotted arrow) from the neuron element $AB^I_3$ in the Ith layer to the neuron element $AB^{I+1}_3$ in the I+1th layer and that (indicated by the solid arrow) from the neuron element $AB^I_3$ to the neuron element $AB^{I+1}_2$ pass through the synapse element $AB_{S3}$. In the synapse element $AB_{S3}$, the parameters of the plurality of internal modulation circuits are set such that different modulation amounts (pulse phase modulation, pulse width modulation, or the like) are obtained for the respective transmission paths (or the addresses of the upper layer (the I+1th layer) neurons).

With this arrangement, even when neuron elements close to each other have overlapping receptive field structures, a plurality of signal transmission paths can be set through a single analog processing block $AB_S$. As a result, the problem of interconnections between the circuit elements of a neural network circuit can be reduced, and the number of circuit elements can be decreased.

In pulse phase modulation(to be described below), the analog modulation amount can be given by a charge amount applied to a capacitor as a component of a synapse circuit. A predetermined charge amount can be applied to a floating gate element or capacitor of each modulation circuit in the analog processing block $AB_S$ through the adaptive analog block control line 832 (FIG. 54B).

The circuit arrangement control unit 602 shown in FIG. 37 reads out synaptic weight value data (e.g., an applied voltage for giving a predetermined accumulated charge amount) stored in the circuit arrangement information storage unit 601 and then injects a current until charges corresponding to the synaptic weight value are accumulated (a voltage is generated) in the floating gate element (or capacitor). After that, the circuit arrangement control unit 602 time-serially accesses the synapse circuit elements $AB_{Sk}$ (k=1, 2, . . . ) as components of a receptive field structure and applies a voltage to inject charges (hot electrons), thereby setting the synaptic weight distribution structure (receptive field structure). Note that a memory element (e.g., an MRAM or FeRAM) capable of quickly rewriting data corresponding to a weight value and holding the data for a predetermined period may be used.

[Pattern Recognition Apparatus]

The above signal processing circuit can be applied to a parallel pulse signal processing circuit technology for pattern recognition. Such pattern recognition can be applied to an image sensing device or video camera having a voice input function and pattern recognition function and capable of operation such as tracking or gazing, or a vision head that can be mounted on a robot.

For a case wherein a neural network circuit for recognizing an image by parallel and hierarchical processing using the above-described signal processing circuit, the method described above with reference to FIGS. 30, 12A, 43A to 43E, 44, and 45 can be applied, and a repetitive description will be omitted.

[Application Example to Image Sensing Apparatus]

A case wherein the pattern detection (recognition) apparatus with the arrangement of this embodiment is mounted in an image sensing apparatus to execute focusing to a specific object, or color correction and exposure control for a specific object is the same as that described with reference to FIG. 5, and a description thereof will be omitted.

18th Embodiment

Figure 55:
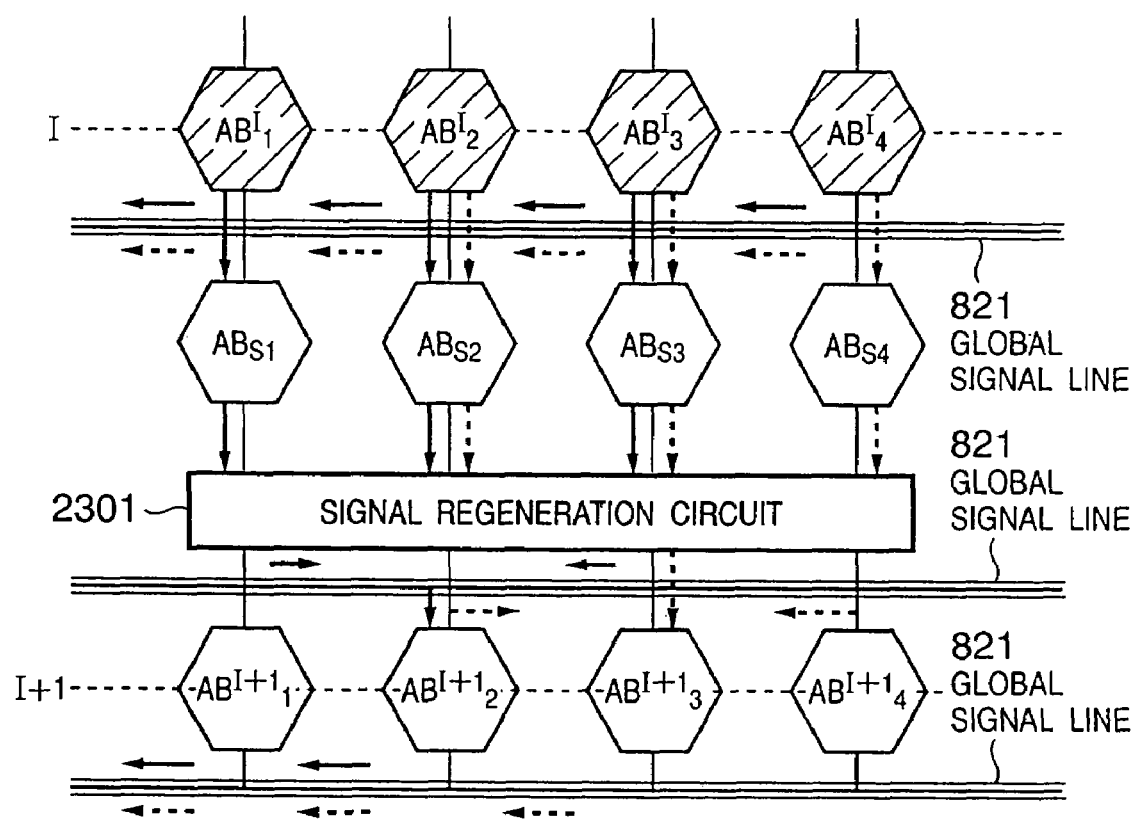
FIG. 55 is a view showing the arrangement of a neural circuit network implemented as a reconfigurable analog-digital mixed (merged) circuit according to the 18th embodiment.

FIG. 55 is a view showing the arrangement of a neural network circuit implemented as a reconfigurable analog-digital mixed (merged) circuit, which is different from that of the 17th embodiment (FIG. 54A).

The reconfigurable signal processing circuit according to the 18th embodiment realizes a hierarchical neural network circuit for pattern recognition in FIGS. 30 and 12A, which is the same as in the 17th embodiment in that a pulse signal is phase-modulated by a synapse circuit (analog processing block) in accordance with the detection category to hierarchically detect lower- to higher-order features. The overall arrangement including a circuit arrangement information storage unit 601 and circuit arrangement control unit 602 is also the same as in the 17th embodiment shown in FIG. 37. Even in the 18th embodiment, paths from a feature integration layer to a feature detection layer partially overlap at a synapse element $AB_S$. As in the 17th embodiment, the amount of analog modulation executed by the synapse element at the overlapping portion changes depending on the signal path. The synapse analog processing block $AB_S$ receives a pulse signal, gives predetermined pulse phase modulation (or time delay) to the signal, and outputs the signal, as in the 17th embodiment. The modulation amount (to delay amount) is controlled through an adaptive analog block control line 832 shown in FIG. 54B.

As in the 17th embodiment, control signals to be output to the analog processing block control line, i.e., the control signal for controlling the integrated value of input signals in the analog processing block AB and the control signal output from the circuit arrangement control unit 602 (two types of control signals for integrated value control and circuit arrangement control) are output at a timing based on the arithmetic result by the analog processing block.

As a characteristic feature of the 18th embodiment, each neuron element time-divisionally receives an output pulse sequence from each neuron belonging to the receptive field of the preceding layer while regenerating pulse outputs from some or all neuron elements in the receptive field by a signal regeneration circuit 1301. In this embodiment, when a feature detection layer neuron element receives a pulse signal phase-modulated by a synapse, as the above-described signal regeneration, a pulse signal is generated at a timing when the expected arrival times with respect to the reference time of time window integration described in the first embodiment is reproduced.

Figure 56:
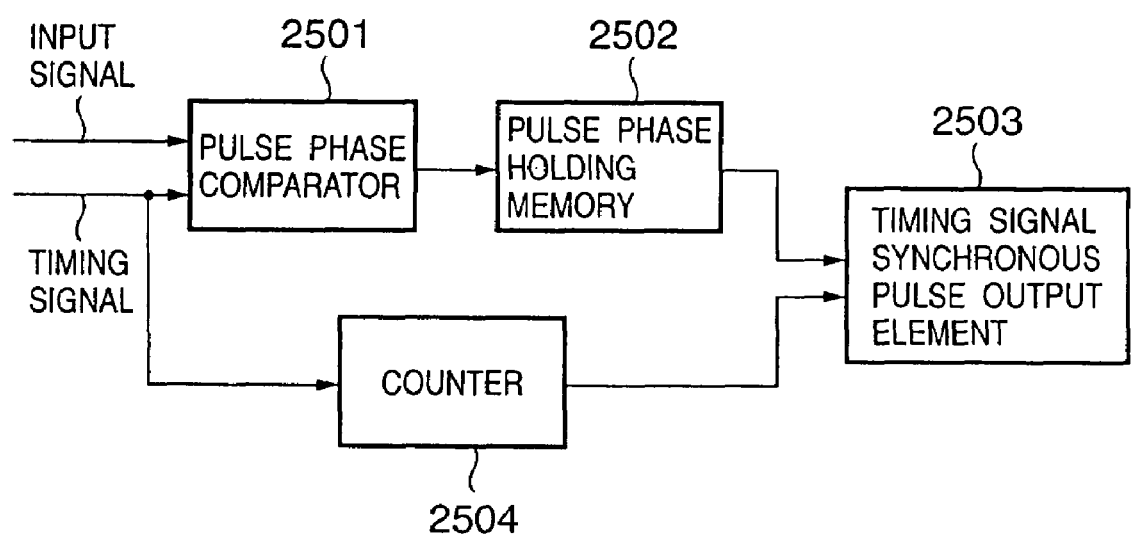
FIG. 56 is a block diagram showing the arrangement of a signal regeneration circuit.

FIG. 56 is a block diagram showing the arrangement of the signal regeneration circuit. As shown in FIG. 55, a signal regeneration circuit 2301 is present between a line of synapse element array and a line of neuron element array for receiving modulated pulse signals from the synapse elements. As shown in FIG. 56, the signal regeneration circuit 2301 comprises a pulse phase comparator 2501, a pulse phase holding memory 2502, a clock-synchronous pulse output element 2503, and counter 2504.

The pulse phase comparator 2501 receives a timing signal (externally supplied or input as a reference timing signal autonomously generated in the arithmetic processing unit). In this embodiment, a control signal output from the circuit arrangement control unit 602 is used as a reference signal, and a signal is used, which is output after the output of this control signal a predetermined number of times at a predetermined time interval. In this case, the timing signal functions as a clock signal. The pulse phase comparator 2501, in addition, receives pulse signal from a neuron element and outputs an output voltage corresponding to the phase of the pulse signal. The pulse phase holding memory 2502 is formed from a capacitor, MRAM, FRAM, or any other memory element. When a capacitor is used, charges proportional to the phase delay amount are accumulated and held. The charge amount is obtained by applying a voltage proportional to the output signal from the pulse phase comparator 2501 to the capacitor. The counter 2504 is used to identify a specific sub-time-window by receiving the above-described timing signal (i.e., sub-time-window generation time is synchronized with the timing signal). The pulse output element outputs a pulse signal at the expected arrival time corresponding to a position on the time axis of a sub-time-window from a reference timing signal (i.e., time window generation time).

In this case, the pulse phase delay amount of the pulse output element is given by a delay from the start time of the sub-time-window. The delay until the start time of the sub-time-window is given as an offset by setting the time when the counter 2504 is updated as the start time of the pulse time window. With this arrangement, no large capacity (bit accuracy) need be ensured for the pulse phase holding memory 2502.

When a given feature detection layer neuron element time-divisionally receives a plurality of pulse signal inputs from a plurality of regions in its receptive field and executes appropriate time-windowed, weighted integration for each pulse, the signal regeneration circuit aims at the following effects. In divisionally processing output signals from all neurons in the receptive field (time division multiplex processing) instead of simultaneously receiving and processing the signals, they can be processed at once on a neuron side for executing the time integration. In addition, the step of inputting a pulse signal and the step of executing time-windowed, weighted integration for the input pulse signal can be alternately and separately executed, and as a result, accumulation of errors in the time domain in the transform (i.e., weighted integration) processing of large-scale pulse sequence data is eliminated. Furthermore, state reproduction is repeated every small time width without using any circuit for generating a time window having a large span in the time domain and an accompanying weight function, thereby preventing any increase in circuit scale (area).

The signal regeneration circuit 2301 may regenerate either some or all of the output pulse signals from neurons in the receptive field of the preceding layer. To regenerate some pulse signals, time-windowed, weighted integration at a feature detection neuron of the subsequent layer is sequentially executed for those regenerated signals. In both of partial regeneration and total regeneration, time-windowed, integrated integration is executed while generating a time window or sub-time-window in synchronism with a clock signal and receiving a predetermined pulse signal in the receptive field.

As described above, according to the 18th embodiment, by regenerating all pulse signals from neurons in the receptive field, different features can be detected whenever the entire receptive field structure is controlled using the same neuron element analog processing block. The function of the feature detection layer neuron and that of the feature integration layer neuron can be alternately realized. The above-described partial signal regeneration is executed mainly when a pulse output from the receptive field of a given neuron element is scanned and input. In both cases, in dynamic reconfiguration processing of an analog-digital merged type circuit, large-scale, parallel, and hierarchical processing can be realized while keeping the circuit scale smaller than in the first embodiment by executing signal regeneration processing.

19th Embodiment

Figure 57:
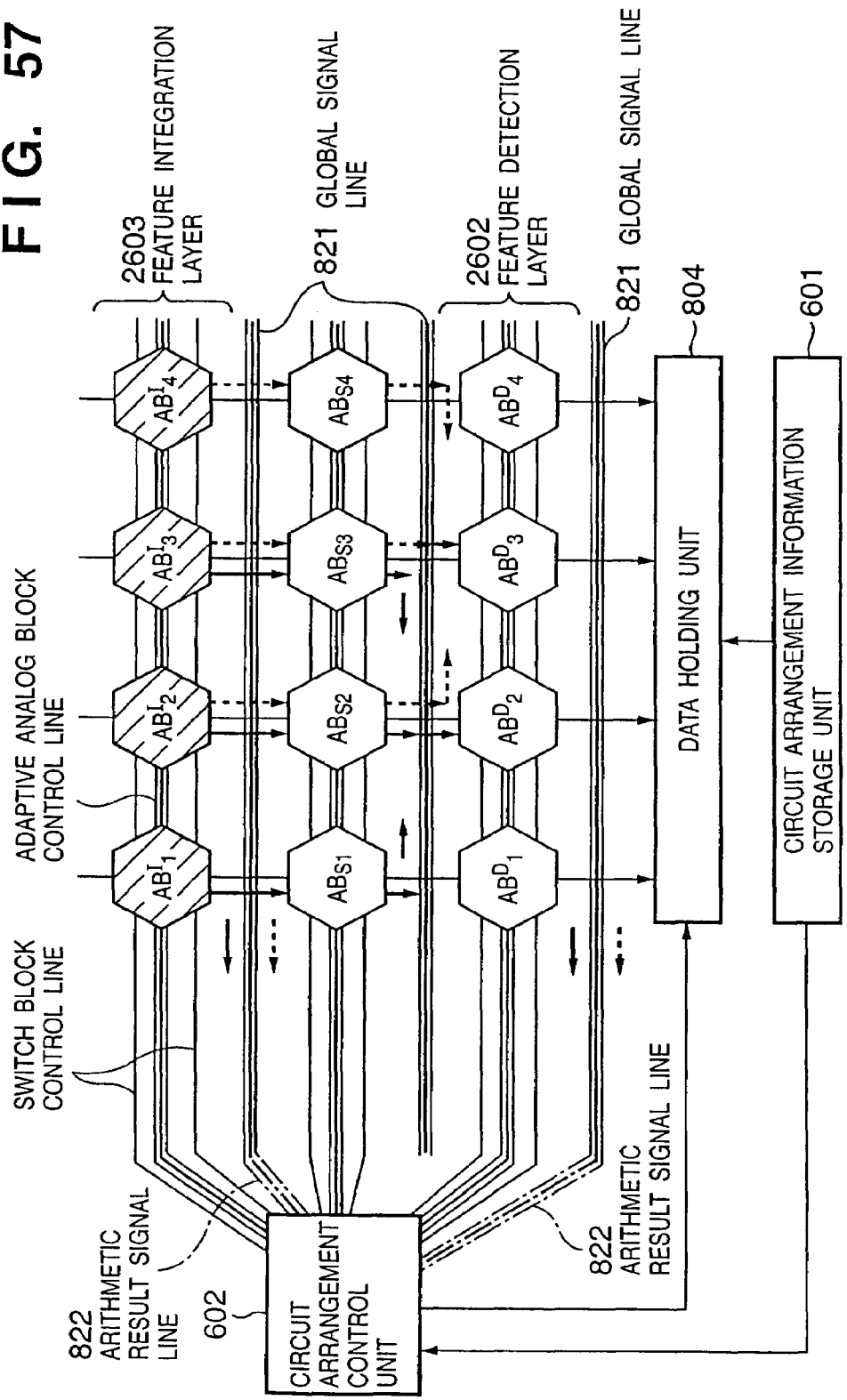
FIG. 57 is a view showing the arrangement of main part of a signal processing circuit according to the 19th embodiment.

FIG. 57 is a view showing the arrangement of main part of a signal processing circuit according to the 19th embodiment. In this embodiment, a data holding unit 804 for holding both initial data and intermediate output data is used. The circuit arrangement is controlled (reconfigured) while feeding back intermediate output data, thereby substantially implementing a parallel and hierarchical processing circuit shown in FIGS. 30 and 12A by two layers. The number of types (e.g., categories or sizes) of features to be detected in each feature detection layer at given time is one. The type is time-serially updated by a circuit arrangement control unit 602. For this reason, the number s of feature types detected in parallel by a reconfigurable arithmetic processing circuit 603 can be greatly decreased as compared to the number of feature types in the 17th embodiment (s=1 is also possible).

The reconfigurable arithmetic processing circuit 603 for executing pattern recognition hierarchically does it at each sampling point on input data while holding an intermediate processing result related to the detection of a pattern category that time-serially changes in the data holding unit 804. The circuit arrangement control unit 602 outputs the detection result (neuron element $AB^D$) at each feature detection layer 2602, which is read out from the data holding unit 804, to each neuron element ($AB^I$) of a feature integration layer 2603 and also sets the ON/OFF patterns of switch blocks SW in each analog processing block and the parameter of an analog processing block AB on the basis of circuit arrangement information read out from a circuit arrangement information storage unit 601.

As in the 17th embodiment, the control signal from the circuit arrangement control unit 602 is output at a timing based on arithmetic results by analog processing blocks AB. That is, when the sum value of output values of the analog processing blocks AB, which are input to the circuit arrangement control unit 602, exceeds a predetermined level, the control signal is output after the elapse of predetermined time that is set in advance. The sum value of output values from the analog processing blocks AB may be an integrated value of signal levels input to the circuit arrangement control unit 602 within a predetermined time. If the signal is a pulse signal, the number of pulses input within a predetermined time may be used. Hence, that the sum value exceeds a predetermined level that is set in advance means that a corresponding feature type is detected at the predetermined level that is set in advance.

In this embodiment, as the predetermined time before a control signal is output, which is set in advance, a time equal to or more than a time in which all analog processing blocks belonging to a single layer end arithmetic operations is set. That is, to reflect the arithmetic results of all the analog processing blocks in a single layer in accordance with the presence/absence (i.e., ON/OFF) of control signal output, the sum value of the arithmetic results of all analog processing blocks must be calculated. Hence, as the predetermined time before a control signal is output, which is set in advance, a time equal to or more than an expected time in which all analog processing blocks belonging to a single layer end arithmetic operations is set. With this arrangement, in the circuit arrangement control unit, the time to calculate the sum value of arithmetic results of all analog processing block can be ensured.

Hence, when the output signals from analog processing blocks, which are input to the circuit arrangement control unit through signal lines, are less than a predetermined level, no control signal related to circuit arrangement switching for the subsequent process for the associated feature type is output. In addition, to omit subsequent processing for the feature type, a control signal for clearing (e.g., nullifying) intermediate output data related to the feature type, which is held in the data holding unit 804, is output from the circuit arrangement control unit 602 to the data holding unit 804.

As described above, when the control signal is output at a timing based on the arithmetic results of analog processing blocks, circuit arrangement switching operation in a given layer is executed only when the arithmetic result of the preceding layer is equal to or more than a predetermined level. If the arithmetic result of the preceding layer is less than the predetermined level, circuit arrangement operation in the subsequent layer is not executed except turning off the input-side switch blocks. Since processing for the subsequent layer is not executed, power consumption can be reduced.

In the reconfigurable arithmetic processing circuit 603, feature detection layers 102 and feature integration layers 103 which are alternately cascaded hierarchically detect lower- or higher-order patterns, as in the 17th embodiment (FIGS. 30 and 12A). In the 19th embodiment, however, to virtually realize the hierarchical arrangement of processing, the detection is time-serially executed. With this arrangement, the entire circuit scale can be largely reduced.

The outputs from the respective feature detection layers 2602 undergo the same sub-sampling processing as in the above embodiment in the subsequent feature integration layers 2603 and are temporarily stored in the data holding unit 804. The feature detection layer 2602 updates the synaptic weight distribution (local receptive field structure), as will be described below, and also time-serially receives the detection result for each feature type from the data holding unit 804.

For example, the local receptive field structure of the feature detection layer 2602 for detecting a pattern (medium-order pattern) corresponding to an eye is updated (or set) as part of a local receptive field structure unique to each of lower-order patterns $P_1, P_2, \ldots, P_n$ that constitute the medium-order pattern every time a feature detection layer output for each pattern $P_k$ (k=1, ..., n) is received from the data holding unit 804. The receptive field structure of each neuron of the feature detection layer 2602 is updated in accordance with the feature type. However, the receptive field structure of each neuron of the feature integration layer 2603 is not updated if the receptive field size in the feature types is the same.

The local receptive field structure is held as digital data in the circuit arrangement information storage unit 601 for each feature type to be input. The circuit arrangement control unit 602 reads out this data from the circuit arrangement information storage unit 601 and updates the local receptive field structure by a control signal. For example, the receptive field structure of the neuron of the feature detection layer 102 (layer for detecting a medium-order feature) that was detecting a pattern corresponding to an eye at certain time is updated in a predetermined order in accordance with a control signal from the circuit arrangement control unit 602 such that a pattern corresponding to the nose or mouth is detected at another time.

For input data, multiplex processing is executed such that different feature detection (recognition) processes are time-serially executed by the single reconfigurable arithmetic processing circuit 603. With this processing, the circuit scale can be largely reduced, as compared to a circuit arrangement for simultaneously detecting a plurality of features in parallel, individually at a sampling position on input data. The structure of the receptive field controlled is given by the circuit arrangement information storage unit 601 and circuit arrangement control unit 602 which are constituted by, e.g., an SRAM (or MRAM or FRAM) (not shown) for storing circuit arrangement information data in which dynamically reconfigurable analog and digital circuit elements are mixed.

To implement a hierarchical neural network circuit formed from neurons with local receptive field structures as shown in FIGS. 30 and 12A, the circuit arrangement information storage unit 601 and circuit arrangement control unit 602 for updating the circuit arrangement information for each layer are generally necessary. In this embodiment, one set of the circuit arrangement information storage unit 601 and circuit arrangement control unit 602 suffices regardless of the number of layers of the hierarchical structure, as will be described below.

For example, when the number of feature types (e.g., the feature category or size) to be detected by the feature detection layer 102 at each sampling point on input data at certain time is one, the local receptive fields of the feature detection layer neurons have an identical structure. As a result, the circuit arrangement information storage unit 601 and circuit arrangement control unit 602, which give the receptive field structure, can be shared to time-serially supply circuit arrangement information to each of switch blocks SW and analog processing blocks $AB_S$.

The weight coefficient for each connection that reflects the receptive field structure is updated and set by updating synapse circuit load data of the analog processing block $AB_S$ in accordance with weight coefficient data supplied from the circuit arrangement information storage unit 601. For example, assume that a synaptic weight value is given by the amount of injected charges accumulated in a floating gate element in the analog processing block $AB_S$. In this case, the synaptic weight is set by injecting charges corresponding to the weight value of each synapse, which corresponds to the weight coefficient data stored in the circuit arrangement information storage unit 601, through an adaptive analog block control line 832 shown in FIG. 54B.

20th Embodiment

Figure 58A:
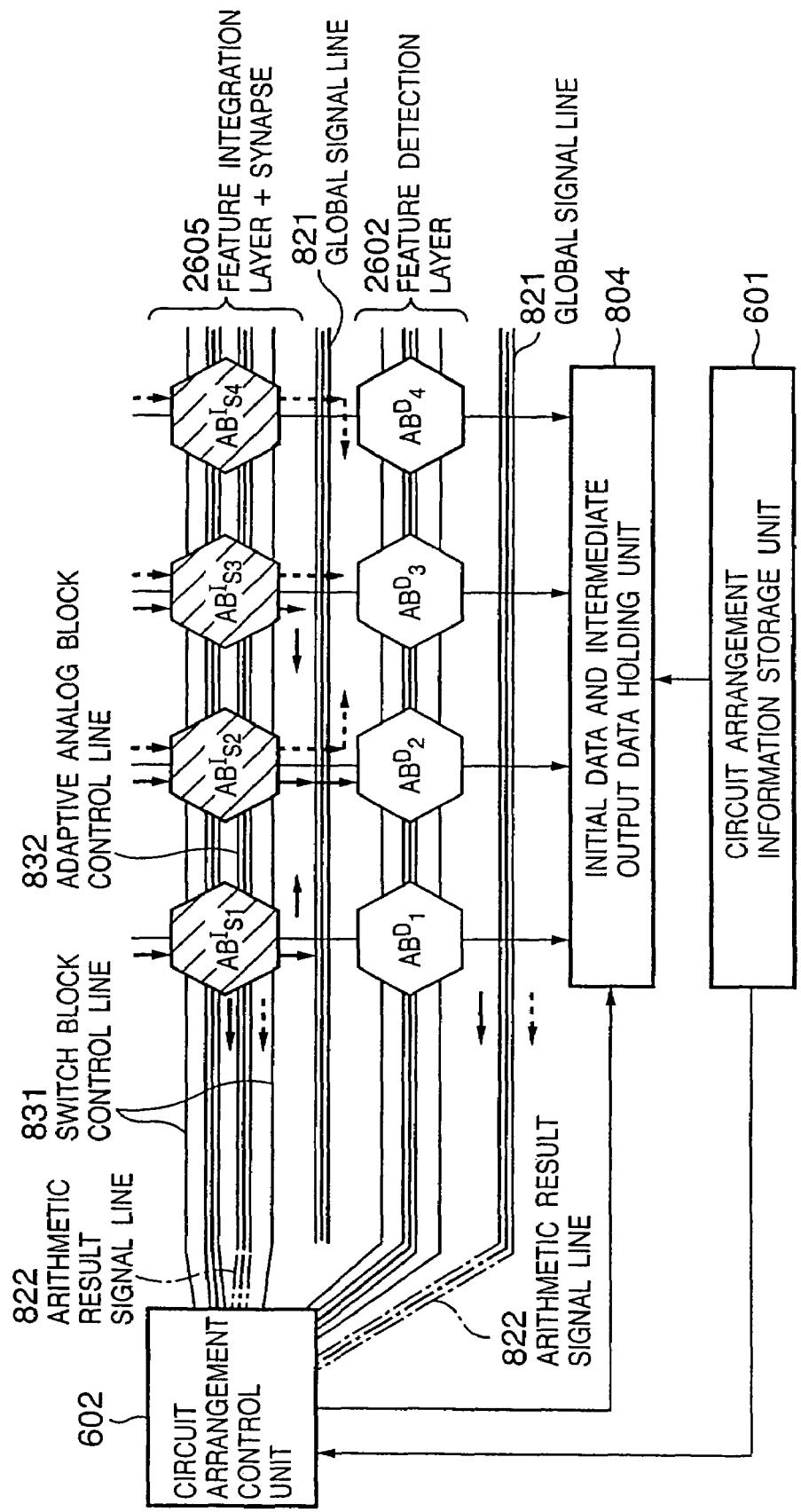
FIG. 58A is a view showing the arrangement of main part of a signal processing circuit according to the 20th embodiment.

FIG. 58A is a view showing the arrangement of a signal processing circuit according to the 20th embodiment. As an arrangement unique to the 20th embodiment, a neuron element corresponding to a feature integration layer and a synapse element for modulating the output from the neuron element are realized by time-divisionally reconfiguring each circuit arrangement in a single analog processing block ($AB^I_S$). The arrangement of the remaining parts is the same as in the above-described 19th embodiment. Referring to FIG. 58A, a layer plane on which a plurality of analog processing blocks $AB^I_S$ are arrayed is represented by a feature integration layer+synapse 2605. An analog processing block $AB^D$ constructing a feature detection layer 2602 is represented as $AB^D$.

Figure 58B:
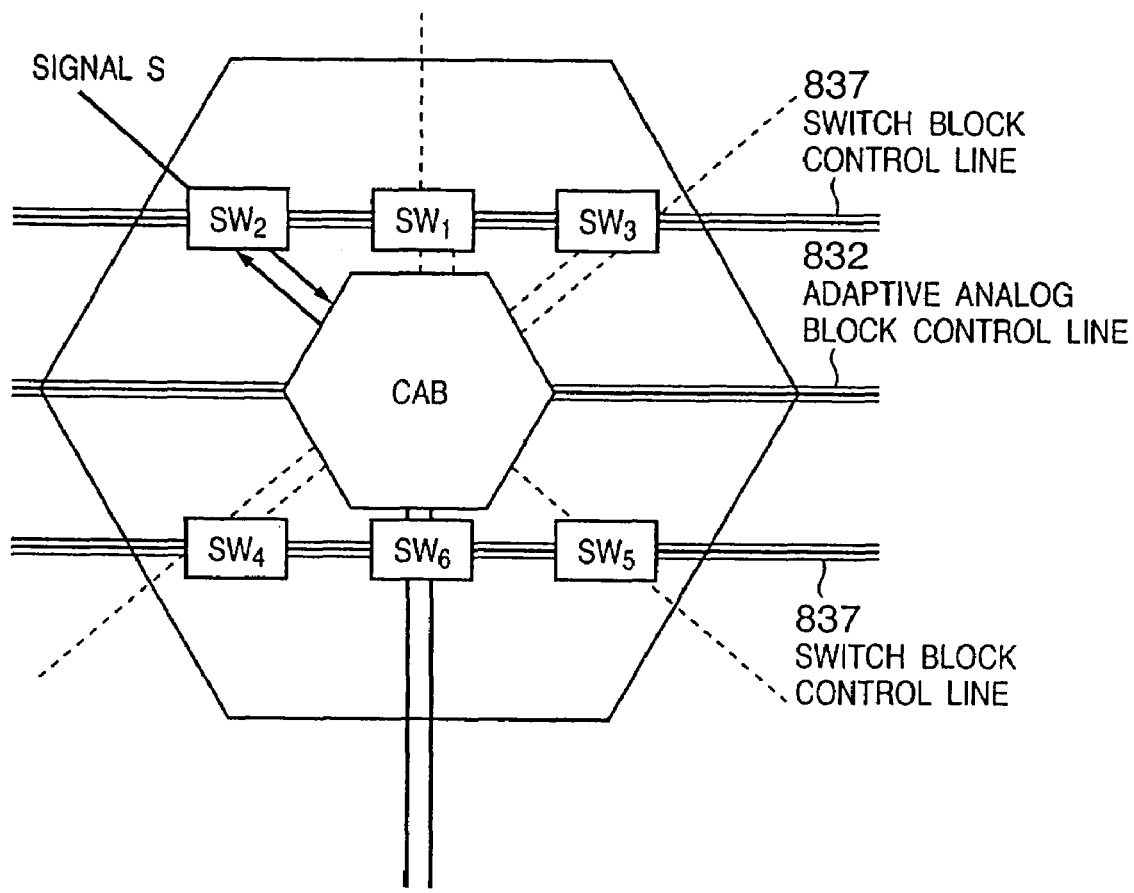
FIG. 58B is a view showing the detailed arrangement of each analog processing block in the 20th embodiment.

FIG. 58B is a view showing the arrangement of each analog processing block used in the 20th embodiment. In CABM at the center, an adaptive analog processing block (CAB) used in the above embodiment and an intermediate processing result holding unit for holding intermediate output data from the adaptive analog processing block (CAB) are formed in one circuit block. The arrangement of the adaptive analog processing block used in the 20th embodiment is the same as described above with reference to FIG. 53.

In this embodiment, the control signal for switching between a neuron element and a synapse element is output at a timing based on an arithmetic result of adaptive analog processing blocks (neuron elements), which is input to the circuit arrangement control unit 602 through signal lines shown in FIG. 58B. That is, when the sum of output values from adaptive analog processing blocks, which are input to the circuit arrangement control unit 602, exceeds a predetermined level, the control signal is output after the elapse of predetermined time that is set in advance so as to switch between the neuron element and the synapse element. The sum of output values from the analog processing blocks may be an integrated value of signal levels input to the circuit arrangement control unit 602 within a predetermined time. If the signal is a pulse signal, the number of pulses input within a predetermined time may be used. As the predetermined time before a control signal is output, which is set in advance, a period equal to or more than the duration in which all analog processing blocks belonging to a single layer end arithmetic operations is set. Hence, that the sum value exceeds a predetermined level that is set in advance means that a corresponding feature type is detected at the predetermined level that is set in advance.

In addition, to reflect the arithmetic results of all analog processing blocks in a single layer in accordance with the presence/absence(i.e., ON/OFF) of control signal output, the sum value of the arithmetic results of all analog processing blocks must be calculated. Hence, as the predetermined time before a control signal is output, which is set in advance, a time equal to or more than an expected time in which all analog processing blocks belonging to a single layer end arithmetic operations is set. With this arrangement, in the circuit arrangement control unit 602, the period to calculate the sum value of arithmetic results of all analog processing block can be ensured.

Conversely, when the sum of output signals from the analog processing blocks, which are input to the circuit arrangement control unit 602, is less than a predetermined level, processing for the subsequent layer need not be executed. Hence, the value of arithmetic result stored in the storage unit (intermediate output holding unit) in the CABM is cleared (e.g., nullified). As described above, when the control signal for switching between the neuron element and the synapse element is output at a timing based on-the arithmetic results of analog processing blocks, switching operation is executed only when the arithmetic result of the neuron element is equal to or more than a predetermined level. If the arithmetic result of the neuron element is less than the predetermined level, processing in the subsequent layer is not executed. In addition, since circuit arrangement switching operation is not executed either, power consumption can be reduced.

As described above, some neuron elements and synapse elements are implemented by reconfiguring single analog processing blocks. Hence, the same hierarchical parallel processing as in the above embodiments can-be executed with a smaller number of analog processing blocks. As a result, the space utilization efficiency can be further improved, and the circuit scale-can be further reduced.

21st Embodiment

FIG. 59 shows another arrangement of a neural network circuit implemented as a reconfigurable analog-digital mixed (merged) circuit according to the 21st embodiment. The reconfigurable signal processing circuit according to the 21st embodiment has signal separation units 805 at the connection portions between global signal lines 821 and arithmetic result signal lines 822. The arrangement of the remaining parts is the same as in the 17th embodiment.

A circuit arrangement control unit 602 outputs a control signal on the basis of the sum value of received arithmetic results of adaptive analog processing blocks, as in the 17th embodiment. In the 21st embodiment, however, the sum value is calculated for each group of adaptive analog processing blocks on the basis of the group numbers of adaptive analog processing blocks, which are set in advance. If the sum value exceeds a predetermined value that is set in advance for each adaptive analog processing block group, a control signal is output to a corresponding group of adaptive analog processing blocks, unlike the 17th embodiment.

The control signal includes both a control signal for switching the circuit arrangement and a control signal for controlling the arithmetic value of weighted addition processing or weighted integration processing of adaptive analog processing blocks.

Figure 60:
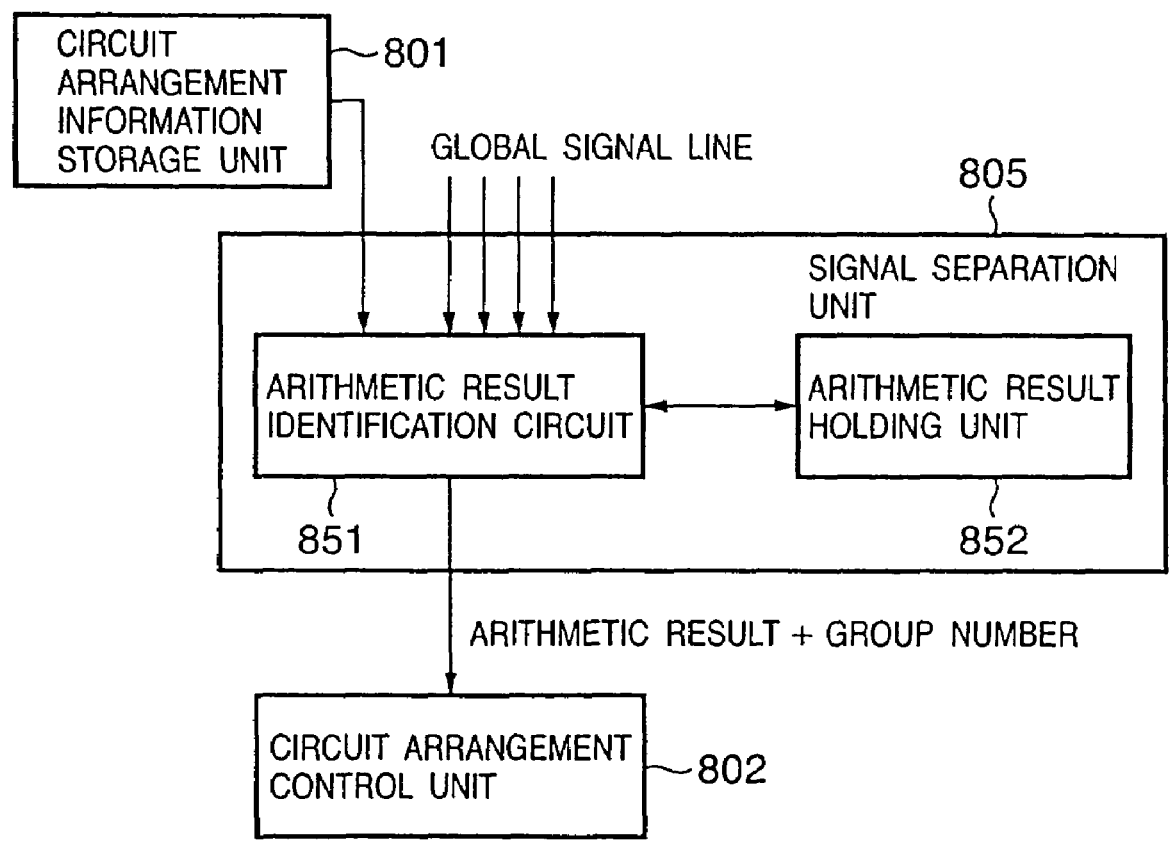
FIG. 60 is a block diagram showing the arrangement of a signal separation unit.

FIG. 60 is a block diagram showing the arrangement of the signal separation unit. The signal separation unit 805 specifies, for an arithmetic result of an adaptive analog processing block, by an arithmetic result identification circuit 851, which is input through the global signal line 821, the address of an adaptive analog processing block for which an arithmetic result is calculated, on the basis of circuit arrangement information read out from the circuit arrangement information storage unit 601, and specifies a group number set in advance, on the basis of the specified address.

The arithmetic result is held by an arithmetic result holding unit 852 together with the group number for each specified group of adaptive analog processing blocks. After that, the arithmetic result held for each group is read out from the arithmetic result holding unit 852 and output to the circuit arrangement control unit 602. At this time, to identify the group to which the arithmetic result input in the circuit arrangement control unit 602 belongs, the group number corresponding to each arithmetic result is input from the arithmetic result identification circuit 851 to the circuit arrangement control unit 602.

On the basis of an arithmetic result and a corresponding group number, the circuit arrangement control unit 602 calculates the sum value of arithmetic results for each group. If some sum value exceeds a predetermined value that is set for each group, a control signal is output to a corresponding group of adaptive analog processing blocks.

A control signal for switching the circuit arrangement is output on the basis of the above processing. Since the adaptive analog processing blocks are put into groups in advance, and the circuit arrangement is switched for each group on the basis of the sum value of arithmetic results for each group, the circuit arrangement of a group whose sum value of arithmetic results is smaller than a predetermined value, i.e., a group for which no corresponding feature is detected need not be changed. Hence, any unnecessary circuit arrangement switching can be omitted, and power consumption can be reduced.

A control signal for controlling the arithmetic value of weighted addition processing or weighted integration processing of adaptive analog processing blocks is output on the basis of the above processing. Since the adaptive analog processing blocks are put into groups in advance, and the arithmetic value of weighted addition processing or weighted integration processing is controlled for each group on the basis of the sum value of arithmetic results for each group, the arithmetic value control for a group whose arithmetic result sum value is smaller than a predetermined value (i.e., a group for which no corresponding feature is detected), need not be executed. Hence, any unnecessary control can be omitted, and power consumption can be reduced.

A case wherein the signal separation units 805 are arranged at the connection portions between the global signal lines and the arithmetic result signal lines in the arrangement of the 17th embodiment has been described above. Even when the same arrangement is applied to the arrangement of the 18th, 19th, or 20th embodiment, the same effect as described above can be realized because the above-described function is added to those described in each embodiment. The function of the signal separation unit 805 in each case is the same as described above, and a detailed description thereof will be omitted.

As described above, according to the 17th to 21st embodiments, in a parallel processing circuit arrangement including a plurality of analog processing elements, an adaptive signal processing block capable of changing its function and switch elements are arranged in one processing block, the processing blocks are arrayed on a predetermined grids, and each element is controlled on the basis of the arithmetic result of the adaptive signal processing block. With this control, only when the arithmetic result of the adaptive processing block is equal to or more than a predetermined value, the interconnection structure between the processing elements and the weight value for a signal transmitted between the processing elements can be arbitrarily controlled. Hence, a plurality of types of circuit arrangements can be formed by a small number of basic circuit arrangements, and the power consumption can be reduced. Especially, when the characteristic of a common circuit element block is adaptively controlled in the adaptive processing block, and the connection structure between the elements is also controlled, a large-scale parallel processing analog processing circuit can be implemented by a small-scale circuit arrangement without increasing the number of circuit elements.

When dynamic reconfiguration processing is executed while partially regenerating an output as an intermediate result or totally regenerating outputs for one receptive field or one feature category in the hierarchical processing, large-scale and hierarchical processing can be realized with a smaller circuit.

When a control signal is output at a timing based on the arithmetic result of the adaptive processing block, and the arithmetic result of the preceding layer is less than a predetermined level, circuit arrangement switching operation in the subsequent layer is not executed except turning of the input-side switch blocks. Since processing for the subsequent layer is not executed, power consumption can be reduced.

As the predetermined time before a control signal is output, which is set in advance, a period equal to or more than a time duration in which all signal processing blocks belonging to a single layer end arithmetic operations, which is expected in advance, is set. In this case, the arithmetic results of all signal processing blocks can be reflected on the sum value.

When a control signal for the integrated value of input signals in an analog processing block is output at a timing based on the arithmetic result of the adaptive processing block, and the arithmetic result of the preceding layer is less than a predetermined level, the control signal is not output for the subsequent layer. Hence, power consumption for the control signal output can be reduced.

As the predetermined time before a control signal is output, which is set in advance, a time equal to or more than the refractory period is set. In this case, even for an analog processing block which is set in the refractory period when the sum value exceeds a predetermined level, the refractory period is terminated by the output time of the control signal. Hence, initial phase reset operation by the control signal is appropriately executed.

In addition, when the predetermined time is set to be longer than the difference in expected input signal's arrival times at each analog processing block, any variation in initial phase due to the difference in the arrival times of signals input to the analog processing blocks although the initial phase reset operation has been executed can be prevented.

In the 21st embodiment, since the signal separation unit identifies the arithmetic circuit that has output the arithmetic result to be input to the circuit arrangement control unit, calculates the sum value for each preset group, compares the sum value with a predetermined value, and outputs a control signal. With this arrangement, unnecessary control can be omitted for each group, and the power consumption can be further reduced.

As has been described above, according to the 17th to 21st embodiments, the interconnection structure between arithmetic processing blocks and a signal processing function including modulation by the arithmetic processing blocks can be controlled., and various circuits can be formed by a small number of basic circuit arrangements.

In addition, the circuit arrangement and circuit characteristic of arithmetic processing blocks can be switched and commonly used for a plurality of signal processing operations, thereby reducing the circuit scale.

Furthermore, unnecessary switching of the circuit arrangement and circuit characteristic in switching the function of arithmetic processing blocks can be omitted, thereby reducing power consumption.

As many apparently widely different embodiments of the present invention can be made without departing from the spirit and scope thereof, it is to be understood that the invention is not limited, to the specific embodiments thereof except as defined in the appended claims.

What is claimed is:

1. An image processing apparatus comprising:
   image input means; and
   image processing means for time serially executing a plurality of spatial filter arithmetic operations for single image data input from said image input means in correspondence with a plurality of different spatial filter characteristics, wherein
   said image processing means comprises
      a spatial filter circuit capable of changing a selectivity related to a predetermined geometrical feature, and
      a control circuit for controlling a characteristic of said spatial filter circuit, and
      said control circuit applies a finite number of different spatial filter characteristics that are set in advance to the input image data and time serially extracts a plurality of spatial filter outputs related to the input image data.

2. An image processing apparatus comprising:
   image input means; and
   image processing means for time serially executing a plurality of spatial filter arithmetic operations for single image data input from said image input means in correspondence with a plurality of different spatial filter characteristics, wherein
   said image processing means comprises
      a sensor circuit having a transfer circuit for transferring a pixel signal to be read from a pixel array,
      a control circuit, and
      a spatial filter circuit for time serially executing spatial filter processing with predetermined different characteristics,
   said control circuit outputting a read control pulse signal of the pixel signal to said sensor circuit and outputting a spatial filter characteristic control signal to said spatial filter circuit on the basis of the read control pulse signal, and
   said spatial filter circuit time serially executing predetermined different spatial filter processing operations for the pixel signal in correspondence with the pixel signal output that is output from said transfer circuit.

3. An image processing apparatus comprising:
   image input means; and
   image processing means for time serially executing a plurality of spatial filter arithmetic operations for single image data input from said image input means in correspondence with a plurality of different spatial filter characteristics, wherein
   said image processing means comprises
      a sensor circuit having a transfer circuit for transferring a pixel signal to be read from a pixel array,
      a control circuit, and
      a spatial filter array circuit formed by arranging a demultiplexer circuit and a spatial filter element circuit for time serially executing spatial filter processing with predetermined different characteristics,
   said control circuit outputting a read control pulse signal of the pixel signal to said sensor circuit and outputting a spatial filter characteristic control signal to said spatial filter array circuit on the basis of the read control pulse signal,
   said demultiplexer circuit separately outputting a time serial signal from said sensor circuit to different signal lines connected to said spatial filter element circuits on the basis of the read control pulse signal, and
   said spatial filter element circuit time serially executing predetermined different spatial filter processing operations for the pixel signal in correspondence with the pixel signal output that is output from said transfer circuit.

4. An image processing apparatus comprising:
   image input means; and
   image processing means for time serially executing a plurality of spatial filter arithmetic operations for single image data input from said image input means in correspondence with a plurality of different spatial filter characteristics, wherein
   said image processing means comprises
      a transfer circuit for transferring a pixel signal of a sensor pixel,
      a control circuit, and
      a spatial filter circuit for time serially executing spatial filter processing with predetermined different characteristics,
   said control circuit outputting a read pulse signal to said transfer circuit in synchronism with an output timing signal of said spatial filter circuit.

5. The apparatus according to claim 4, wherein said spatial filter circuit time serially executes predetermined local spatial filtering at a plurality of scales in a scale space.

6. The apparatus according to claim 5, wherein the local spatial filtering is predetermined multiplex scale spatial filter processing for giving a Gabor filter or an output approximate to a Gabor filter output, in which filtering operations with different scale selectivities and different direction selectivities are time serially executed.

7. An image processing apparatus comprising:
   image input means; and
   image processing means for time serially executing a plurality of spatial filter arithmetic operations for single image data input from said image input means in correspondence with a plurality of different spatial filter characteristics, wherein
   said image processing means comprises
      a sensor circuit having a transfer circuit for transferring a pixel signal to be read out from a pixel array,
      a control circuit,
      a spatial filter circuit for time serially executing spatial filter processing with predetermined different characteristics, and
      a block memory for temporarily storing signals of a predetermined sensor pixel group,
   said control circuit outputting a read control pulse signal of the pixel signal to said sensor circuit and said block memory and outputting a spatial filter characteristic control signal to said spatial filter circuit in synchronism with the read control pulse signal, and
   said spatial filter circuit reading out, from said block memory, image data at an address corresponding to the pixel signal output that is output from said transfer circuit and time serially executing predetermined spatial filter processing for the image data in correspondence with the pixel signal.

* * * * *